(12) United States Patent
Hayashi

(10) Patent No.: US 9,164,228 B2
(45) Date of Patent: Oct. 20, 2015

(54) MULTI-CORE OPTICAL FIBER, MULTI-CORE OPTICAL FIBER CABLE, AND MULTI-CORE OPTICAL FIBER TRANSMISSION SYSTEM

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 293 days.

(21) Appl. No.: 13/776,942

(22) Filed: Feb. 26, 2013

(65) Prior Publication Data

US 2013/0251320 A1    Sep. 26, 2013

Related U.S. Application Data

(60) Provisional application No. 61/604,595, filed on Feb. 29, 2012.

(30) Foreign Application Priority Data

Feb. 29, 2012    (JP) ................................ 2012-044344

(51) Int. Cl.
    *G02B 6/036*    (2006.01)
    *G02B 6/02*     (2006.01)
    *G02B 6/44*     (2006.01)

(52) U.S. Cl.
    CPC .......... *G02B 6/02042* (2013.01); *G02B 6/4401* (2013.01); *G02B 6/4434* (2013.01)

(58) Field of Classification Search
    USPC ......................................................... 385/100
    See application file for complete search history.

(56) References Cited

U.S. PATENT DOCUMENTS

3,823,996 A * 7/1974 Kompfner et al. ............ 385/126
6,154,594 A * 11/2000 Fiacco et al. .................. 385/126

(Continued)

FOREIGN PATENT DOCUMENTS

| JP | H3-228009 | 10/1991 |
| JP | H9-265021 | 10/1997 |

(Continued)

OTHER PUBLICATIONS

Hayashi et al.; "Ultra-Low-Crosstalk Multi-Core Fiber Feasible to Ultra-Long-Haul Transmission"; 2011; Optical Communications R & D Lab.*

(Continued)

*Primary Examiner* — Hemang Sanghavi
*Assistant Examiner* — Kajli Prince
(74) *Attorney, Agent, or Firm* — Drinker Biddle & Reath LLP

(57) ABSTRACT

A multi-core optical fiber according to an embodiment of the present invention is provided with a plurality of core parts, a common cladding, and a coating. Particularly, in order to improve a spectral efficiency per unit sectional area, optical properties typified by the number of core parts, a sectional area of the entire multi-core optical fiber, the sum of power coupling coefficients to a core part n from all the other core parts, and a transmission loss, a non-linear refractive index, an effective area, and a chromatic dispersion of the core part n with the largest crosstalk from other core parts are set so as to satisfy a predetermined relation.

28 Claims, 34 Drawing Sheets

(56) References Cited

U.S. PATENT DOCUMENTS

| | | | | |
|---|---|---|---|---|
| 8,532,454 | B2* | 9/2013 | Imamura | 385/126 |
| 2011/0129190 | A1* | 6/2011 | Fini et al. | 385/126 |
| 2011/0182557 | A1* | 7/2011 | Hayashi | 385/127 |

FOREIGN PATENT DOCUMENTS

| | | |
|---|---|---|
| JP | 2002-185063 | 6/2002 |
| JP | 2007-335435 | 12/2007 |
| JP | 2011-150133 | 8/2011 |
| JP | 2011-197667 | 10/2011 |
| JP | 2011-209702 | 10/2011 |
| WO | WO 2010/038863 | 4/2010 |
| WO | WO 2010/119930 | 10/2010 |

OTHER PUBLICATIONS

English-language translation of International Preliminary Report on Patentability (IPRP) dated Sep. 12, 2014 that issued in WO Patent Application No. PCT/JP2013/054360.

Katsunori Imamura et al., "Effective Space Division Multiplexing by Multi-Core Fibers," IEEE, ECOC2010, Sep. 2010, pp. P1.09.

K. Takenaga et al., "A Large Effective Area Multi-Core Fibre with an Optimised Cladding Thickness," ECOC Technical Digest, 2011, pp. Mo.1.LeCervin.2.pdf 1-3.

René-Jean Essiambre et al., "Capacity Limits of Optical Fiber Networks," Journal of Lightwave Technology, Feb. 15, 2010, pp. 662-701, vol. 28, No. 4.

Pierluigi Poggiolini et al., Analytical Modeling of Nonlinear Propagation in Uncompensated Optical Transmission Links, IEEE Photonics Technology Letters, Jun. 1, 2011, pp. 742-744, vol. 23, No. 11.

Katsuhiro Takenaga et al., "An Investigation on Crosstalk in Multi-Core Fibers by Introducing Random Fluctuation along Longitudinal Direction," The Institute of Electronics, Information and Communication Engineers, Feb. 2011, pp. 409-416, vol. E94-B, No. 2.

John M. Fini et al., "Crosstalk in multi-core optical fibres," ECOC Technical Digest, 2011, paperMo.1.LeCervin.4.

Tetsuya Hayashi et al., Ultra-Low-Crosstalk Multi-Core Fiber Feasible to Ultra-Long-Haul Transmission, OSA/OFC/NFOEC, 2011, paper PDPC2.pdf.

Shoichiro Matsuo et al., "Large-effective-area ten-core fiber with cladding diameter of about 200 µm," Optics Letter, Dec. 1, 2011, pp. 4626-4628, vol. 36, No. 23.

E. Specht, "The best known packings of equal circles in a circle," Jun. 17, 2010, Available: http://hydra.nat.uni-magdeburg.de/packing/cci/cci.html [Homepage: http://www.packomania.com/], pp. 1/3-3/3.

R. Ryf et al., "Cohernet 1200-km 6×6 MIMO Mode-Multiplexed Transmission over 3-core Microstructured Fiber," ECOC Postdeadline Papers, 2011, pp. 1-3, paper TH.13.C.1.

Clemens Koebele et al., "40km Transmission of Five Mode Division Multiplexed Data Streams at 100Gb/s with low MIMO-DSP Complexity," 2011, ECOC Postdeadline Papers, paper Th.13.C.3, pp. 1-3.

Tetsuya Hayashi, et al., "Ultra-Low-Crosstalk Multi-Core Fiber," Communication Society Paper of the Institute of Electronics, Information and Communication Engineers 1 2011 BI-7-2, Aug. 30, 2011, p. 55-56, with attached partial English-language translation.

K. Takenaga, et al., "Trench-Assisted Multi-Core Fiber," Communication Society Paper of the Institute of Electronics, Information and Communication Engineers 1 2011, BI-7-3, Aug. 30, 2011, pp. 57-58, with attached partial English-language translation.

T. Hayashi, et al., "Low-Crosstalk and Low-Loss Multi-Core Fiber Utilizing Fiber Bend," OWJ3.pdf, OSA/OFC/NFOEC 2011.

K. Takenaga, et al., "Reduction of Crosstalk by Trench-Assisted Multi-Core Fiber," OWJ4.pdf, OSA/OFC/NFOEC 2011.

* cited by examiner

MULTI-CORE OPTICAL FIBER, MULTI-CORE OPTICAL FIBER CABLE, AND MULTI-CORE OPTICAL FIBER TRANSMISSION SYSTEM

BACKGROUND OF THE INVENTION

1. Field of the Invention

The present invention relates to a multi-core optical fiber, a multi-core optical fiber cable, and a multi-core optical fiber transmission system.

2. Related Background of the Invention

A multi-core optical fiber having a structure in which each of core parts extending along the central axis (fiber axis) is covered by a common cladding is expected as an optical transmission line that can transmit a large volume of information. For example, in K. Imamura et al., ECOC2010, P1.09 (Non Patent Literature 1) and K. Takenaga et al., ECOC2011, Mo. 1. LeCervin. 2 (Non Patent Literature 2), a variety of studies have been conducted for the purpose of transmitting a larger volume of information, regarding the multi-core optical fiber of this kind.

SUMMARY OF THE INVENTION

The Inventor conducted detailed research on the conventional multi-core optical fibers and found the following problem. Namely, the foregoing Non Patent Literatures 1 and 2 fail to evaluate the performance of the multi-core optical fiber from the viewpoint of the transmission capacity or the spectral efficiency per unit sectional area. For example, Non Patent Literature 1 describes the study using the number of cores per unit sectional area as an index for the performance of the multi-core optical fiber. Furthermore, Non Patent Literature 2 describes the study using a ratio of "the sum of effective areas ($A_{eff}$) of individual cores" to "a sectional area of fiber," as an index for the performance of the multi-core optical fiber. The Inventor investigated the performance of the multi-core optical fiber using these performance indexes and found the problem that there is no improvement in spectral efficiency per unit sectional area but on the contrary, deterioration thereof occurs.

The present invention has been accomplished in view of the above circumstances and it is an object of the present invention to provide a multi-core optical fiber, multi-core optical fiber cable, and multi-core optical fiber transmission system with a structure for improvement in spectral efficiency per unit sectional area.

A multi-core optical fiber according to an embodiment of the present invention, in each of first to third aspects, comprises a plurality of core parts each extending along a predetermined axis, a cladding integrally covering each of the core parts, and a coating provided on an outer peripheral surface of the cladding.

Particularly, in the multi-core optical fiber according to the first aspect, each of the core parts enables single-mode transmission at a predetermined wavelength. This multi-core optical fiber according to the first aspect preferably satisfies Expression (1) below:

$$\frac{N_{core}}{A_{coat}} \log_2 \left\{ 1 + \frac{\exp(-80\eta_n)}{2.10 \times 10^{10} \left[ \frac{(10^{8\alpha_{dB,n}} - 1)^3}{\alpha_{dB,n} 10^{8\alpha_{dB,n}} |D_n|} \right] \left( \frac{n_{2,n}}{A_{eff,n}} \right)^2 \log } \right. \tag{1}$$

$$\left. + \frac{\left( 5.47 \times 10^3 |D_n| \frac{1 - 10^{-8\alpha_{dB,n}}}{\alpha_{dB,n}} \right)^{\frac{1}{3}}}{[1 - \exp(-80\eta_n)]} \right\} \geq$$

$$7 \times 1.96 \times 10^2,$$

where $\alpha_{dB,n}$ [dB/km] represents a transmission loss at the predetermined wavelength of a predetermined core part n with the largest crosstalk from other core parts out of the plurality of core parts, $n_{2,n}$ [m²/W] a non-linear refractive index of the predetermined core part n at the predetermined wavelength, $A_{eff,n}$ [μm²] an effective area of the predetermined core part n at the predetermined wavelength, $D_n$ [ps/(nm·km)] a chromatic dispersion of the predetermined core part n at the predetermined wavelength, $\eta_n$ [/km] a sum of power coupling coefficients to the predetermined core part n from all the other core parts at the predetermined wavelength, $N_{core}$ the number of core parts in the multi-core optical fiber, and $A_{coat}$ a sectional area of the entire multi-core optical fiber on a cross section perpendicular to the predetermined axis.

In the multi-core optical fiber according to the second aspect as well, each of the core parts enables single-mode transmission at a predetermined wavelength. This multi-core optical fiber according to the second aspect preferably satisfies Expression (2) below:

$$\frac{1}{A_{coat}} \sum_n \log_2 \left\{ 1 + \frac{\exp(-80\eta_n)}{2.10 \times 10^{10} \left[ \frac{(10^{8\alpha_{dB,n}} - 1)^3}{\alpha_{dB,n} 10^{8\alpha_{dB,n}} |D_n|} \right] \left( \frac{n_{2,n}}{A_{eff,n}} \right)^2 \log } \right. \tag{2}$$

$$\left. + \frac{\left( 5.47 \times 10^3 |D_n| \frac{1 - 10^{-8\alpha_{dB,n}}}{\alpha_{dB,n}} \right)^{\frac{1}{3}}}{[1 - \exp(-80\eta_n)]} \right\} \geq$$

$$7 \times 1.96 \times 10^2,$$

where $\alpha_{dB,n}$ [dB/km] represents a transmission loss at the predetermined wavelength of an nth core part out of the plurality of core parts, $n_{2,n}$ [m²/W] a non-linear refractive index of the nth core part at the predetermined wavelength, $A_{eff,n}$ [μm²] an effective area of the nth core part at the predetermined wavelength, $D_n$ [ps/(nm·km)] a chromatic dispersion of the nth core part at the predetermined wavelength, $\eta_n$ [/km] a sum of power coupling coefficients to the nth core part from all the other core parts out of the plurality of core parts at the predetermined wavelength, and $A_{coat}$ a sectional area of the entire multi-core optical fiber on a cross section perpendicular to the predetermined axis.

Furthermore, in the multi-core optical fiber according to the third aspect, as to a transmission loss of a spatial mode not guided with the transmission loss of not more than 1 dB/km at a predetermined wavelength, the transmission loss at the predetermined wavelength is not less than 0.9 dB/m. Particularly, this multi-core optical fiber according to the third aspect preferably satisfies Expression (3) below:

$$\frac{1}{A_{coat}}\sum_n\sum_m \log_2\left\{1+\frac{\exp(-80\eta_n)}{2.10\times 10^{10}\left[\frac{(10^{8\alpha_{dB,n}}-1)^3}{\alpha_{dB,nm}10^{8\alpha_{dB,n}}|D_{nm}|}\right]\left(\frac{n_{2,nm}}{A_{\it{eff},nm}}\right)^2 \log}\right. \tag{3}$$

$$\left.\left(5.47\times 10^3 |D_{nm}|\frac{1-10^{-8\alpha_{dB,nm}}}{\alpha_{dB,nm}}\right)\right]^{\frac{1}{3}}+[1-\exp(-80\eta_n)]\right\} \geq$$

$$7\times 1.96\times 10^2,$$

where $\alpha_{dB,nm}$ [dB/km] represents a transmission loss at the predetermined wavelength of an mth spatial mode guided with the transmission loss of not more than 1 dB/km at the predetermined wavelength out of spatial modes in an nth core part among the plurality of core parts, $n_{2,nm}$ [m²/W] a non-linear refractive index at the predetermined wavelength of the mth spatial mode in the nth core part, $A_{\it{eff},nm}$ [μm²] an effective area at the predetermined wavelength of the mth spatial mode in the nth core part, $D_{nm}$ [ps/(nm·km)] a chromatic dispersion at the predetermined wavelength of the mth spatial mode in the nth core part, $\eta_n$ [/km] a sum of power coupling coefficients to the nth core part from all the other core parts out of the plurality of core parts, and $A_{coat}$ a sectional area of the entire multi-core optical fiber on a cross section perpendicular to the predetermined axis.

As a fourth aspect applicable to at least any one of the first to third aspects, at least any one of the core parts may comprise a microstructure comprised of a plurality of in-core-part inner cores, and an in-core-part inner cladding integrally covering each of the in-core-part inner cores and having a refractive index lower than each of the in-core-part inner cores. A power coupling coefficient between adjacent in-core-part inner cores out of the plurality of in-core-part inner cores forming this microstructure is preferably not less than $10^{-2}$ [/km]. In addition, as a fifth aspect applicable to the fourth aspect, the power coupling coefficient between adjacent in-core-part inner cores out of the plurality of in-core-part inner cores forming the microstructure is preferably not less than 1 [/km].

As a sixth aspect applicable to at least any one of the first to third aspects, as to an effective area of a fundamental mode in at least any one of the core parts, the effective area at the predetermined wavelength is preferably not more than 87 μm². On the other hand, as a seventh aspect applicable to at least any one of the fourth and fifth aspects, as to an effective area of a fundamental mode in at least any one of the in-core-part inner cores, the effective area at the predetermined wavelength is preferably not more than 87 μm².

As an eighth aspect applicable to at least any one of the first to seventh aspects, a depressed layer having a refractive index lower than the cladding may be provided between at least any one core part of the plurality of core parts and the cladding. In this case, the depressed layer is comprised of a solid material with the refractive index lower than the cladding, or comprised of a plurality of voids arranged in the cladding in a state in which the voids surround the core part so that a refractive index thereof on average in a circumferential direction with respect to a central axis of the core part is lower than that of the cladding.

As a ninth aspect applicable to at least any one of the first to seventh aspects, a trench layer having a refractive index lower than the cladding may be provided between at least any one core part of the plurality of core parts and the cladding, and an inner cladding layer having a refractive index lower than the core part and higher than the trench layer may be provided between the core part and the trench layer. In this case, the trench layer is comprised of a solid material with the refractive index lower than the cladding, or comprised of a plurality of voids arranged in the cladding in a state in which the voids surround the core part so that a refractive index thereof on average in a circumferential direction with respect to a central axis of the core part is lower than that of the cladding.

As a tenth aspect applicable to at least any one of the first to ninth aspects, the predetermined wavelength is preferably any wavelength in the range of 1 μm to 2.5 μm. As an eleventh aspect applicable to at least any one of the first to ninth aspects, the predetermined wavelength may be a wavelength in the range of 1.26 μm to 1.65 μm, each of the core parts may be comprised of silica glass, and non-linear refractive indices $n_2$ of the respective core parts at the predetermined wavelength may be in the range of $2\times 10^{-20}$ to $3\times 10^{-20}$ [m²/W]. As a twelfth aspect applicable to the eleventh aspect, each of the core parts may be doped with $GeO_2$ and in this case, the non-linear refractive indices $n_2$ can be about $2.3\times 10^{-20}$ [m²/W]. On the contrary, as a thirteenth aspect applicable to the eleventh aspect, each of the core parts may not be doped with $GeO_2$ and in this case, the non-linear refractive indices $n_2$ may be about $2.2\times 10^{-20}$ [m²/W].

As a fourteenth aspect applicable to at least any one of the eleventh to thirteenth aspects, as to a transmission loss of a fundamental mode in each of the core parts, the transmission loss at the wavelength of 1550 nm is preferably not more than 0.195 dB/km, a difference of the transmission loss between different core parts out of the plurality of core parts is preferably at most 0.02 dB/km or less, and as to a chromatic dispersion of the fundamental mode in each of the core parts, the chromatic dispersion at the wavelength of 1550 nm is preferably not less than 17 ps/(nm·km). Particularly, in this fourteenth aspect, when $r_{om}$ represents a distance between a center of a core part which is the most distant from a center of the multi-core optical fiber, out of the plurality of core parts, and the center of the multi-core optical fiber, $\Lambda$ the shortest distance of center-to-center distances between two core parts out of the plurality of core parts, and $N_{core}$ the number of core parts in the multi-core optical fiber, a bending loss $\alpha_{R7.5}$ [dB/m] at the wavelength of 1550 nm in a radius of 7.5 mm of the fundamental mode in any one of the core parts is preferably not more than 10 dB/m, and a relation between a product $R_{pack}\cdot R_{\it{eff}}$ of an effective core packing rate $R_{pack}$ and a core arrangeable region ratio $R_{\it{eff}}$ defined by Expressions (4) and (5) below:

$$R_{pack} = \frac{\sqrt{3}}{\pi}\frac{N_{core}}{(2r_{om}/\Lambda+1)^2}; \tag{4}$$

$$R_{\it{eff}} = \frac{\pi(r_{om}+\Lambda/2)^2}{\pi r_{coat}^2} = \frac{(r_{om}+\Lambda/2)^2}{r_{coat}^2} = \frac{(r_{om}+\Lambda/2)^2}{(r_{om}+d_{clad}+d_{coat})}, \tag{5}$$

and $\alpha_{R7.5}$ [dB/m] preferably satisfies Expression (6) below:

$$\alpha_{R7.5} \leq 2.69\times 10^8 \exp\left(-6.46\times 10^{-1}\frac{7}{R_{pack}R_{\it{eff}}}\right). \tag{6}$$

As a fifteenth aspect applicable to the fourteenth aspect, as to a bending loss in a radius of 5 mm of a fundamental mode in at least any one of the core parts, the bending loss $\alpha_{R5}$ [dB/m] at the wavelength of 1550 nm is preferably not more than 10 dB/m. Furthermore, in this fifteenth aspect, the relation between the product $R_{pack} \cdot R_{eff}$ of the effective core packing rate $R_{pack}$ and the core arrangeable region ratio $R_{eff}$, and $\alpha_{R5}$ [dB/m] preferably satisfies Expression (7) below:

$$\alpha_{R5} \leq 1.07 \times 10^9 \exp\left(-5.46 \times 10^{-1} \frac{7}{R_{pack} R_{eff}}\right). \tag{7}$$

As a sixteenth aspect applicable to the fourteenth or fifteenth aspect, the product $R_{pack} \cdot R_{eff}$ of the effective core packing rate $R_{pack}$ and the core arrangeable region ratio $R_{eff}$ is preferably not less than about ⅛.

As a seventeenth aspect applicable to at least any one of the first to sixteenth aspects, the number of spatial modes guided without effectively being cut off in each of the core parts may be constant in the wavelength range of 1530 nm to 1550 nm, the predetermined wavelength may be 1550 nm, and $\eta_n$ at the predetermined wavelength may be in the range of about $5.3 \times 10^{-9}$/km to about $1.7 \times 10^{-5}$/km. Similarly, as an eighteenth aspect applicable to at least any one of the first to sixteenth aspects, the number of spatial modes guided without effectively being cut off in at least any one of the core parts may be constant in the wavelength range of 1530 nm to 1565 nm, the predetermined wavelength may be 1565 nm, and $\eta_n$ at the predetermined wavelength may be in the range of about $1.5 \times 10^{-8}$/km to about $1.7 \times 10^{-5}$/km. Furthermore, as a nineteenth aspect applicable to at least any one of the first to sixteenth aspects, the number of spatial modes guided without effectively being cut off in at least any one of the core parts may be constant in the wavelength range of 1530 nm to 1625 nm, the predetermined wavelength may be 1625 nm, and $\eta_n$ at the predetermined wavelength may be in the range of about $9.7 \times 10^{-8}$/km to about $1.7 \times 10^{-5}$/km.

As a twentieth aspect applicable to at least any one of the first to nineteenth aspects, an outside diameter of the cladding may be not less than about 125 μm and not more than about 225 μm and a thickness of the coating may be not more than about 42.5 μm.

As a twenty first aspect, a multi-core optical fiber cable according to an embodiment of the present invention may comprise a structure internally comprising the multi-core optical fiber according to at least any one of the first to twentieth aspects as described above.

As a more specific configuration of this twenty first aspect, the multi-core optical fiber cable according to twenty second to twenty fourth aspects internally comprises a plurality of multi-core optical fibers, a sheath integrally covering the plurality of internal multi-core optical fibers, and a tension member extending along a central axis of the multi-core optical fiber cable. Each of the internal multi-core optical fibers has the same structure as the multi-core optical fiber according to at least any one of the first to twentieth aspects as described above.

Particularly, in the multi-core optical fiber cable according to the twenty second aspect, each of the multi-core optical fibers comprises a plurality of core parts each extending along a predetermined axis, a cladding integrally covering each of the core parts, and a coating provided on an outer peripheral surface of the cladding, and each of the core parts enables single-mode transmission at a predetermined wavelength. When in a kth multi-core optical fiber out of the plurality of multi-core optical fibers, $\alpha_{dB,kn}$ [dB/km] represents a transmission loss at the predetermined wavelength of a predetermined core part n with the largest crosstalk from other cores out of the plurality of core parts, $n_{2,kn}$ [m²/W] a non-linear refractive index of the core part n at the predetermined wavelength, $A_{eff,kn}$ [μm²] an effective area of the core part n at the predetermined wavelength, $D_{kn}$ [ps/(nm·km)] a chromatic dispersion of the core part n at the predetermined wavelength, $\eta_n$ [/km] a sum of power coupling coefficients to the predetermined core part n from all the other core parts at the predetermined wavelength, and $N_{core,k}$ the number of core parts in the kth multi-core optical fiber, and when $A_{cable}$ represents a sectional area of the entire multi-core optical fiber cable perpendicular to the central axis, the multi-core optical fiber cable according to this twenty second aspect preferably satisfies Expression (8) below:

$$\frac{1}{A_{cable}} \sum_k N_{core,k} \log_2 \tag{8}$$

$$\left\{1 + \frac{\exp(-80\eta_{kn})}{2.10 \times 10^{10} \left[\frac{(10^{8\alpha_{dB,kn}} - 1)^3}{\alpha_{dB,kn} 10^{8\alpha_{dB,kn}} |D_{kn}|}\left(\frac{n_{2,kn}}{A_{eff,kn}}\right)^2\right]}\right.$$
$$\left.\log\left(5.47 \times 10^3 |D_{kn}| \frac{1 - 10^{-8\alpha_{dB,kn}}}{\alpha_{dB,kn}}\right)\right]^{\frac{1}{3}} +$$
$$\left.[1 - \exp(-80\eta_{kn})]\right\} \geq$$

$$\frac{2.5}{20.4} 1.96 \times 10^2.$$

In the multi-core optical fiber cable according to the twenty third aspect as well, each of the multi-core optical fibers comprises a plurality of core parts each extending along a predetermined axis, a cladding integrally covering the core parts, and a coating provided on an outer peripheral surface of the cladding, and each of the core parts enables single-mode transmission at a predetermined wavelength. When in a kth multi-core optical fiber out of the plurality of multi-core optical fibers, $\alpha_{dB,kn}$ [dB/km] represents a transmission loss at the predetermined wavelength of an nth core part out of the plurality of core parts, $n_{2,kn}$ [m²/W] a non-linear refractive index of the nth core part at the predetermined wavelength, $A_{eff,kn}$ [μm²] an effective area of the nth core part at the predetermined wavelength, $D_{kn}$ [ps/(nm·km)] a chromatic dispersion of the nth core part at the predetermined wavelength, and $\eta_{kn}$ [/km] a sum of power coupling coefficients to the nth core part from all the other core parts out of the plurality of core parts at the predetermined wavelength, and when $A_{coat}$ represents a sectional area of the entire multi-core optical fiber cable perpendicular to the central axis, the multi-core optical fiber cable according to this twenty third aspect preferably satisfies Expression (9) below:

$$\frac{1}{A_{cable}} \tag{9}$$

$$\sum_k \sum_n \log_2 \left\{1 + \frac{\exp(-80\eta_{kn})}{2.10 \times 10^{10}\left[\frac{(10^{8\alpha_{dB,kn}} - 1)^3}{\alpha_{dB,kn} 10^{8\alpha_{dB,kn}} |D_{kn}|}\left(\frac{n_{2,kn}}{A_{eff,kn}}\right)^2\right]}\right.$$
$$\left.\log\left(5.47 \times 10^3 |D_{kn}| \frac{1 - 10^{-8\alpha_{dB,kn}}}{\alpha_{dB,kn}}\right)\right]^{\frac{1}{3}} +$$
$$\left.[1 - \exp(-80\eta_{kn})]\right\} \geq$$

$$\frac{2.5}{20.4} 1.96 \times 10^2.$$

On the other hand, in the multi-core optical fiber cable according to the twenty fourth aspect, each of the plurality of multi-core optical fibers comprises a plurality of core parts each extending along a predetermined axis, a cladding integrally covering the plurality of the core parts, and a coating provided on an outer peripheral surface of the cladding, and as to a transmission loss of a spatial mode not guided with the transmission loss of not more than 1 dB/km at a predetermined wavelength, the transmission loss at the predetermined wavelength is not less than 0.9 dB/m. When in a kth multi-core optical fiber out of the plurality of multi-core optical fibers, $\alpha_{dB,knm}$ [dB/km] represents a transmission loss at the predetermined wavelength of an mth spatial mode guided with the transmission loss of not more than 1 dB/km at the predetermined wavelength out of spatial modes in an nth core part among the plurality of core parts, $n_{2,knm}$ [m$^2$/W] a non-linear refractive index at the predetermined wavelength of the mth spatial mode in the nth core part, $A_{eff,knm}$ [μm$^2$] an effective area at the predetermined wavelength of the mth spatial mode in the nth core part, $D_{knm}$ [ps/(nm·km)] a chromatic dispersion at the predetermined wavelength of the mth spatial mode in the nth core part, and $\eta_{kn}$ [/km] a sum of power coupling coefficients to the nth core part from all the other core parts out of the plurality of core parts at the predetermined wavelength, and when $A_{cable}$ represents a sectional area of the entire multi-core optical fiber cable perpendicular to the central axis, the multi-core optical fiber cable according to this twenty fourth aspect preferably satisfies Expression (10) below:

$$\frac{1}{A_{cable}} \sum_k \sum_n \sum_m \log_2 \left\{ 1 + \frac{\exp(-80\eta_{kn})}{2.10 \times 10^{10} \left[ \frac{(10^{8\alpha_{dB,knm}} - 1)^3}{\alpha_{dB,knm} 10^{8\alpha_{dB,knm}} |D_{knm}|} \left(\frac{n_{2,knm}}{A_{eff,knm}}\right)^2 \right] \log\left(5.47 \times 10^3 |D_{knm}| \frac{1 - 10^{-8\alpha_{dB,knm}}}{\alpha_{dB,knm}}\right)^{\frac{1}{3}} + [1 - \exp(-80\eta_{knm})]} \right\} \geq \frac{2.5}{20.4} 1.96 \times 10^2. \quad (10)$$

As a twenty fifth aspect applicable to at least any one of the twenty second to twenty fourth aspects, in each of the plurality of internal multi-core optical fibers, the predetermined wavelength is preferably any one wavelength in the range of 1.26 μm to 1.65 μm, each of the core parts is preferably comprised of silica glass, and non-linear refractive indices $n_2$ of the respective core parts at the predetermined wavelength are preferably in the range of 2×10$^{-20}$ to 3×10$^{-20}$ [m$^2$/W]. As a twenty sixth aspect applicable to the twenty fifth aspect, each of the core parts may be doped with GeO$_2$ and in this case, the non-linear refractive indices $n_2$ are preferably about 2.3×10$^{-20}$ [m$^2$/W]. As a twenty seventh aspect applicable to the twenty fifth aspect, each of the core parts may not be doped with GeO$_2$ and in this case, the non-linear refractive indices $n_2$ are preferably about 2.2×10$^{-20}$ [m$^2$/W].

As a twenty eighth aspect, a multi-core optical fiber transmission system according to an embodiment of the present invention comprises the multi-core optical fiber according to at least any one of the first to twentieth aspects or the multi-core optical fiber cable according to at least any one of the twenty first to twenty seventh aspects, as a transmission line, and is configured to transmit signals by spatial multiplexing.

As a twenty ninth aspect applicable to the twenty eighth aspect, in the multi-core optical fiber transmission system, modulation methods are preferably optimized for respective wavelengths of signal light during multiple wavelength transmission, so as to implement wavelength multiplexing of signal light of different modulation methods. As a thirtieth aspect applicable to the twenty eighth or twenty ninth aspect, the multi-core optical fiber transmission system may comprise an optical amplification repeater including an optical fiber for amplification. The optical amplification repeater amplifies light attenuated through propagation in the multi-core optical fiber or in the multi-core optical fiber cable, on the transmission line. Particularly, in this thirtieth aspect, a difference between a mode field diameter of any one of the core parts in the multi-core optical fiber or in any one multi-core optical fiber in the multi-core optical fiber cable, and a mode field diameter of a core of the optical amplification repeater is preferably not more than 1 μm, in order to avoid unwanted increase of transmission loss.

DESCRIPTION OF THE PREFERRED EMBODIMENTS

Figure 1:
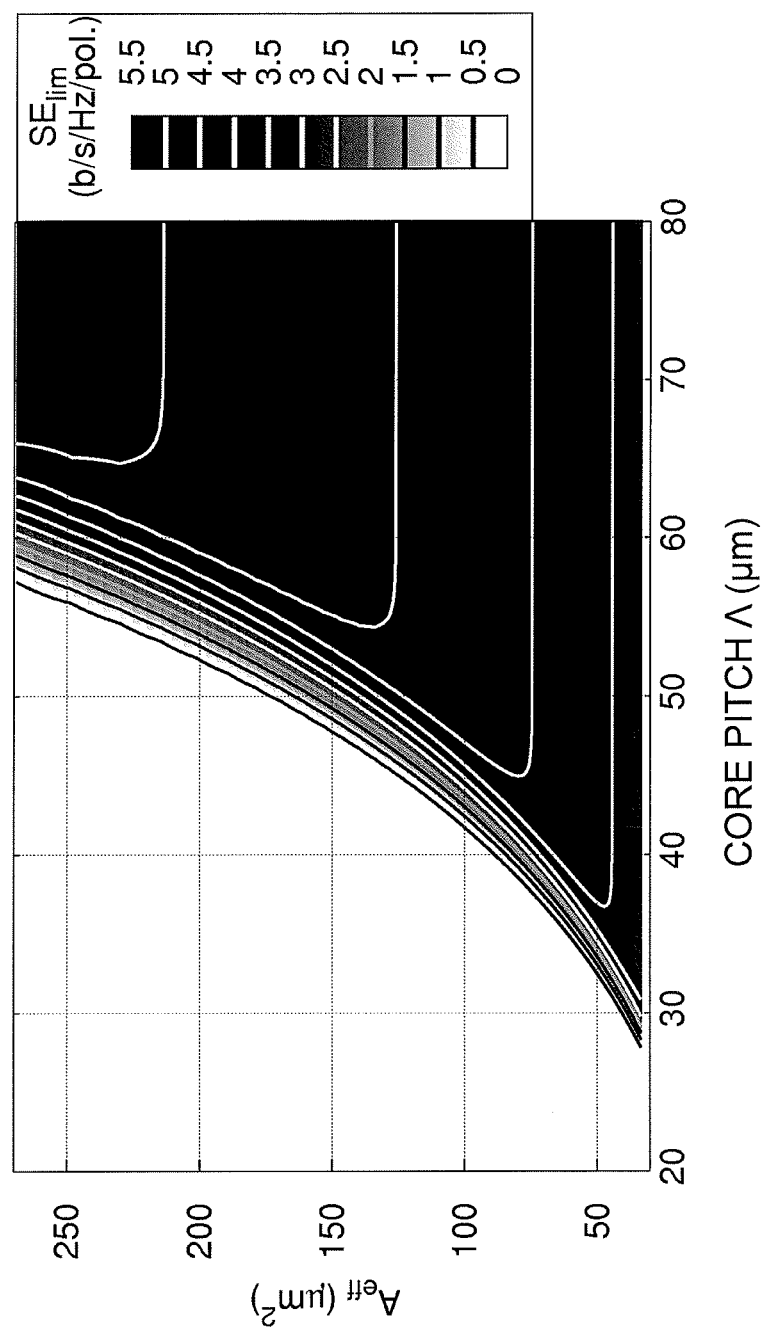
FIG. 1 is a drawing showing dependences of $SE_{lim}$ on effective core sectional area $A_{eff}$ and shortest core pitch Λ in single-core optical fibers.

Embodiments of the present invention will be described below in detail with reference to the accompanying drawings. The same elements will be denoted by the same reference signs in the description of the drawings, without redundant description.

(1—Spectral Efficiency of Single-Core Optical Fiber)

The multi-core optical fiber according to an embodiment of the present invention is one improved in spectral efficiency per unit sectional area of fiber, and, prior to discussion on the spectral efficiency per unit sectional area of the multi-core optical fiber, let us first study a single-mode single-core optical fiber having one core and a cladding provided around it.

In the case of the fiber having one core, the limit of Spectral Efficiency SE (frequency usage efficiency) can be obtained from the Shannon limit and is expressed by Expression (11) below.

$$SE = \log_2(1+SNR) \quad (11)$$

It is noted herein that the relation between Signal-to-Noise Ratio SNR and Optical Signal-to-Noise Ratio OSNR can be expressed by Expression (12) below, based on Formula (39) in Literature R.-J. Essiambre et al., "Capacity limits of optical fiber networks," Journal of Lightwave Technol., vol. 28, no. 4, pp. 662-701 (2010) (which will be referred to hereinafter as Reference Literature 1).

$$SNR = \frac{2B_{ref}}{pR_s} OSNR \quad (12)$$

In this formula, $B_{ref}$ represents a reference band of OSNR and $R_S$ a symbol rate. The reference band is generally 12.48 GHz (0.1 nm around the wavelength of 1550 nm). Furthermore, p is a numeral that indicates the number of polarization signals responsible for noise of two polarizations; p=2 in the case with polarization multiplexing; p=1 in the case without polarization multiplexing. In the case of SNR, the bands of signal and noise are equal, whereas in the case of OSNR, the band of noise is defined by the reference band.

The relation of SE and OSNR per polarization in the case with polarization multiplexing is thus given by Expression (13) below.

$$SE = \log_2\left(1 + \frac{B_{ref}}{R_s} OSNR\right) \quad (13)$$

It is, however, not the case in fact that OSNR improves with increase in intensity of signal light injected into the optical fiber, so as to result in improvement of SE. It is known that the increase in intensity of signal light leads to generation of noise due to non-linearity of fiber, so as to degrade OSNR and SE (cf. Reference Literature 1).

Let us consider herein a situation in which signals are transmitted by Nyquist WDM (wavelength division multiplexing) using a transmission line composed of a dispersion uncompensated single-mode optical fiber and an erbium-doped optical fiber amplifier (EDFA) only, and calculate a so-called non-linear Shannon limit with consideration to influence of noise due to non-linearity for this situation, using the relation between input light power and OSNR described in Pierluigi Poggiolini et al., "Analytical Modeling of Nonlinear Propagation in Uncompensated Optical Transmission Links," Photon. Technol. Lett., vol. 23, no. 11, pp. 742-744 (2011) (which will be referred to hereinafter as Reference Literature 2). In the above condition, the relation between OSNR and input power $P_{TX,ch}$ of signal light can be expressed by Expressions (14) to (16) below, based on the description in Reference Literature 2. In this relation, $P_{ASE}$ represents ASE noise due to EDFA, and $P_{NLI}$ interference noise due to non-linearity. $N_s$ represents the number of spans, G an EDFA gain, F NF (Noise Figure) of EDFA, $\eta$ planck's constant, $\nu$ frequency of light, $B_n = B_{ref}$, $\beta_2$ chromatic dispersion, and $R_S$ the symbol rate. $\gamma$ is a non-linear index of the fiber expressed by $n_2\omega/(cA_{eff})$, using the speed of light c, the angular frequency of light $\omega$, and the non-linear refractive index $n_2$.

$$OSNR = \frac{P_{TX,ch}}{P_{ASE} + P_{NLI}} \quad (14)$$

$$P_{ASE} = G_{ASE}B_n = [N_s(G-1)Fh\nu]B_n \quad (15)$$

$$P_{NLI} = \left(\frac{2}{3}\right)^3 N_s \gamma^2 L_{eff} P_{TX\_ch}^3 \frac{\log(\pi^2|\beta_2|L_{eff}N_{ch}^2R_s^2)}{\pi|\beta_2|R_s^3} B_n \quad (16)$$

G and $L_{eff}$ satisfy the relations of Expressions (17) and (18) below. $\alpha$ represents a transmission loss and $L_s$ a span length.

$$G = e^{\alpha L_s} \quad (17)$$

$$L_{eff} = \frac{1 - e^{-\alpha L_s}}{\alpha} \quad (18)$$

By substituting the foregoing Expressions (14) to (17) into Expressions (12) and (13) and rearranging them, we obtain Expressions (19) and (20) below.

$$SNR = \frac{P_{Tx,ch}}{P_{ASE}|_{B_n=R_z} + P_{NLI}|_{B_n=R_s}} = \quad (19)$$

$$\frac{P_{Tx,ch}}{[N_s(e^{\alpha L_s}-1)Fh\nu]R_s + \left(\frac{2}{3}\right)^3 N_s \gamma^2 L_{eff} P_{Tx,ch}^3 \frac{\log(\pi^2|\beta_2|L_{eff}N_{ch}^2R_s^2)}{\pi|\beta_2|R_s^2}}$$

$$SE = \log_2\left(1 + \frac{P_{Tx,ch}}{[N_s(e^{\alpha L_s}-1)Fh\nu]R_s + \left(\frac{2}{3}\right)^3 N_s \gamma^2 L_{eff} P_{Tx,ch}^3 \frac{\log(\pi^2|\beta_2|L_{eff}N_{ch}^2R_s^2)}{\pi|\beta_2|R_s^2}}\right) \quad (20)$$

The foregoing Expression (19) can be expressed in the form of Expressions (21) to (23) below.

$$SNR(P_{Tx,ch}) = \frac{P_{Tx,ch}}{A + NP_{Tx,ch}^3} \quad (21)$$

$$A = [N_s(e^{\alpha L_s}-1)Fh\nu]R_s \quad (22)$$

$$N = \left(\frac{2}{3}\right)^3 N_s \gamma^2 L_{eff} \frac{\log(\pi^2|\beta_2|L_{eff}N_{ch}^2R_s^2)}{\pi|\beta_2|R_s^2} \quad (23)$$

Therefore, when $P_{TX,ch}$ for a maximum of SNR is derived from Expression (21), it is seen that the maximum is taken with Expression (24), and the maximum $SNR_{max}$ at that time is given by Expression (25).

$$P_{TX,ch} = \left(\frac{A}{2N}\right)^{\frac{1}{3}} \quad (24)$$

$$SNR_{max} = \left[3\left(\frac{A}{2}\right)^{\frac{2}{3}} N^{\frac{1}{3}}\right]^{-1} \quad (25)$$

As a result, a maximum $SE_{lim}$ of Expression (20) can be obtained like Expression (26). It is noted that $B_o = N_{ch}R_S$ indicates an overall signal band.

$$SE_{lim} = \log_2\left[1 + \left(3\left\{\frac{[N_s(e^{\alpha L_s}-1)Fh\nu]R_s}{2}\right\}^{\frac{2}{3}}\right.\right. \quad (26)$$

$$\left.\left.\left[\left(\frac{2}{3}\right)^3 N_s \gamma^2 L_{eff} \frac{\log(\pi^2|\beta_2|L_{eff}N_{ch}^2R_s^2)}{\pi|\beta_2|R_s^2}\right]^{\frac{1}{3}}\right)^{-1}\right]$$

$$= \log_2\left[1 + \left\{N_s[(e^{\alpha L_s}-1)Fh\nu]^{\frac{2}{3}}\right.\right.$$

$$\left.\left.\left[2\gamma^2 L_{eff}\frac{\log(\pi^2|\beta_2|L_{eff}B_o^2)}{\pi|\beta_2|}\right]^{\frac{1}{3}}\right\}^{-1}\right]$$

Since the above calculation concerned the polarization multiplexing case as a premise, doubles of Expressions (20) and (26) give the non-linear Shannon limit and maximum thereof for two channels (two polarizations), i.e., those per core.

(2—Spectral Efficiency Per Core in Multi-Core Optical Fiber: Part 1)

Based on the above result, let us discuss the spectral efficiency per core in the multi-core optical fiber. Let us study herein a situation in which input light is assumed not to be attenuated by crosstalk.

In this case, the intensity of crosstalk light, $P_{XT}$, is added as a noise component to the noise in Expression (19), and SNR in this case is given by Expression (27).

$$SNR = \frac{P_{Tx,ch}}{P_{ASE}|_{B_n=R_s} + P_{NLI}|_{B_n=R_s} + P_{XT}} \quad (27)$$

When the crosstalk X is defined by Expression (28), the foregoing Expression (27) can be expressed as Expression (29).

$$X = \frac{P_{XT}}{P_{signal}} = \frac{P_{XT}}{P_{Tx,ch}} \quad (28)$$

$$SNR = \frac{P_{Tx,ch}}{[N_s(e^{\alpha L_s}-1)Fh\nu]R_s + \left(\frac{2}{3}\right)^3 N_s \gamma^2 L_{eff} P_{Tx,ch}^3 \frac{\log(\pi^2|\beta_2|L_{eff}N_{ch}^2R_s^2)}{\pi|\beta_2|R_s^2} + XP_{Tx,ch}} \quad (29)$$

The foregoing Expression (29) herein can be expressed in the form of Expression (30) below.

$$SNR(P_{Tx,ch}) = \frac{P_{Tx,ch}}{A + NP_{Tx,ch}^3 + XP_{Tx,ch}} \quad (30)$$

Although this Expression (30) has the difference in the form from Expression (21), $P_{TX,ch}$ for a maximum thereof is the same as Expression (24). Using this value, the maximum is given by Expression (31) and $SE_{lim}$ per polarization is given by Expression (32) below.

$$SNR_{max} = \left[3\left(\frac{A}{2}\right)^{\frac{2}{3}} N^{\frac{1}{3}} + X\right]^{-1} \quad (31)$$

$$SE_{lim} = \quad (32)$$
$$\log_2\left[1 + \left\{N_s[(e^{\alpha L_s} - 1)Fh\nu]^{\frac{2}{3}}\left[2\gamma^2 L_{eff}\frac{\log(\pi^2|\beta_2|L_{eff}B_o^2)}{\pi|\beta_2|}\right]^{\frac{1}{3}} + X\right\}^{-1}\right]$$

(3—Spectral Efficiency Per Core in Multi-Core Optical Fiber: Part 2)

Next, let us discuss the spectral efficiency per core with consideration to attenuation due to crosstalk of input light in the multi-core optical fiber.

It is known that the intensity of light in the cores of the multi-core optical fiber varies in the longitudinal direction of the optical fiber in accordance with the coupled-power equation. This is described, for example, in K. Takenaga et al., "An investigation on crosstalk in multi-core fibers by introducing random fluctuation along longitudinal direction," IEICE Trans. Commun., vol. E94-B, no. 2, pp. 409-416 (2011) (which will be referred to hereinafter as Reference Literature 3). Specifically, it is described in Reference Literature 3 that, for example, in the case of a 7-core optical fiber in which seven cores are arranged in a triangular grid pattern, when η represents the power coupling coefficient between a center core and a peripheral core and L a fiber length, a ratio of optical power in the peripheral core to optical power in the center core with incidence of light into only the center core, becomes a value obtained by Expression (33) below.

$$X_P = \frac{1 - \exp(-7\eta L)}{1 + 6\exp(-7\eta L)} \quad (33)$$

Next, let us discuss the crosstalk to the center core. When in the foregoing Expression (28) $P_{signal}$ is considered to be the power of light propagating in the center core and $P_{XT}$ the power of light injected into the peripheral core from the power of light propagating in the center core, the crosstalk to the center core is considered to take a value shown by Expression (34) below.

$$X = \frac{6 - 6\exp(-7\eta L)}{1 + 6\exp(-7\eta L)} \quad (34)$$

However, since in the foregoing Expression (34), $P_{signal}$ is defined in the form including the intensity of light again coupled to the center core after injected into the center core and once coupled to the peripheral core, it is considered to take an inaccurate value if the core-to-core crosstalk is large. Therefore, this can be an error factor in Expressions (31) and (32).

Therefore, we will discuss expressions solving the above problem. When signal light of almost equivalent power is injected into all the cores forming the multi-core optical fiber, power couplings among the cores come to equilibrium from the beginning and thus an average of optical power in each core is kept equal even after propagation through a long distance. However, the signal power of each core is exchanged with the other cores in accordance with the power coupling coefficients and the power of signal light without coupling to the other cores decreases quickly. It is considered from this fact that the power $P_{signal}$ of signal light in the center core decreases with a factor of exp(-6ηL). On the contrary, light of a rate indicated by [1-exp(-6ηL)] is considered to be the power $P_{coupled}$ of light through one or more couplings. When SNR is calculated with consideration to this point, we can derive Expressions (35) to (38) below.

$$SNR = \frac{P_{signal}}{P_{ASE}|_{B_n=R_s} + P_{NLI}|_{B_n=R_s} + P_{coupled}} \quad (35)$$

$$P_{signal} = P_{Tx,ch}\exp(-6\eta N_s L_s) \quad (36)$$

$$P_{coupled} = P_{Tx,ch}[1 - \exp(-6\eta N_s L_s)] \quad (37)$$

$$SNR = \frac{P_{Tx,ch}\exp(-6\eta N_s L_s)}{P_{ASE}|_{B_n=R_s} + P_{NLI}|_{B_n=R_s} + P_{Tx,ch}[1 - \exp(-6\eta N_s L_s)]} \quad (38)$$

Furthermore, using Expression (38), the maximum of SNR is given by Expression (39) and $SE_{lim}$ per polarization by Expression (40).

$$SNR_{max} = \frac{\exp(-6\eta N_s L_s)}{N_s[(e^{\alpha L_s} - 1)Fh\nu]^{\frac{2}{3}}\left[2\gamma^2 L_{eff}\frac{\log(\pi^2|\beta_2|L_{eff}B_o^2)}{\pi|\beta_2|}\right]^{\frac{1}{3}} + [1 - \exp(-6\eta N_s L_s)]} \quad (39)$$

$$SE_{lim} = \log_2\left[1 + \frac{\exp(-6\eta N_s L_s)}{N_s[(e^{\alpha L_s} - 1)Fh\nu]^{\frac{2}{3}}\left[2\gamma^2 L_{eff}\frac{\log(\pi^2|\beta_2|L_{eff}B_o^2)}{\pi|\beta_2|}\right]^{\frac{1}{3}} + [1 - \exp(-6\eta N_s L_s)]}\right] \quad (40)$$

The difference between Expression (32) and Expression (40) is negligible if the crosstalk is sufficiently small (e.g., −20 dB or less), but if the crosstalk is large, it is considered that Expression (40) is a mathematical expression with more accurate consideration to influence of crosstalk, and then $SE_{lim}$ per polarization will be calculated and discussed below using Expression (40).

In Expression (40), the smaller the transmission loss α, the higher $SE_{lim}$; the larger the absolute value of chromatic dispersion $\beta_2$, the higher $SE_{lim}$. Therefore, the transmission loss in the multi-core optical fiber is preferably not more than at least that of a standard single-mode optical fiber, i.e., not more than 0.195 dB/km at the wavelength of 1550 nm in terms of improvement of $SE_{lim}$, more preferably not more than that of a low-loss pure-silica-core optical fiber, i.e., less than 0.180 dB/km at the wavelength of 1550 nm in terms of improvement of $SE_{lim}$, and still more preferably not more than that of an ultra-low-loss pure-silica-core optical fiber, i.e., less than 0.170 dB/km at the wavelength of 1550 nm in terms of improvement of $SE_{lim}$. Similarly, the chromatic dispersion D in the multi-core optical fiber is preferably not less than at least that of the standard single-mode optical fiber, i.e., not less than 17 ps/(nm·km) at the wavelength of 1550 nm in terms of improvement of $SE_{lim}$, and more preferably not less than that of a cutoff wavelength shifted fiber for large capacity transmission, i.e., not less than 20 ps/(nm·km) at the wavelength of 1550 nm in terms of improvement of $SE_{lim}$.

(4—Spectral Efficiency Per Unit Sectional Area of Multi-Core Optical Fiber)

Let us calculate a total $SE_{lim}$ per unit sectional area (limit of spatial spectral efficiency $SSE_{lim}$), using the $SE_{lim}$ calculated by the foregoing Expression (40). First, let us consider an example where a fiber is provided with a plurality of cores and each core operates in a single mode at a wavelength used. In this case, a power coupling coefficient η between two specific cores embedded in the multi-core optical fiber is calculated by Expression (41) below, where κ is a mode coupling coefficient between the two cores, β a propagation constant of each of the two cores, Λ a pitch between the two cores, and R an average bending radius between the ends of the fiber.

$$\eta = \kappa^2 \frac{2}{\beta} \frac{R}{\Lambda} \quad (41)$$

It is assumed herein that the multi-core optical fiber of an identical core type is fully twisted around the axis along the longitudinal direction. On the other hand, according to J. M. Fini et al., "Crosstalk in multi-core optical fibres" in ECOC2011, paper Mo. 1. LeCervin. 4. (which will be referred to hereinafter as Reference Literature 5), the power coupling coefficient η of a standard multi-core optical fiber can be expressed by Expression (42) below. In this formula, $S_{ff}$ represents a power spectrum of phase modulation components in the fiber longitudinal direction, which is caused by perturbation varying in the fiber longitudinal direction, such as fiber bending, twist, and structure dispersion, $\Delta\beta_{m,n}$ a propagation constant difference between cores, and $S_{ff}(\Delta\beta_{m,n})$ the degree of occurrence of phase matching between cores.

$$\eta = \kappa^2 S_{ff}(\Delta\beta_{m,n}) \quad (42)$$

By comparison between Expression (41) and Expression (42), $S_{ff}(\Delta\beta_{m,n})$ in Expression (42) corresponds to $(2/\beta) \cdot (R/\Lambda)$ in Expression (41) and therefore the relation represented by Expression (43) below holds in the case of the identical-core type multi-core optical fiber (i.e., in the case of $\Delta\beta_{m,n}=0$). In general, without being limited to the identical-core type multi-core optical fiber, the power coupling coefficient can be expressed by a simple formula represented by Expression (45), while introducing an equivalent bending radius $R_0$ with which the relation represented by Expression (44) holds.

$$S_{ff}(0) = \frac{2}{\beta} \frac{R}{\Lambda} \quad (43)$$

$$S_{ff}(\Delta\beta_{m,n}) = \frac{2}{\beta} \frac{R_0}{\Lambda} \quad (44)$$

$$\eta = \kappa^2 \frac{2}{\beta} \frac{R_0}{\Lambda} \quad (45)$$

In a state in which the multi-core optical fiber is laid, $R_0$ is considered to be approximately from 0.3 m to 3 m. Therefore, the power coupling coefficient η is considered to be one obtained by substituting any value selected from the range of 0.3 to 3 into $R_0$ in the foregoing Expression (45).

The below will describe the result of investigation in the case where a transmission line with 80 km spans and an overall length (fiber link length $L=N_s L_s$) of 3200 km is constructed using the multi-core optical fiber in which step-index type cores with the transmission loss of 0.18 dB and $\lambda_{cc}=1530$ nm are arranged in a triangular grid pattern; the crosstalk is calculated using Expression (45) on the assumption of perturbation equivalent to $R_0=1$ m; Nyquist WDM signals are transmitted with NF of EDFA being 6 dB and with the overall signal band $B_o$ being 10 THz. It is assumed herein that $n_2$ is $2.34 \times 10^{-20}$ m$^2$/W.

FIG. 1 shows dependences of $SE_{lim}$ on $A_{eff}$ and the shortest core pitch Λ. It is shown by FIG. 1 that $SE_{lim}$ quickly changes with change in the shortest core pitch Λ. This change is due to change of crosstalk. It is also seen that with increase in $A_{eff}$ the shortest core pitch Λ needs to increase in order to suppress influence of crosstalk and at the same time the maximum of $SE_{lim}$ also increases.

Next, let us investigate dependences of the total $SE_{lim}$ per unit sectional area (the limit of spatial spectral efficiency $SSE_{lim}$) on $A_{eff}$ and the shorted core pitch Λ.

Figure 2:
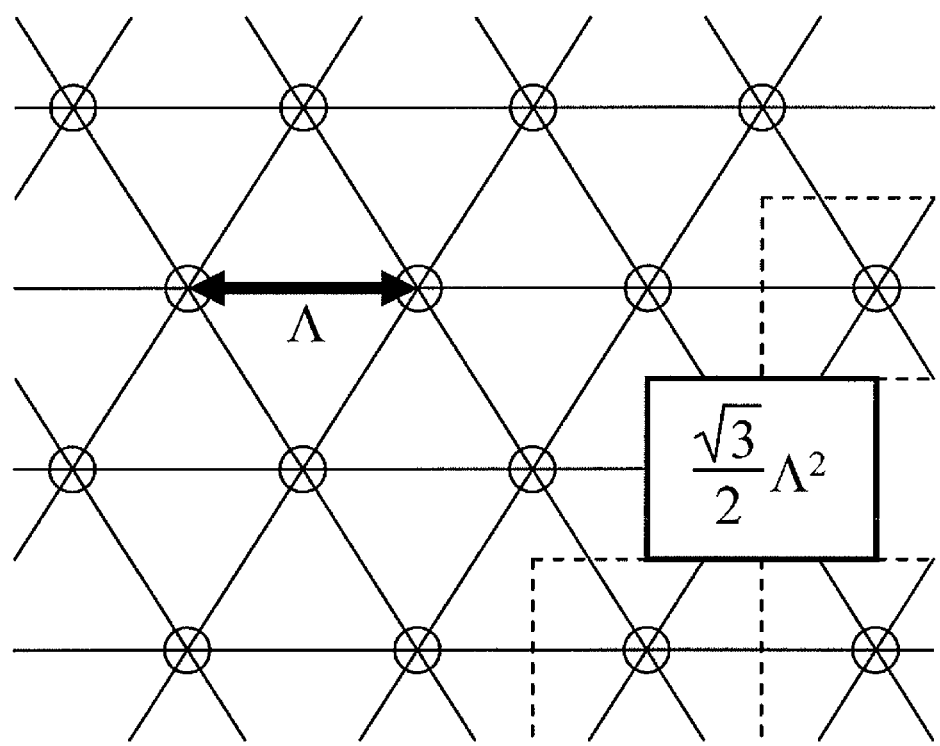
FIG. 2 is a drawing for explaining an example of infinite packing of cores.

As a premise, let us consider a situation in which cores are ideally infinitely packed, as shown in FIG. 2. A possessed sectional area per core (an area of a region enclosed by a dashed line centered on one core in FIG. 2) is given by $(3^{1/2}/2)\Lambda^2$ using the core pitch Λ, and thus the limit of spatial spectral efficiency $SSE_{lim}$ takes a value represented by Expression (46).

$$SSE_{lim} = \frac{SE_{lim}}{\Lambda^2 \sqrt{3}/2} \quad (46)$$

Figure 3:
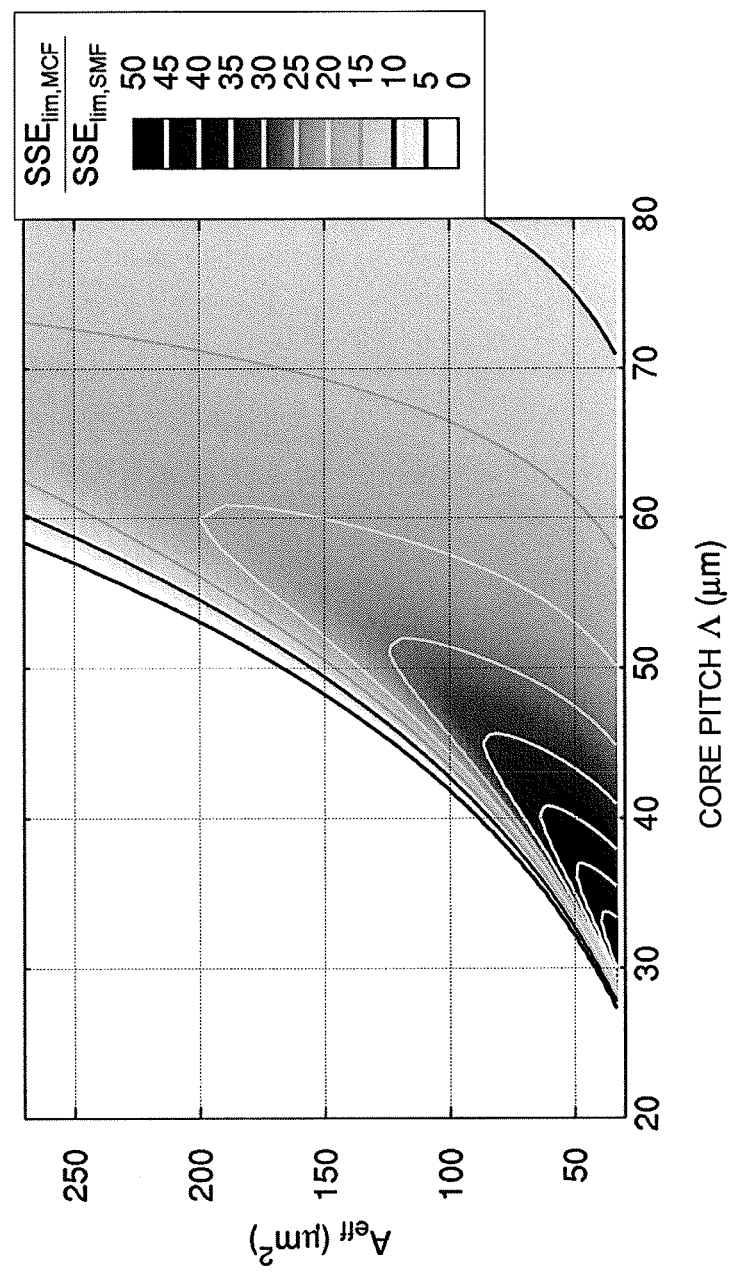
FIG. 3 is a drawing showing the result of normalization of $SSE_{lim}$ of multi-core optical fiber ($SSE_{lim,MCF}$) by $SSE_{lim}$ of single-core optical fiber ($SSE_{lim,SMF}$)

Using this $SSE_{lim}$, FIG. 3 shows the result of normalization of $SSE_{lim}$ ($SSE_{lim,MCF}$) in the case of the multi-core optical fiber by $SSE_{lim}$ ($SSE_{lim,SMF}$) of the single-core optical fiber (which has a step-index type core with the transmission loss of 0.18 dB, $A_{eff}=80$ μm, and $\lambda_{cc}=1530$ nm, no crosstalk, and the core pitch Λ assumed to equal the fiber coating diameter of 250 μm). It is found by FIG. 3 that $SSE_{lim,MCF}$ normalized by $SSE_{lim,SMF}$ shows a peak in a small $A_{eff}$ region and that $SSE_{lim,MCF}$ of the multi-core optical fiber can be maximized with decrease of $A_{eff}$. The reason for it is as follows: with decrease of $A_{eff}$, "the effect of reduction in the possessed area per core" appears greater than degradation of $SE_{lim}$ due to deterioration of non-linearity resistance because the crosstalk can become maintained at a low level even with decrease of the core pitch Λ thanks to enhancement of confinement of light in the cores.

(5—SSE in Actual Optical Fiber Structure)

Figure 4:
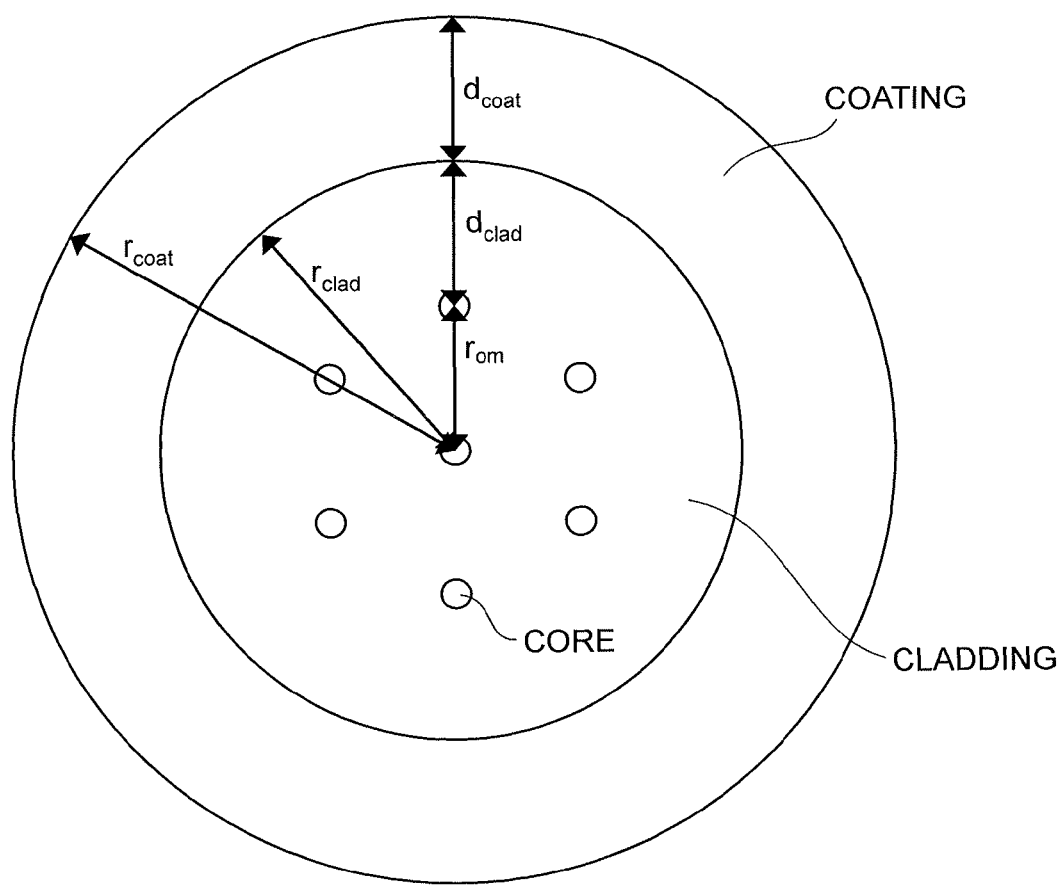
FIG. 4 shows a cross-sectional structure of a multi-core optical fiber for considering SSE in a practical multi-core optical fiber.

In the above description, we considered the case where the cores were ideally infinitely packed, as to the core constellation in the multi-core optical fiber, but the multi-core optical fibers put in practical use scarcely adopt such configuration and they have a configuration wherein the cores are covered by a cladding in a predetermined radius and the outside thereof is further covered by a coating. FIG. 4 shows a cross-sectional structure of a multi-core optical fiber for considering SSE in the practical multi-core optical fibers. FIG. 4 shows an example in which there is one core at the center and six cores are arranged on the circumference of a circle centered on the center core. As shown in FIG. 4, there is a cladding with the radius $r_{clad}$ from the center in the standard multi-core optical fiber, and the periphery thereof is covered by a coating with the thickness $d_{coat}$. As a result, the radius of the entire multi-core optical fiber is $r_{coat}$. When the plurality of cores are arranged inside, the cladding with a predetermined clad thickness $d_{clad}$ is also formed outside the outermost cores. When $r_{om}$ represents a distance from the fiber center to the center of the outermost core, the relation of $r_{clad}=r_{om}+d_{clad}$ holds.

Since the multi-core optical fiber is normally covered by a coating, $SSE_{lim}$ of this multi-core optical fiber is obtained by dividing the sum of $SE_{lim}$ of the respective cores by the fiber sectional area $A_{coat}=\pi r_{coat}^2$ and can be expressed by Expression (47) below.

$$SSE_{lim} = \frac{\sum SE_{lim}}{A_{coat}} \quad (47)$$

At this time, L [km] dependence of $SSE_{lim,SMF}$ [bit/s/Hz/mm$^2$], which is $SSE_{lim}$ in the polarization multiplexing case using single-core fibers with $2r_{coat}$ of 250 µm each provided with a step-index type core with the transmission loss of 0.18 dB, $A_{eff}$=80 µm$^2$, $n_2$=2.34×10$^{-20}$ m$^2$/W, and $\lambda_{cc}$=1530 nm on the assumption of the wavelength of 1550 nm, NF of EDFA of 6 dB, the overall signal band $B_o$=10 THz, and the span length of 80 km, can be rearranged using Expression (33) and Expression (47), to be obtained like Expression (48) below. It is, however, noted herein that with use of $N_s$=L/$L_s$, $SSE_{lim,SMF}$ for L at a middle of span is obtained by linear interpolation.

$$SE_{lim,SMF} = 40.7 \log_2[1+(1.61\times10^{-5}L)^{-1}] \quad (48)$$

Furthermore, $SE_{lim}$ per core of the multi-core optical fiber under the same conditions of the wavelength, NF of EDFA, the overall signal band $B_o$, and the span length as the calculation conditions for the single-core fiber can be obtained like Expression (49) below by substituting the numerical values into Expression (40), rearranging the result, and doubling it.

$$SE_{lim} = 2\log_2\left[1 + \frac{\exp(-6\eta L)}{2.63\times10^8 L\left[\frac{(10^{8\alpha_{dB}}-1)^3}{\alpha_{dB}10^{8\alpha_{dB}}|D|}\left(\frac{n_2}{A_{eff}}\right)^2\right]\log\left(5.47\times10^3|D|\frac{1-10^{-8\alpha_{dB}}}{\alpha_{dB}}\right)^{\frac{1}{3}}+} \right. \\ \left. [1-\exp(-6\eta L)]\right] \quad (49)$$

At this time, the units of the respective parameters are $\eta$ [/km], L [km], $\alpha_{dB}$ [dB/km], $n_2$ [m$^2$/W], $A_{eff}$ [µm$^2$], and chromatic dispersion D [ps/(nm·km)]. The foregoing relation was obtained herein by making use of the fact that the relation of Expression (51) below holds between $\beta_2$ [ps$^2$/km] and D [ps/(nm·km)] (where c is the speed of light [m/s] in vacuum and the unit of wavelength $\lambda$ in this formula is nm).

$$|\beta_2| = 1000\frac{\lambda^2}{2\pi c}|D| \quad (51)$$

Therefore, $SSE_{lim}$ of the multi-core optical fiber in this case can be expressed by Expression (52) below, using the number of cores $N_{core}$.

$$SSE_{lim} = \frac{N_{core}}{A_{coat}}\log_2\left[1 + \frac{\exp(-6\eta L)}{2.63\times10^8 L\left[\frac{(10^{8\alpha_{dB}}-1)^3}{\alpha_{dB}10^{8\alpha_{dB}}|D|}\left(\frac{n_2}{A_{eff}}\right)^2\right]\log\left(5.47\times10^3|D|\frac{1-10^{-8\alpha_{dB}}}{\alpha_{dB}}\right)^{\frac{1}{3}}+} \right. \\ \left. [1-\exp(-6\eta L)]\right] \quad (52)$$

Figure 5:
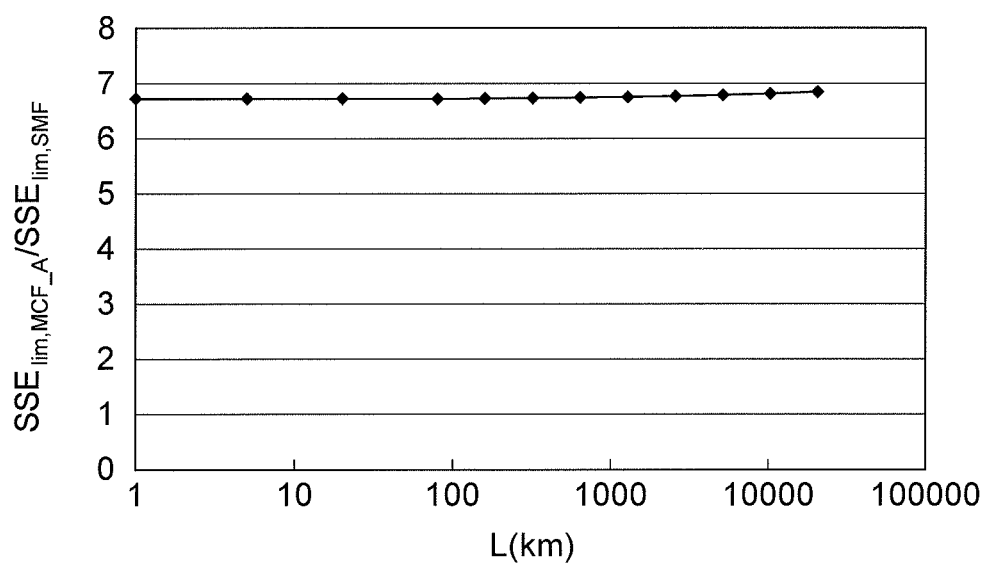
FIG. 5 is a drawing showing the result of plotting of a relation between values of the ratio to $SSE_{lim,SMF}$, and L.

The multi-core optical fibers described in published literatures were checked if there was any for which $SSE_{lim}$ could be calculated using Expression (52). Then, the multi-core optical fiber described in T. Hayashi et al., "Ultra-Low-Crosstalk Multi-Core Fiber Feasible to Ultra-Long-Haul Transmission," OFC2011, paper PDPC2 (which will be referred to hereinafter as Reference Literature 6) was the one $SSE_{lim}$ of which could be calculated with $n_2$=2.34×10$^{-20}$ m$^2$/W and showed the largest value. $SSE_{lim}$ of the multi-core optical fiber described in Reference Literature 6 is defined as $SSE_{lim,MCFA}$ and FIG. 5 shows a graph of plotting of a relation between values taken by a ratio thereof to $SSE_{lim,SMF}$, and L. $SSE_{lim,MCF\_A}$ is approximately slightly smaller than seven times $SSE_{lim,SMF}$. For $SSE_{lim,MCFA}$ to be $N_{times}$ or more times $SSE_{lim,SMF}$, Expression (53) below needs to hold, and in the multi-core optical fiber of the present invention, $N_{times}$ is preferably not less than 7, more preferably not less than 10, still more preferably not less than 15, and yet more preferably not less than 20.

$$\frac{N_{core}}{A_{coat}}\log_2\left[1 + \frac{\exp(-6\eta L)}{2.63\times10^8 L\left[\frac{(10^{8\alpha_{dB}}-1)^3}{\alpha_{dB}10^{8\alpha_{dB}}|D|}\left(\frac{n_2}{A_{eff}}\right)^2\right]\log\left(5.47\times10^3|D|\frac{1-10^{-8\alpha_{dB}}}{\alpha_{dB}}\right)^{\frac{1}{3}}+} \right. \\ \left. [1-\exp(-6\eta L)]\right] \quad (53)$$

Since the L dependence of $SSE_{lim,MCFA}/SSE_{lim,SMF}$ is sufficiently small, L=80 km is substituted into Expression (53) and then Expression (53) is modified, to obtain Expression (54) below. In Expressions (49), (52), and (53) herein, $6\eta$ corresponds to an overall crosstalk $\eta_n$ to a certain core part n (nth core part) from six adjacent cores in the core constellation of the hexagonal grid pattern, and therefore $6\eta$ is replaced by $\eta_n$. In addition, $\alpha_{dB,n}$, $D_n$, $n_{2,n}$, and $A_{eff,n}$ are $\alpha_{dB}$, D, $n_2$, and $A_{eff}$, respectively, in the core part n. Furthermore, when SNR in the core part n (the fraction term in the logarithm with the base of 2 in Expression (54)) is sufficiently large (100 or more), some approximations are available for rewriting into Expression (55). Since the part of the natural logarithm in Expression (55) has little dependence on $\alpha_{dB}$ and D and can be approximated by deeming it as an approximate constant, we can then further obtain Expression (56). In Expressions (54) to (56), as in the case of Expression (53), $N_{times}$ is preferably not less than 7, more preferably not less than 10, still more preferably not less than 15, and yet more preferably not less than 20.

$$\frac{N_{core}}{A_{coat}}\log_2\left\{1 + \frac{\exp(-80\eta_n)}{2.10\times10^{10}\left[\frac{(10^{8\alpha_{dB,n}}-1)^3}{\alpha_{dB,n}10^{8\alpha_{dB,n}}|D_n|}\left(\frac{n_{2,n}}{A_{eff,n}}\right)^2\right]\log\left(5.47\times10^3|D_n|\frac{1-10^{-8\alpha_{dB,n}}}{\alpha_{dB,n}}\right)^{\frac{1}{3}}+} \right. \\ \left. [1-\exp(-80\eta_n)]\right\} \geq 1.96\times10^2 N_{times} \quad (54)$$

$$\frac{N_{core}}{A_{coat}}\log_2\left\{2.10\times10^{10}\left[\frac{(10^{8\alpha_{dB,n}}-1)^3}{\alpha_{dB,n}10^{8\alpha_{dB,n}}|D_n|}\left(\frac{n_{2,n}}{A_{eff,n}}\right)^2\right]\log\left(5.47\times10^3|D_n|\frac{1-10^{-8\alpha_{dB,n}}}{\alpha_{dB,n}}\right)^{\frac{1}{3}}+80\eta_n\right\} \leq -1.96\times10^2 N_{times} \quad (55)$$

$$\frac{N_{core}}{A_{coat}}\log_2\left[4.98\times10^{10}\frac{(10^{8\alpha_{dB,n}}-1)}{(\alpha_{dB,n}10^{8\alpha_{dB,n}}|D_n|)^{\frac{1}{3}}}\left(\frac{n_{2,n}}{A_{eff,n}}\right)^{\frac{2}{3}}+80\eta_n\right] \leq -1.96\times10^2 N_{times} \quad (56)$$

Since Expressions (54) to (56) are formulas based on the premise that all the core parts are uniform and each of the core parts operates in a single mode, the multi-core fiber satisfying any one of Expressions (54) to (56) is preferably constructed as follows: preferably, all the core parts have the same structure; preferably, each of the core parts operates in a single mode. Since the multi-core fiber satisfying Expression (55) or Expression (56) is based on the premise that SNR in the core part n (the fraction term in the logarithm with the base of 2 in Expression (54)) is sufficiently large (100 or more), it is preferable to satisfy at least the condition of $80\eta_n \leq 0.01$.

With consideration to more general cases where the core parts have different optical properties or where crosstalks among the core parts are different, when the transmission loss of the nth core part is $\alpha_{dB,n}$ [dB/km], the non-linear refractive index thereof $n_{2,n}$ [m$^2$/W], the effective area thereof $A_{\mathit{eff},n}$ [μm$^2$], the chromatic dispersion thereof $D_n$ [ps/(nm·km)], and the sum of power coupling coefficients to the nth core part from all the other core parts $\eta_n$ [/km], $N_{\mathit{times}}$ is preferably not less than 7, more preferably not less than 10, still more preferably not less than 15, and yet more preferably not less than 20 in Expressions (57) to (59), instead of Expressions (54) to (56). The multi-core fiber satisfying Expression (58) or Expression (59) preferably satisfies at least the condition of $80\eta_n \leq 0.01$, because of the premise that the fraction term in the logarithm with the base of 2 in Expression (57) is assumed to be sufficiently large (100 or more), as in the case of Expressions (55) and (56).

$$\frac{1}{A_{coat}}\sum_n \log_2 \left\{ 1 + \frac{\exp(-80\eta_n)}{2.10\times 10^{10}\left[\frac{(10^{8\alpha_{dB,n}}-1)^3}{\alpha_{dB,n}10^{8\alpha_{dB,n}}|D_n|}\left(\frac{n_{2,n}}{A_{\mathit{eff},n}}\right)^2\right]} \log\left(5.47\times 10^3|D_n|\frac{1-10^{-8\alpha_{dB,n}}}{\alpha_{dB,n}}\right)\right]^{\frac{1}{3}} + [1-\exp(-80\eta_n)] \right\} \geq 1.96\times 10^2 N_{\mathit{times}} \quad (57)$$

$$\frac{1}{A_{coat}}\sum_n \log_2\left\{2.10\times 10^{10}\left[\frac{(10^{8\alpha_{dB,n}}-1)^3}{\alpha_{dB,n}10^{8\alpha_{dB,n}}|D_n|}\left(\frac{n_{2,n}}{A_{\mathit{eff},n}}\right)^2\right]\log\left(5.47\times 10^3|D_n|\frac{1-10^{-8\alpha_{dB,n}}}{\alpha_{dB,n}}\right)\right]^{\frac{1}{3}} + 80\eta_n\right\} \leq -1.96\times 10^2 N_{\mathit{times}} \quad (58)$$

$$\frac{1}{A_{coat}}\sum_n \log_2\left[4.98\times 10^{10}\frac{10^{8\alpha_{dB,n}}-1}{(\alpha_{dB,n}10^{8\alpha_{dB,n}}|D_n|)^{\frac{1}{3}}}\left(\frac{n_{2,n}}{A_{\mathit{eff},n}}\right)^{\frac{2}{3}} + 80\eta_n\right] \leq -1.96\times 10^2 N_{\mathit{times}} \quad (59)$$

$$*\sum_n$$

is the sum over all the cores.

In the case where each of the core parts guides a plurality of spatial modes, similarly, when the transmission loss of the mth spatial mode in the nth core part is $\alpha_{dB,nm}$ [dB/km], the non-linear refractive index thereof $n_{2,nm}$ [m$^2$/W], the effective area thereof $A_{\mathit{eff},nm}$ [μm$^2$], the chromatic dispersion thereof $D_{nm}$ [ps/(nm·km)], and the sum of power coupling coefficients to the nth core part from all the other core parts (i.e., the sum of power coupling coefficients to "each of all the spatial modes in the nth core part" from "all the spatial modes in all the other core parts") $\eta_n$ [/km], $N_{\mathit{times}}$ is preferably not less than 7, more preferably not less than 10, still more preferably not less than 15, and yet more preferably not less than 20 in any one of Expressions (60) to (62) below, instead of Expressions (54) to (56) or Expressions (57) to (59). The multi-core fiber satisfying Expression (61) or Expression (62) preferably satisfies at least the condition of $80\eta_n \leq 0.01$, because of the premise that the fraction term in the logarithm with the base of 2 in Expression (60) is assumed to be sufficiently large (100 or more), as in the case of Expressions (55) and (56).

$$\frac{1}{A_{coat}}\sum_n\sum_m \log_2\left\{1 + \frac{\exp(-80\eta_n)}{2.10\times 10^{10}\left[\frac{(10^{8\alpha_{dB,n}}-1)^3}{\alpha_{dB,n}10^{8\alpha_{dB,n}}|D_n|}\left(\frac{n_{2,n}}{A_{\mathit{eff},n}}\right)^2\right]}\log\left(5.47\times 10^3|D_n|\frac{1-10^{-8\alpha_{dB,n}}}{\alpha_{dB,n}}\right)\right]^{\frac{1}{3}} + [1-\exp(-80\eta_n)]\right\} \geq 1.96\times 10^2 N_{\mathit{times}} \quad (60)$$

$$\frac{1}{A_{coat}}\sum_n\sum_m \log_2 \quad (61)$$

$$\left\{2.10\times 10^{10}\left[\frac{(10^{8\alpha_{dB,nm}}-1)^3}{\alpha_{dB,nm}10^{8\alpha_{dB,nm}}|D_{nm}|}\left(\frac{n_{2,nm}}{A_{\mathit{eff},nm}}\right)^2\log\right.\right.$$

$$\left.\left(5.47\times 10^3|D_{nm}|\frac{1-10^{-8\alpha_{dB,nm}}}{\alpha_{dB,nm}}\right)\right]^{\frac{1}{3}} + 80\eta_n\right\} \leq -1.96\times 10^2 N_{\mathit{times}}$$

$$\frac{1}{A_{coat}}\sum_n\sum_m \log_2\left[4.98\times 10^{10}\frac{10^{8\alpha_{dB,nm}}-1}{\alpha_{dB,nm}10^{8\alpha_{dB,nm}}|D_{nm}|^{\frac{1}{3}}}\left(\frac{n_{2,nm}}{A_{\mathit{eff},nm}}\right)^{\frac{2}{3}} + 80\eta_n\right] \leq -1.96\times 10^2 N_{\mathit{times}} \quad (62)$$

$$*\sum_n$$

is the sum over all the cores.

$$*\sum_m$$

is the sum over all the spatial modes guided without effectively being cut off in each of the core parts.

The spatial modes as objects of the calculation in Expressions (60) to (62) are spatial modes that are guided without effectively being cut off, and are, for example, preferably spatial modes with the transmission loss of not more than 1 dB/km. For sufficient cut off, a preferred transmission loss of a spatial mode with transmission loss over 1 dB/km is not less than at least 0.9 dB/m. It is preferable herein that the crosstalk among spatial modes in the same core part can be compensated by signal processing. A technique of the signal processing may be a technique of numerical calculation of digitized signals, or a technique of processing electrical or optical analog signals with an analog electric signal processing circuit or optical signal processing circuit.

Figure 6:
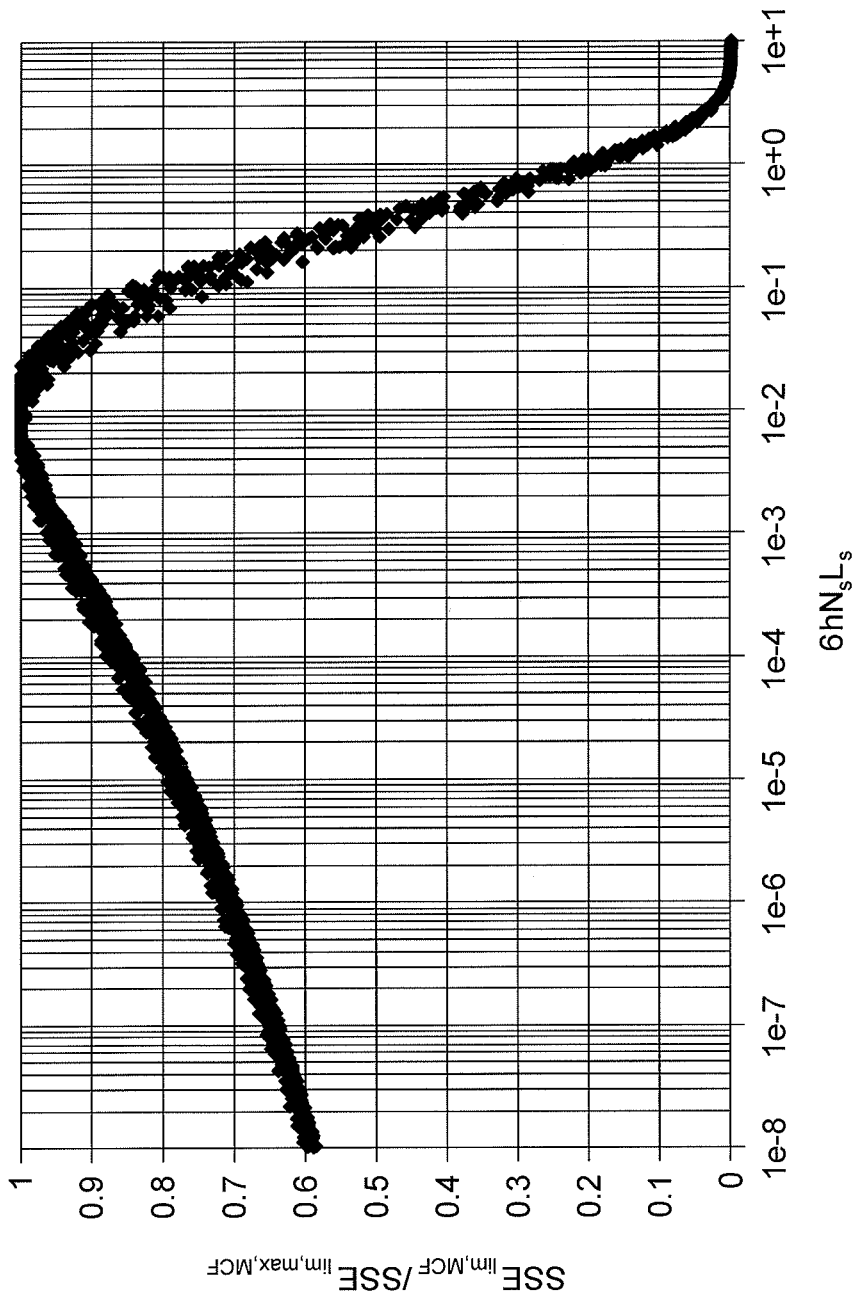
FIG. 6 is a drawing showing a relation between "$6\eta N_s L_s$" and $SSE_{lim,MCF}$ at each $A_{eff}$ normalized by maximum $SSE_{lim,max,MCF}$ of $SSE_{lim,MCF}$ at the $A_{eff}$.

Now, let us consider specific preferred properties and structures of the multi-core optical fiber for improvement in SSE, based on Expression (46). First, FIG. 6 shows a relation between "$6\eta N_s L_s$" and "values of $SSE_{\mathit{lim,MCF}}$ at each $A_{\mathit{eff}}$ normalized by maximum $SSE_{\mathit{lim,max,MCF}}$ of $SSE_{\mathit{lim,MCF}}$ at each $A_{\mathit{eff}}$" using the result of FIG. 3. In other words, FIG. 6 can be understood as a graph obtained by normalizing $SSE_{\mathit{lim,MCF}}$ at each $A_{\mathit{eff}}$ so as to make the maximum 1 in the direction of the horizontal axis (the axis of core pitch Λ) in FIG. 3, changing the variable on the horizontal axis from the core pitch Λ to $6\eta N_s L_s$, and plotting the relation between $6\eta N_s L_s$ and the normalized $SSE_{lim,MCF}$ on the two-dimensional graph for all $A_{eff}$ cases. FIG. 6 shows data in the range of $A_{eff}$ of about 30 to about 270, and it is seen that the data is plotted on one curve with a small dispersion, irrespective of the values of $A_{eff}$. It is found by this result that the relation between $SSE_{lim,MCF}/SSE_{lim,max,MCF}$ and $6\eta N_s L_s$ is substantially independent of the values of $A_{eff}$. It is also seen from FIG. 6 that when $A_{eff}$ is in the range of about 30 to about 270, $6\eta N_s L_s$ needs to be in the range of about $1\times10^{-2}$, for maximizing $SSE_{lim,MCF}$. Furthermore, for keeping $SSE_{lim,MCF}$ not less than 90% of the maximum, $6\eta N_s L_s$ needs to be in the range of about $4\times10^{-4}$ to about $3\times10^{-2}$; for keeping it in the range of not less than 80%, $6\eta N_s L_s$ needs to be in the range of about $2\times10^{-5}$ to about $1\times10^{-1}$; for keeping it in the range of not less than 60%, $6\eta N_s L_s$ needs to be in the range of about $1\times10^{-8}$ to about $2\times10^{-1}$. This can be translated as follows: in order to maximize $SSE_{lim,MCF}$ at each $A_{eff}$, irrespective of the magnitude of $A_{eff}$, $6\eta N_s L_s$ is preferably in the range of about $1\times10^{-8}$ to about $2\times10^{-1}$, $6\eta N_s L_s$ is more preferably in the range of about $2\times10^{-5}$ to about $1\times10^{-1}$, and $6\eta N_s L_s$ is still more preferably in the range of about $4\times10^{-4}$ to about $3\times10^{-2}$.

Figure 7:
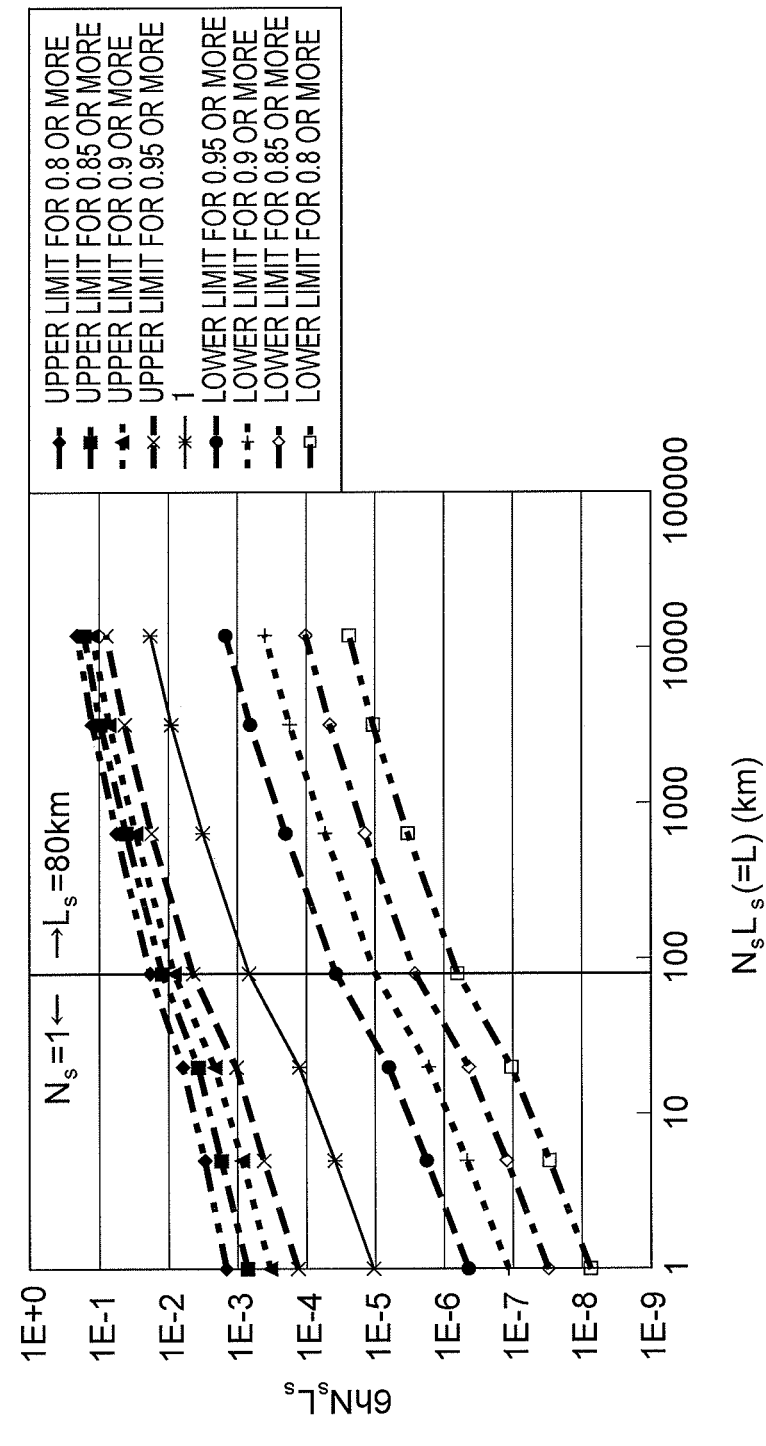
FIG. 7 is a drawing showing relations of "$N_s L_s$" with "$6\eta N_s L_s$ for maximum of $SSE_{lim,MCF}/SSE_{lim,max,MCF}$ (i.e., 1), and the upper limit and lower limit of $6\eta N_s L_s$ for maintaining $SSE_{lim,MCF}/SSE_{lim,max,MCF}$ not less than each of some fixed values.
Figure 8:
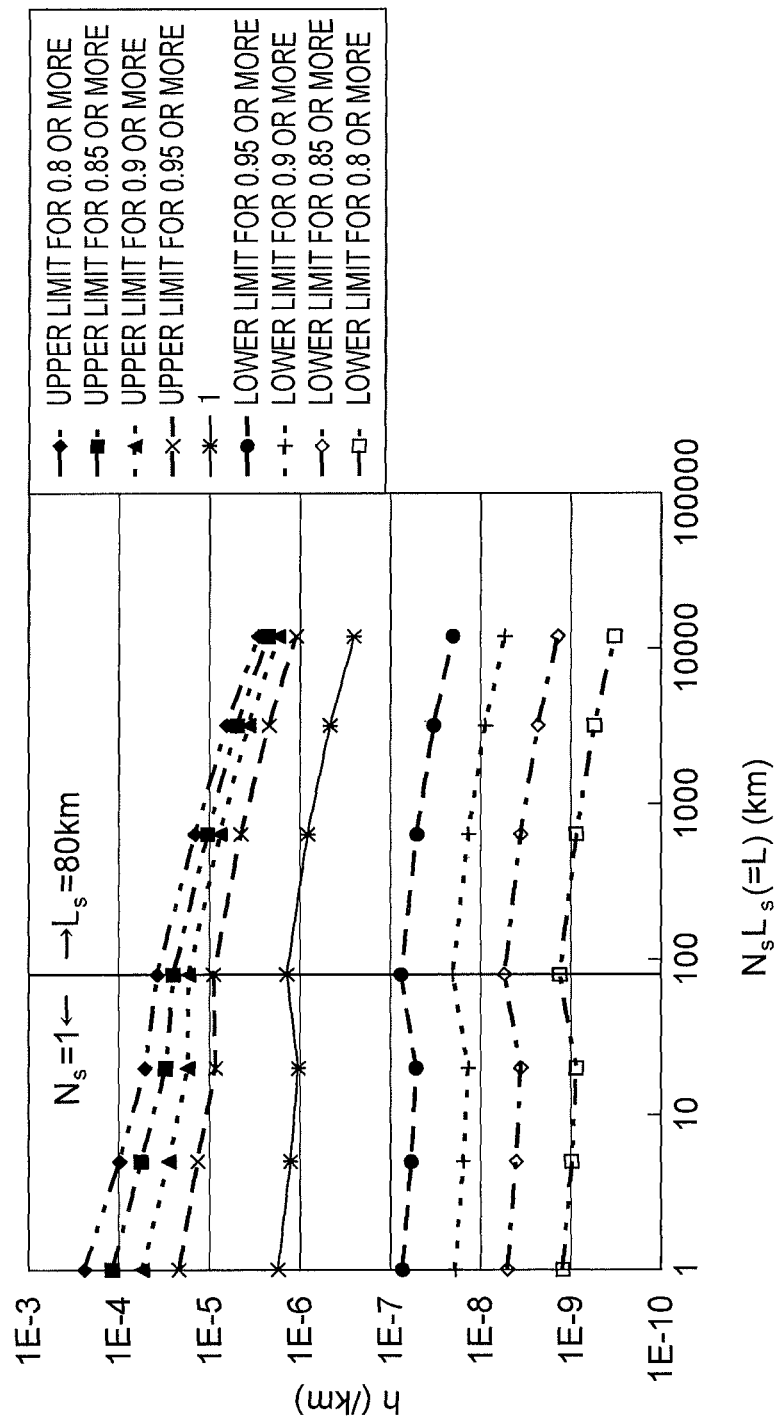
FIG. 8 is a drawing showing relations of "$N_s L_s$" with "η for maximum of $SSE_{lim,MCF}/SSE_{lim,max,MCF}$ (i.e., 1), and the upper limit and lower limit of η for maintaining $SSE_{lim,MCF}/SSE_{lim,max,MCF}$ not less than each of some fixed values.

This is the result with $N_s L_s = 3200$ km, but with change in $N_s L_s$ the relation between $SSE_{lim,MCF}/SSE_{lim,max,MCF}$ and $6\eta N_s L_s$ is substantially independent of the values of $A_{eff}$. However, the preferred range of $6\eta N_s L_s$ varies with increase in $SSE_{lim,MCF}/SSE_{lim,max,MCF}$. FIG. 7 shows relations between "$N_s L_s$" and "$6\eta N_s L_s$ for maximum of $SSE_{lim,MCF}/SSE_{lim,max,MCF}$, and the upper limit and lower limit of $6\eta N_s L_s$ for maintaining $SSE_{lim,MCF}/SSE_{lim,max,MCF}$ not less than each of some fixed values." It is seen that "$6\eta N_s L_s$ for maximum of $SSE_{lim,MCF}/SSE_{lim,max,MCF}$, and the upper limit and lower limit of $6\eta N_s L_s$ for maintaining $SSE_{lim,MCF}/SSE_{lim,max,MCF}$ not less than each of some fixed values" increase with increase of $N_s L_s$. In this example, $N_s = 1$ for $N_s L_s$ of not more than 80 km, and $L_s = 80$ km for $N_s L_s$ of 80 km or more; it is seen that the slopes with change of $N_s$ are different from those with change of $L_s$. Next, FIG. 8 shows relations between "$N_s L_s$" and "η for maximum of $SSE_{lim,MCF}/SSE_{lim,max,MCF}$, and the upper limit and lower limit of η for maintaining $SSE_{lim,MCF}/SSE_{lim,max,MCF}$ not less than each of some fixed values." It is seen that in the region of $N_s = 1$, the preferred ranges of η are approximately constant, and that in the increasing range of $N_s$, the preferred ranges of η shift toward smaller values with increase of $N_s$. For example, for maintaining $SSE_{lim,MCF}/SSE_{lim,max,MCF}$ not less than 0.8, η is preferably not more than about $2.9\times10^{-6}$/km, with consideration to transmission up to $N_s L_s = 12000$ km. With consideration to transmission in the short range of $N_s = 1$, η is preferably not less than about $8.8\times10^{-10}$/km. In view of $\eta_n = 6\eta$, $\eta_n$ is preferably in the range of about $5.3\times10^{-9}$/km to about $1.7\times10^{-5}$/km.

Similarly, for maintaining $SSE_{lim,MCF}/SSE_{lim,max,MCF}$ not less than 0.85, η is preferably in the range of about $3.6\times10^{-9}$/km to about $2.3\times10^{-6}$/km (i.e., $\eta_n$ is preferably in the range of about $2.2\times10^{-8}$/km to about $1.4\times10^{-5}$/km). Furthermore, for maintaining $SSE_{lim,MCF}/SSE_{lim,max,MCF}$ not less than 0.9, η is preferably in the range of about $1.4\times10^{-8}$/km to about $1.7\times10^{-6}$/km (i.e., $\eta_n$ is preferably in the range of about $8.3\times10^{-8}$/km to about $1.0\times10^{-5}$/km). Furthermore, for maintaining $SSE_{lim,MCF}/SSE_{lim,max,MCF}$ not less than 0.95, η is preferably in the range of about $5.3\times10^{-8}$/km to about $1.1\times10^{-6}$/km (i.e., $\eta_n$ is preferably in the range of about $3.2\times10^{-7}$/km to about $6.6\times10^{-6}$/km).

Incidentally, FIG. 4(a) of Reference Literature 6 shows an example of wavelength dependence of crosstalk of an actual multi-core optical fiber. Since the wavelength dependence of crosstalk is equivalent to the wavelength dependence of η, the wavelength dependence of η of the actual multi-core optical fiber is found to take a value of about 10/75 [dB/nm]. It is found in terms of this wavelength dependence of η that η changes by about 4.67 dB (about 2.93 times) in the range of the C-band of 1530 nm to 1565 nm, that η changes by about 12.67 dB (about 18.5 times) in the range of the C+L band of 1530 nm to 1625 nm, and that η changes by about 22 dB (about 158 times) in the range of the S+C+L band of 1460 nm to 1625 nm. Therefore, with respect to η at the longest wavelength (first wavelength) in the used wavelength band, η at the shortest wavelength (second wavelength) in the used wavelength band becomes about 1/2.93 times in the case of use of the C-band only, about 1/18.5 times in the case of use of the C+L band, and about 1/158 times in the case of use of the S+C+L band. These ratios are the same for $\eta_n = 6\eta$ as in the case of η.

Therefore, in the case where the used wavelength band is the C-band and the first wavelength is 1565 nm, η at the first wavelength is more preferably not less than about $2.6\times10^{-9}$/km (i.e., $\eta_n$ not less than about $1.5\times10^{-8}$/km) for keeping $SSE_{lim,MCF}/SSE_{lim,max,MCF}$ not less than 0.8 in the entire used wavelength band; η at the first wavelength is more preferably not less than about $1.1\times10^{-8}$/km (i.e., $\eta_n$ not less than about $6.4\times10^{-8}$/km) for keeping $SSE_{lim,MCF}/SSE_{lim,max,MCF}$ not less than 0.85 in the entire used wavelength band; η the first wavelength is more preferably not less than about $4.1\times10^{-8}$/km (i.e., $\eta_n$ not less than about $2.4\times10^{-7}$/km) for keeping $SSE_{lim,MCF}/SSE_{lim,max,MCF}$ not less than 0.9 in the entire used wavelength band; η at the first wavelength is more preferably not less than about $1.5\times10^{-7}$/km (i.e., $\eta_n$ not less than about $9.3\times10^{-7}$/1 cm) for keeping $SSE_{lim,MCF}/SSE_{lim,max,MCF}$ not less than 0.95 in the entire used wavelength band.

In the case where the used wavelength band is the C+L band and the first wavelength is 1625 nm, η at the first wavelength is more preferably not less than about $1.6\times10^{-8}$/km (i.e., $\eta_n$ not less than about $9.7\times10^{-8}$/1 cm) for keeping $SSE_{lim,MCF}/SSE_{lim,max,MCF}$ not less than 0.8 in the entire used wavelength band; η at the first wavelength is more preferably not less than about $6.7\times10^{-8}$/km (i.e., $\eta_n$ not less than about $4.0\times10^{-7}$/km) for keeping $SSE_{lim,MCF}/SSE_{lim,max,MCF}$ not less than 0.85 in the entire used wavelength band; η at the first wavelength is more preferably not less than about $2.6\times10^{-7}$/km (i.e., $\eta_n$ not less than about $1.5\times10^{-6}$/km) for keeping $SSE_{lim,MCF}/SSE_{lim,max,MCF}$ not less than 0.9 in the entire used wavelength band; η at the first wavelength is more preferably not less than about $9.7\times10^{-7}$/km (i.e., $\eta_n$ not less than about $5.8\times10^{-6}$/km) for keeping $SSE_{lim,MCF}/SSE_{lim,max,MCF}$ not less than 0.95 in the entire used wavelength band. In the case where the used wavelength band is the S+C+L band and the first wavelength is 1625 nm, η at the first wavelength is more preferably not less than about $1.4\times10^{-7}$/km (i.e., $\eta_n$ not less than about $8.3\times10^{-7}$/km) for keeping $SSE_{lim,MCF}/SSE_{lim,max,MCF}$ not less than 0.8 in the entire used wavelength band; η at the first wavelength is more preferably not less than about $5.8\times10^{-7}$/km (i.e., $\eta_n$ not less than about $3.5\times10^{-6}$/km) for keeping $SSE_{lim,MCF}/SSE_{lim,max,MCF}$ not less than 0.85 in the entire used wavelength band.

Figure 9:
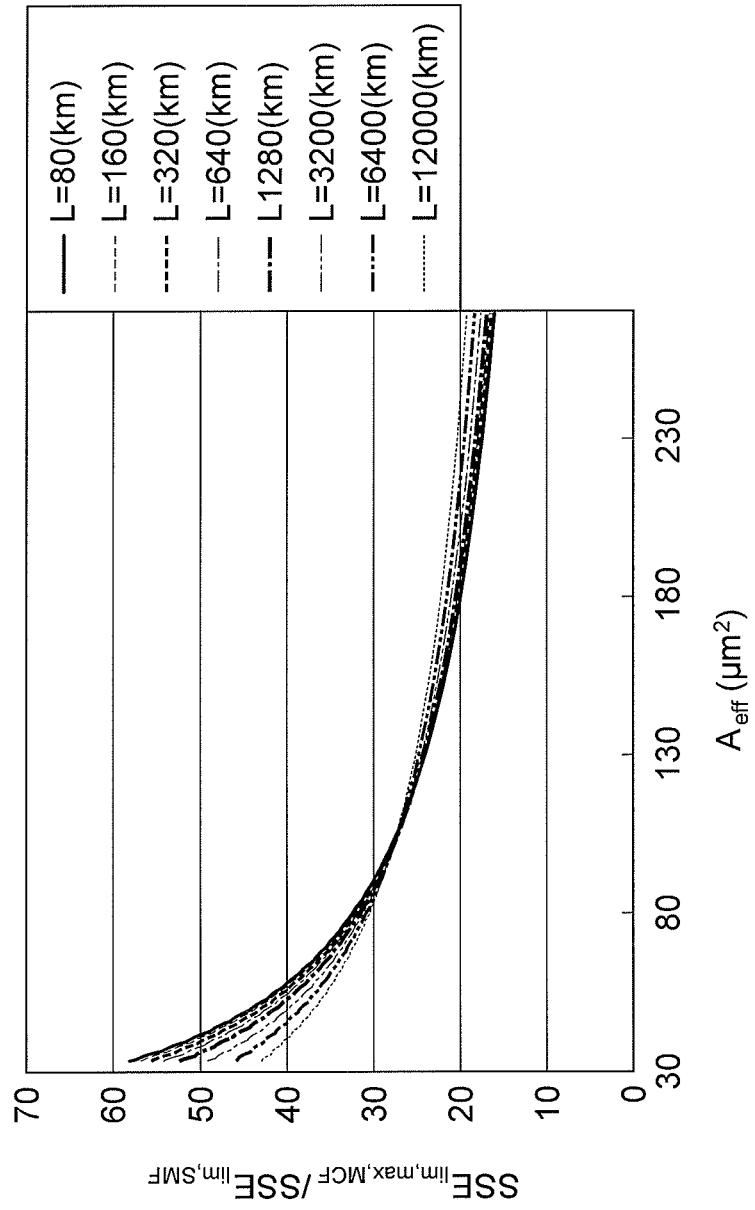
FIG. 9 is a drawing showing relations between $SSE_{lim,max,MCF}/SSE_{lim,SMF}$ and $A_{eff}$ for respective cases of L of 80 km, 160 km, 320 km, 640 km, 1280 km, 3200 km, 6400 km, and 12000 km.

Next, FIG. 9 shows relations between $SSE_{lim,max,MCF}/SSE_{lim,SMF}$ and $A_{eff}$ with L being 80 km, 160 km, 320 km, 640 km, 1280 km, 3200 km, 6400 km, and 12000 km. $SSE_{lim,SMF}$ is, as described above, $SSE_{lim}$ of the single-core optical fiber on the assumption of $A_{eff}$ of 80 μm², no crosstalk, and the core pitch Λ of 250 μm being the fiber coating diameter. It is seen from FIG. 9 that at least in the range shown in FIG. 9, $SSE_{lim,max,MCF}$ increases with decrease of $A_{eff}$. It is also seen that the relations between $SSE_{lim,max,MCF}/SSE_{lim,SMF}$ and $A_{eff}$ show no significant change with change of L. It is, however, noted that individual values of $SSE_{lim,max,MCF}$ and $SSE_{lim,SMF}$, which are not ratios, significantly vary depending upon L. It is found from FIG. 9 herein that, for example, when $A_{eff}$ of the multi-core optical fiber with L=3200 km is set not more than about 87 μm², $SSE_{lim,max,MCF}/SSE_{lim,SMF}$ can be kept not less than 30; and that when $A_{eff}$ is set not more than about 50 μm², $SSE_{lim,max,MCF}/SSE_{lim,SMF}$ can be kept not less than 40. Accordingly, $A_{eff}$ at the first wavelength is preferably 87 μm² or less, further preferably 50 μm² or less.

Figure 10:
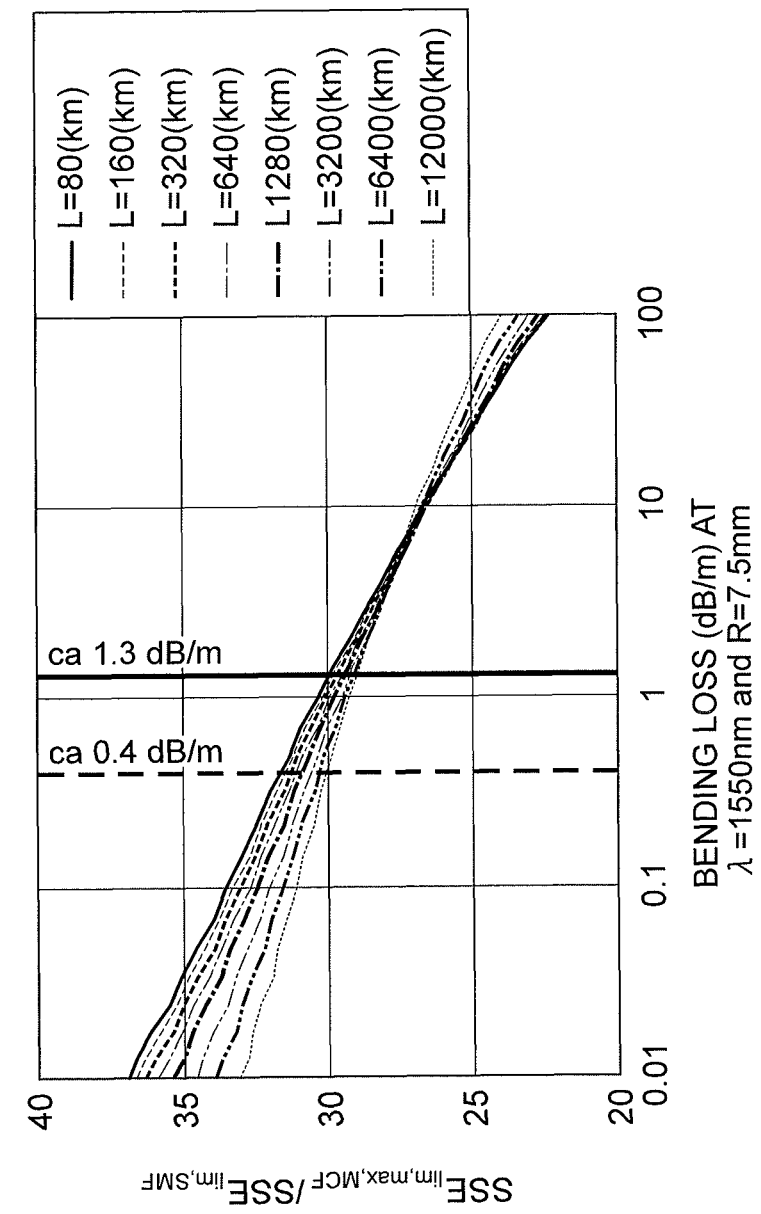
FIG. 10 is a drawing showing relations between $SSE_{lim,max,MCF}/SSE_{lim,SMF}$ and bending loss in bending radius of 7.5 mm at the wavelength of 1550 nm, for respective cases of L of 80 km, 160 km, 320 km, 640 km, 1280 km, 3200 km, 6400 km, and 12000 km.
Figure 11:
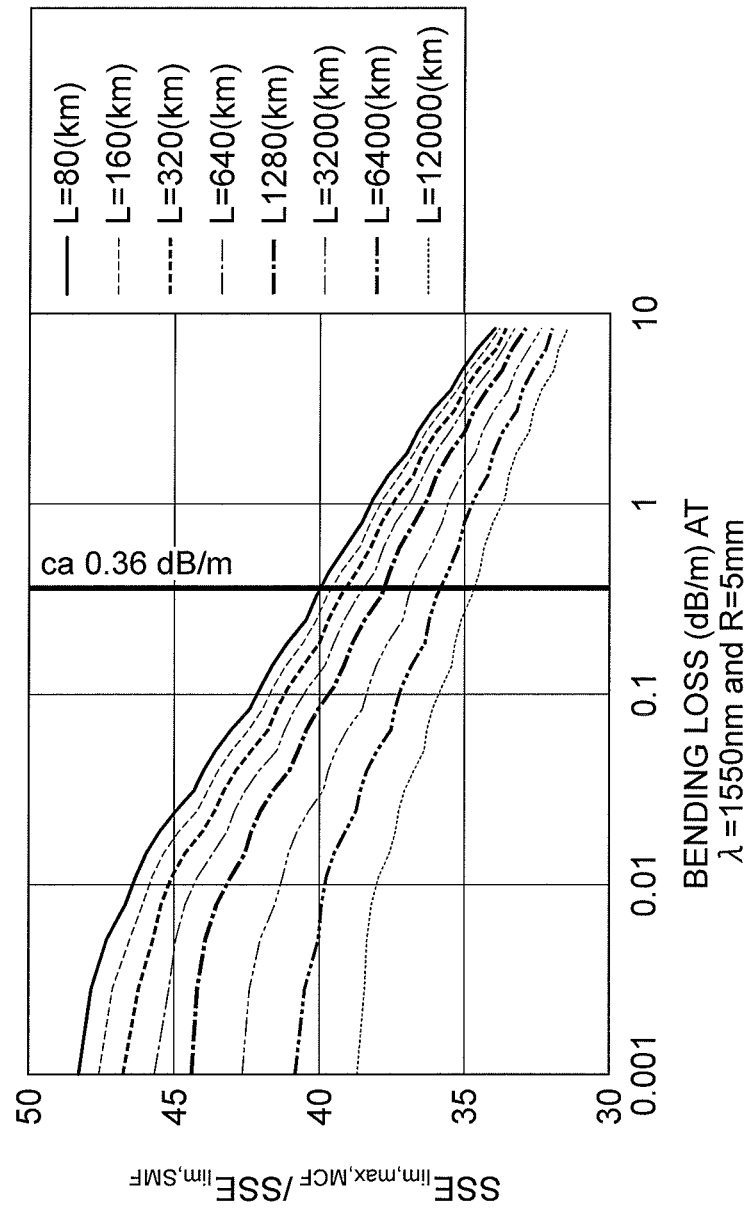
FIG. 11 is a drawing for explaining relations between $SSE_{lim,max,MCF}/SSE_{lim,SMF}$ and bending loss in bending radius of 5 mm at the wavelength of 1550 nm, for respective cases of L of 80 km, 160 km, 320 km, 640 km, 1280 km, 3200 km, 6400 km, and 12000 km.

Next, FIG. 10 and FIG. 11 show relations between $SSE_{lim,max,MCF}/SSE_{lim,SMF}$ and bending loss. $SSE_{lim,SMF}$ is, as described above, $SSE_{lim}$ of the single-core optical fiber on the assumption of $A_{eff}$ of 80 μm², no crosstalk, and the core pitch Λ of 250 μm being the coating diameter of the fiber. It is seen from FIGS. 10 and 11 that $SSE_{lim,max,MCF}$ becomes larger with decrease of the bending loss of each core in the multi-core optical fiber. This is because the bending loss becoming smaller means confinement of light in the cores becoming stronger, i.e., desired crosstalk can be realized at a shorter core pitch. By taking this into consideration, the relationship between $SSE_{lim,max,MCF}/SSE_{lim,SMF}$ and bending loss is considered to be more essential than the relationship between $SSE_{lim,max,MCF}/SSE_{lim,SMF}$ and $A_{eff}$. For example, according to FIG. 10, when the bending loss of each core in the multi-core optical fiber with bending in the radius of 7.5 mm is not more than about 1.3 dB/m at the wavelength of 1550 nm, $SSE_{lim,max,MCF}/SSE_{lim,SMF}$ can be not less than 30 even at one span of L=80 km; when the bending loss is not more than about 0.4 dB/m, $SSE_{lim,max,MCF}/SSE_{lim,SMF}$ can be not less than 30 even at 150 spans of L=12000 km. It is seen from FIG. 11 that when the bending loss of each core in the multi-core optical fiber with bending in the radius of 5 mm is not more than about 0.36 dB/m at the wavelength of 1550 nm, $SSE_{lim,max,MCF}/SSE_{lim,SMF}$ can be not less than 40. Furthermore, in the case of L=80 km, the relations of $SSE_{lim,max,MCF}/SSE_{lim,SMF}$ with the bending loss $\alpha_{R7.5}$ in the radius of 7.5 mm and with the bending loss $\alpha_{R5}$ in the radius of 5 mm can be approximated by Expressions (63) and (64) below. However, this approximation is valid in the range of $\alpha_{R7.5}$ of 0.01 dB/m to 100 dB/m or in the range of $\alpha_{R5}$ of 0.01 dB/m to 10 dB/m.

$$\alpha_{R7.5} \cong 2.69 \times 10^8 \exp\left(-6.46 \times 10^{-1} \frac{SSE_{lim,max,MCF}}{SSE_{lim,SMF}}\right) \quad (63)$$

$$\alpha_{R5} \cong 1.07 \times 10^9 \exp\left(-5.46 \times 10^{-1} \frac{SSE_{lim,max,MCF}}{SSE_{lim,SMF}}\right) \quad (64)$$

Figure 12A:
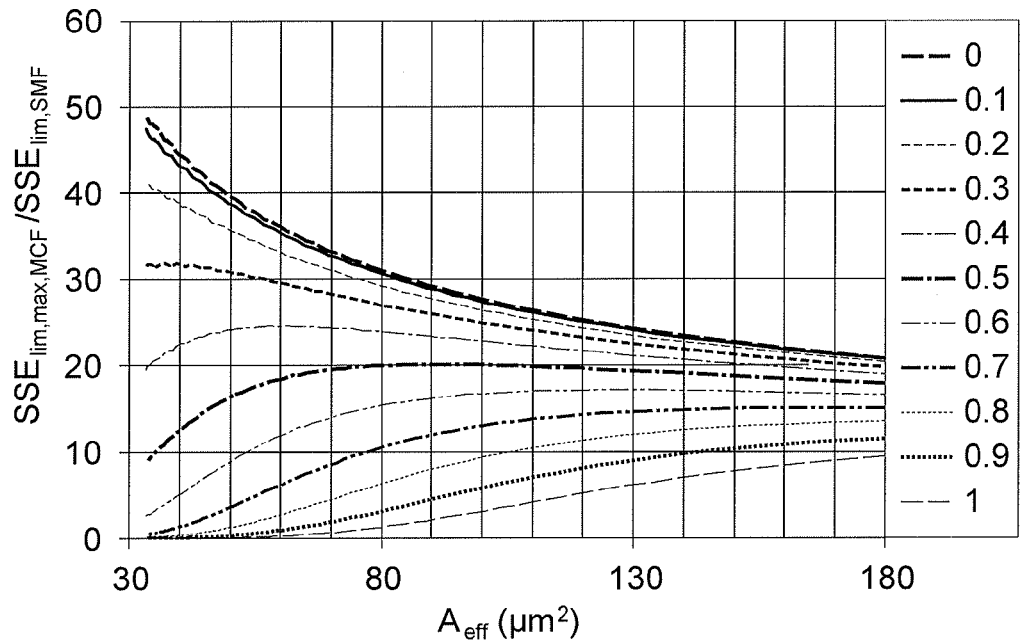
FIGS. 12A and 12B are drawings showing the result of calculation of relations between $SSE_{lim,max,MCF}/SSE_{lim,SMF}$ and $A_{eff}$ with consideration to influence of splice loss in splicing of optical fibers.
Figure 12B:
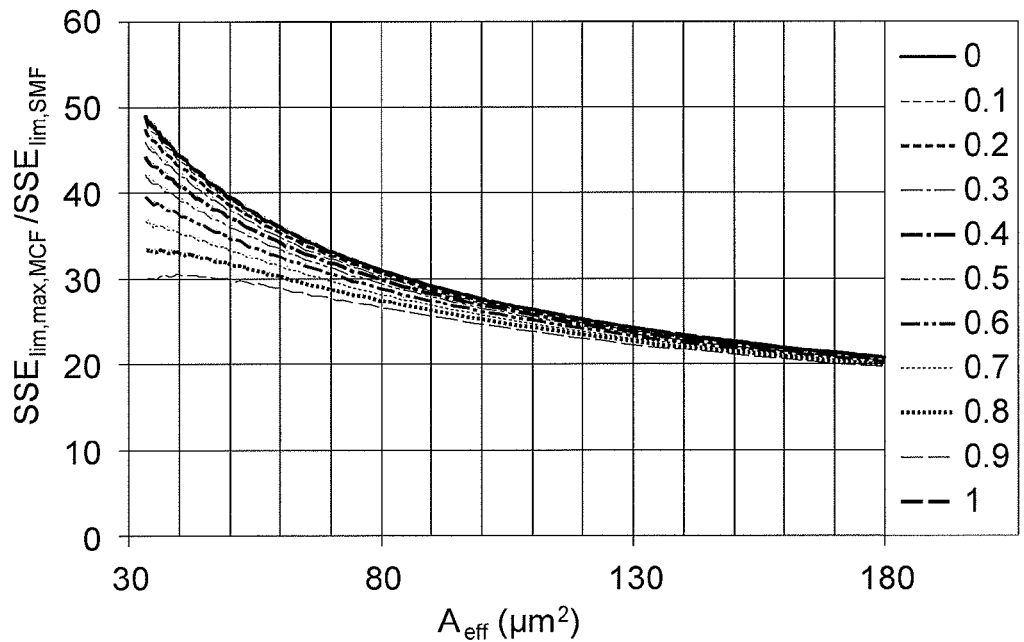

On the other hand, the decrease of $A_{eff}$ raises concern for increase of loss due to axial deviation when optical fibers are spliced to each other along the optical axis. FIGS. 12A and 12B show the result of recalculation of the relationship between $SSE_{lim,max,MCF}/SSE_{lim,SMF}$ and $A_{eff}$ with consideration to influence of splice loss in splicing of optical fibers. FIG. 12A is based on the assumption that optical fibers are spliced every 1 km, and FIG. 12B is based on the assumption that optical fibers are spliced every 10 km. An axial deviation amount refers to the magnitude of axial deviation between cores due to misalignment of the optical fibers themselves and deviation of arrangement of the cores. It is assumed herein that axial deviation amounts at splice points appear at random in accordance with a normal distribution. FIGS. 12A and 12B show the result of calculation of the relation between $SSE_{lim,max,MCF}/SSE_{lim,SMF}$ and $A_{eff}$ for each of standard deviations of the axial deviation amount in the range of 0 to 1 μm, and values of explanatory note is standard deviations [μm] of the axial deviation amount. As a result, it is confirmed, as shown in FIGS. 12A and 12B, that the relationship between $SSE_{lim,max,MCF}/SSE_{lim,SMF}$ and $A_{eff}$ changes significantly with variation of the splice pitch of optical fibers and the axial deviation amount.

Figure 13:
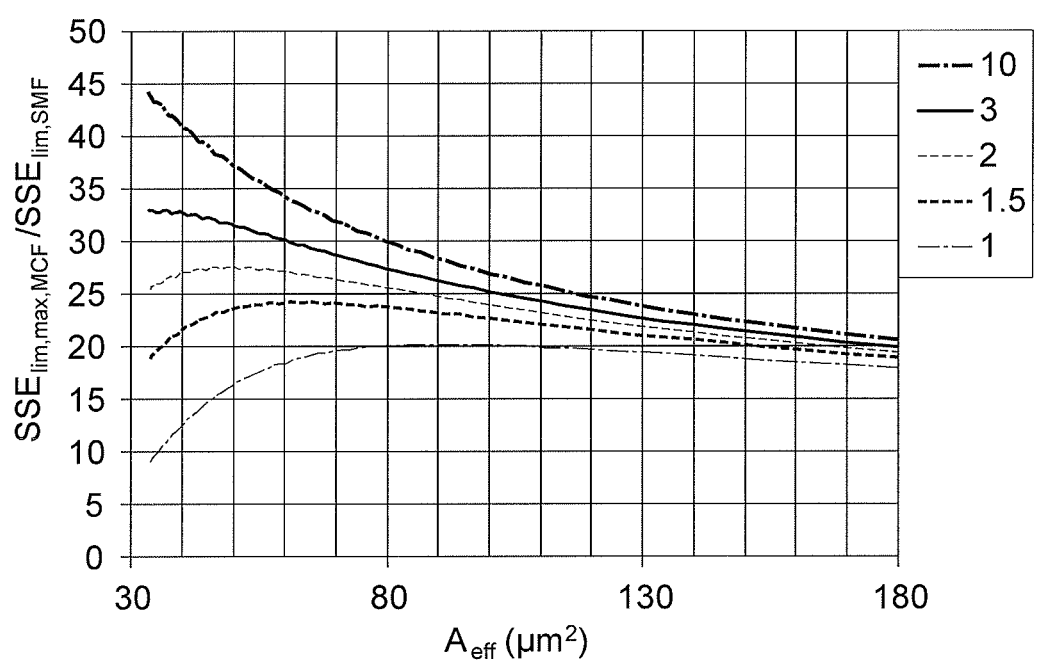
FIG. 13 is a drawing showing the result of calculation of relations between $SSE_{lim,max,MCF}/SSE_{lim,SMF}$ and $A_{eff}$ for cases of different splice intervals between optical fibers.

FIG. 13 shows relations between $SSE_{lim,max,MCF}/SSE_{lim,SMF}$ and $A_{eff}$ on the assumption that the practical standard deviation of axial deviation amount in splicing of multi-core optical fibers is 0.5 μm, with the splice pitch between optical fibers being changed as 1 km, 1.5 km, 2 km, 3 km, and 10 km. When the splice pitch is as short as 1 km, $SSE_{lim,max,MCF}/SSE_{lim,SMF}$ becomes smaller in the small range of $A_{eff}$ and therefore $A_{eff}$ is preferably kept not less than about 50 μm² in order to avoid large decrease of $SSE_{lim,max,MCF}/SSE_{lim,SMF}$. There are also cases where optical fibers of about 1 km are connected in laying operation and used, for example, because of limitations in manufacturing or laying as in the case where a thick cable with a large number of embedded fibers is used; however, the decrease of $SSE_{lim,max,MCF}/SSE_{lim,SMF}$ can be prevented when $A_{eff}$ is kept not less than 50 μm².

At every span, the multi-core optical fiber is connected to an EDFA for amplification of signal light and it is therefore generally the case that there are two locations (input and output to EDFA) of connections between EDFA and multi-core optical fiber per span. MFD of EDFA is generally from 4 to 8 μm at the wavelength of 1550 nm ($A_{eff}$ thereof is approximately from a little over 10 μm² to a little over 50 μm²). In a fiber for single-core transmission, $A_{eff}$ is normally expanded for reduction of non-linear noise and for this reason, there is a large mismatch of MFD between EDFA and single-core transmission fiber, so as to increase the splice loss in a simple connection condition. Therefore, the fiber is subjected to a treatment of diffusing a dopant in glass by a thermal treatment so as to make the change of index profile gentler between EDFA and single-core transmission fiber (which is called a TEC (Thermally Expanded Core) treatment). However, the TEC treatment takes some treatment time. When there are not many fiber connection points in one span, the smaller $A_{eff}$ of the multi-core optical fiber, i.e., the smaller MFD, the larger $SSE_{lim,max,MCF}/SSE_{lim,SMF}$; therefore, when MFD of the multi-core optical fiber is set to a value close to MFD of EDFA (from 4 to 8 μm), it is feasible to simultaneously achieve increase of $SSE_{lim,max,MCF}/SSE_{lim,SMF}$ and reduction of the splice loss between the multi-core optical fiber and EDFA. Accordingly, MFD of the multi-core optical fiber of the present embodiment is preferably in the range of 4 to 8 μm at the wavelength of 1550 nm. It is also true in the case of the TEC treatment being carried out that the difference between MFDs of EDFA and the multi-core optical fiber is preferably as small as possible because the splice loss can be made smaller.

As described above, the multi-core optical fiber according to the present embodiment has the cable cutoff wavelength of each core of not more than 1530 nm and the power coupling coefficient η at the wavelength of 1565 nm in the range of about $2.6\times10^{-9}$/km to about $2.9\times10^{-6}$/km (i.e., $\eta_n$ in the range of about $1.5\times10^{-8}$/km to about $1.7\times10^{-5}$/km), so as to improve the overall spectral efficiency per unit sectional area of the multi-core optical fiber, and is effectively used in transmission, particularly, in the C-band of wavelengths of 1530 nm to 1565 nm. Since the C-band is a band with particularly low transmission loss and allows reduction of noise due to optical amplification, it is easy to improve the signal-to-noise ratio of each core in the multi-core optical fiber and to increase the spatial spectral efficiency. When the used wavelength band is limited to the range of the C-band, it is feasible to control the change of η with change of wavelength to a low level and to maintain the spatial spectral efficiency high in the whole used wavelength band or in almost the entire band.

When the cable cutoff wavelength of each core is not more than 1530 nm and the power coupling coefficient η at the wavelength of 1625 nm is in the range of about $1.6 \times 10^{-8}$/km to about $2.9 \times 10^{-6}$/km (i.e., $\eta_n$ in the range of about $9.7 \times 10^{-8}$/km to about $1.7 \times 10^{-5}$/km), the overall spectral efficiency per unit sectional area of the multi-core optical fiber improves and the optical fiber is effectively used in transmission, particularly, in the C+L band of wavelengths of 1530 nm to 1625 nm. Since the C+L band is also a band with low transmission loss and allows reduction of noise due to optical amplification, it is easy to improve the signal-to-noise ratio of each core in the multi-core optical fiber and to increase the spatial spectral efficiency. When the used wavelength band is limited to the range of the C+L band, it is feasible to control the change of with change of wavelength to a low level as well and to maintain the spatial spectral efficiency high in the entire used wavelength band or in almost the entire band.

When the cable cutoff wavelength of each core is not less than 1460 nm, the spectral efficiency per unit sectional area of fiber can be increased even with a short core pitch. The reason for it is as follows: when the cable cutoff wavelength is set longer, confinement of light in the cores can be made stronger and desired crosstalk can be realized with shorter Λ. When the cable cutoff wavelength of each core is not more than 1460 nm, the S-band of wavelengths of 1460 nm to 1530 nm can also be used as a transmission band. Even in that case, the cable cutoff wavelength of core is preferably set not less than 1360 nm and more preferably not less than 1390 nm, whereby the cable cutoff wavelength can be set long within the range satisfying the condition of not more than 1460 nm and the spectral efficiency per unit sectional area of fiber can also be increased even with a short core pitch. At this time, is preferably in the range of about $1.4 \times 10^{-7}$/km to about $2.9 \times 10^{-6}$/km (i.e., $\eta_n$ is preferably in the range of about $8.3 \times 10^{-7}$/km to about $1.7 \times 10^{-5}$/km).

The foregoing multi-core optical fiber can have a mode in which $A_{\mathit{eff}}$ of each core at the first wavelength is not more than 87 μm², and further can have a mode of not more than 50 μm². When $A_{\mathit{eff}}$ is set in the foregoing range, the spectral efficiency per unit sectional area of fiber is more improved.

In order to increase the spectral efficiency per unit sectional area of fiber even in use of a long optical fiber link constructed with repetitive connections of short fibers in fiber installation, $A_{\mathit{eff}}$ of each core at the first wavelength is preferably not less than 50 μm².

A practical optical fiber preferably further has a depressed layer with a refractive index lower than the cladding, between the core and the cladding, in order to further improve the spectral efficiency per unit sectional area of fiber. Another possible configuration for improving the spectral efficiency per unit sectional area of fiber is, specifically, a mode in which the optical fiber further has a trench layer with a refractive index lower than the cladding, between the core and the cladding, and further has an inner cladding layer with a refractive index lower than the core and higher than the trench layer, between the core and the trench layer. With these configurations, it becomes feasible to enhance the confinement of light of propagation modes in the cores while maintaining $A_{\mathit{eff}}$ and $\lambda_{cc}$, whereby desired crosstalk can be realized with a shorter core pitch, so as to further improve the spectral efficiency per unit sectional area of fiber.

In the immediately foregoing seventeen paragraphs, the above discussed the case of Expression (46) where the cores were ideally infinitely packed, thereby clearly showing the desired core characteristics and the desired core-to-core power coupling coefficient (in turn, the desired core pitch). However, for improvement in $SSE_{lim}$ of actual multi-core optical fiber, it is necessary to increase $SSE_{lim}$ of the multi-core optical fiber obtained by Expression (47).

When the distance of the outermost cores from the center of the fiber is settled, the sectional area of the multi-core optical fiber can be reduced with smaller $d_{coat}$ and $d_{clad}$, so as to improve $SSE_{lim}$ of the multi-core optical fiber. However, since it is generally the case that, in the optical fiber for transmission, the coating has the refractive index higher than the cladding in order to suppress propagation of a clad mode, if $d_{clad}$ is too small, light propagating in the outermost cores becomes likely to leak into the coating, so as to increase the transmission loss of the outermost cores, and therefore it is necessary to determine an appropriate size of $d_{clad}$ according to core design. As the confinement of light in the cores becomes stronger, the increase of transmission loss of the outermost cores can be suppressed even with smaller $d_{clad}$; therefore, $\lambda_{cc}$ is preferably as long as possible from this point as well and the bending loss and $A_{\mathit{eff}}$ are preferably as small as possible. Let us define herein $d_{clad,min}$ as minimum $d_{clad}$ that can control the increase of transmission loss of the outermost cores within a permissible range, and at the same time, let us define as $r_{om,max} = r_{clad} - d_{clad,min}$.

When $d_{clad,min}$ and $d_{coat}$ are assumed to take fixed values, the ratio of area $\pi r_{om,max}^2$ of "the core arrangeable region where the cores can be arranged" to sectional area $A_{coat} = \pi r_{coat}^2$ of the multi-core optical fiber increases as $r_{clad}$ becomes larger; therefore, if the number of cores per area in "the core arrangeable region" is approximately constant, $SSE_{lim}$ can be improved with increase in the number of cores per unit sectional area of the multi-core optical fiber.

It is, however, known that a probability of rupture upon bending of fiber increases with increase of $r_{clad}$. This is described, for example, in S. Matsuo et al., "Large-effective-area ten-core fiber with cladding diameter of 200 μm," Opt. Lett, vol. 36, no. 23, pp. 4626-4628 (2011). (which will be referred to hereinafter as Reference Literature 7). The rupture probability increases with decrease in the bending radius of fiber and permissible maximum $r_{clad}$ is determined based on what rupture probability is permitted in what bending radius. According to Reference Literature 7, it is known that the rupture probability equivalent to that in the case where the standard single-mode fiber with $2r_{clad} = 125$ μm is bent in the bending radius of 15 mm, can be realized with $2r_{clad} \leq 225$ μm by relaxing the bending radius to 30 mm. Therefore, $2r_{clad}$ of the multi-core optical fiber is preferably not less than 125 μm and not more than 225 μm, more preferably not less than 150 μm and not more than 225 μm, still more preferably not less than 175 μm and not more than 225 μm, and yet more preferably not less than 200 μm and not more than 225 μm.

Values of Expression (47) are values that vary depending upon $d_{coat}$. When the standard single-mode optical fiber has $2r_{coat}$ of 250 μm and $2r_{clad}$ of 125 μm, $d_{coat}$ is 62.5 μm, but there is a margin for decrease of $d_{coat}$. For example, the single-mode optical fiber with $2r_{coat}$ of 200 μm and $2r_{clad}$ of 125 μm is already proposed for the purpose of reduction of cable diameter, and $d_{coat}$ in this case is 37.5 μm. Adverse influence on the fiber due to the decrease of $d_{coat}$ is as follows: when the fiber is microbent, the smaller $d_{coat}$, the more the microbend is created in the glass part of fiber (including the cladding and the region inside thereof), and the more likely an increase of loss due to the microbend occurs. It is, however, known that the microbend occurring in the glass part of fiber decreases with increase of the clad diameter. Therefore, particularly, in the case of the multi-core optical fiber with the clad diameter of more than 125 µm, $d_{coat}$ is preferably not more than 37.5 µm and $d_{coat}$ is preferably not more than 42.5 µm even with consideration to manufacturing dispersion of ±10 µm for $2r_{coat}$. In the calculation hereinafter, first, investigation with $d_{coat}$ fixed at 37.5 µm will be made for discussing the performance of the interior part (bare fiber) from the cladding of the multi-core optical fiber.

Figure 14:
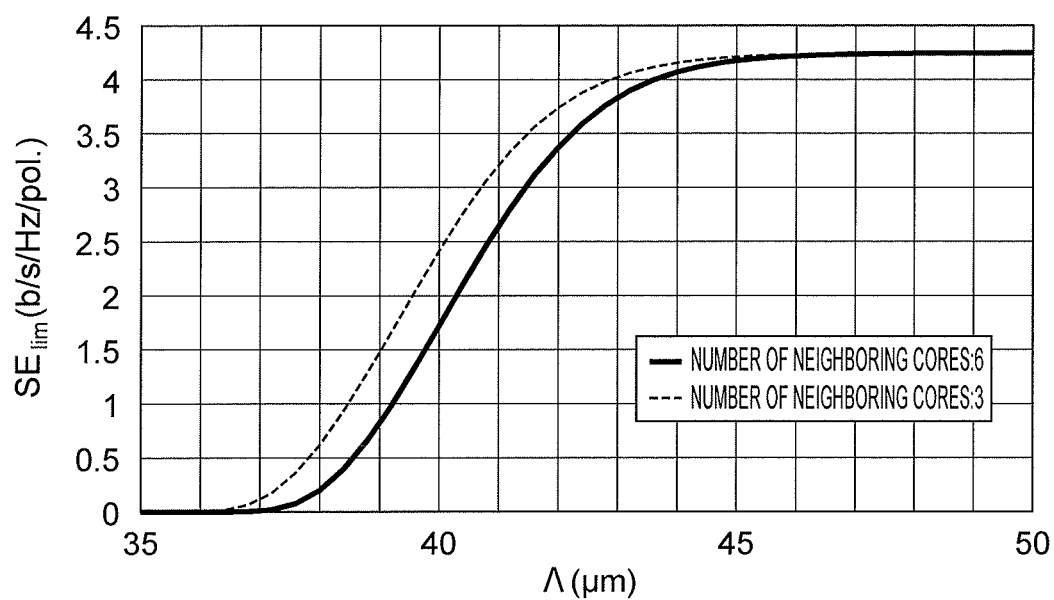
FIG. 14 is a drawing showing an example of influence on $SSE_{lim}$ due to change in the number of adjacent cores from 6 to 3.

In the discussion below, for simplicity, $SE_{lim}$ is derived using Expression (40) and Expression (47). Expression (40) is based on the assumption of the case where the cores are arranged in the triangular grid pattern and there are six adjacent cores to each of all the cores, but in the case of the multi-core optical fiber shown in FIG. 4, the number of cores adjacent to one of the outermost cores is three. In a precise sense, therefore, the condition for the cores of the optical fiber is different from that for Expression (40). It is confirmed, however, as shown in FIG. 14 that influence on $SE_{lim}$ due to the change in the number of adjacent cores from 6 to 3 is only a shift of change position of $SE_{lim}$ due to crosstalk so as to decrease the core pitch Λ by about 1 µm, in the case of $A_{eff}$ of 80 µm²; therefore, there is no significant influence on the tendency of the entire result. For this reason, the investigation was conducted using Expression (40) for simplicity.

Figure 15B:
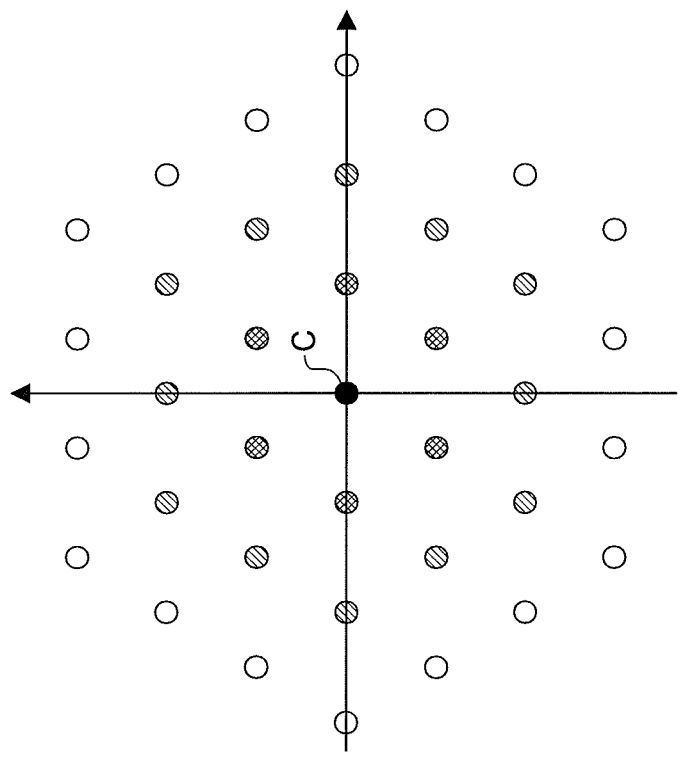
FIGS. 15A and 15B are drawings for explaining core constellations of triangular grid 1 and triangular grid 2.
Figure 15A:
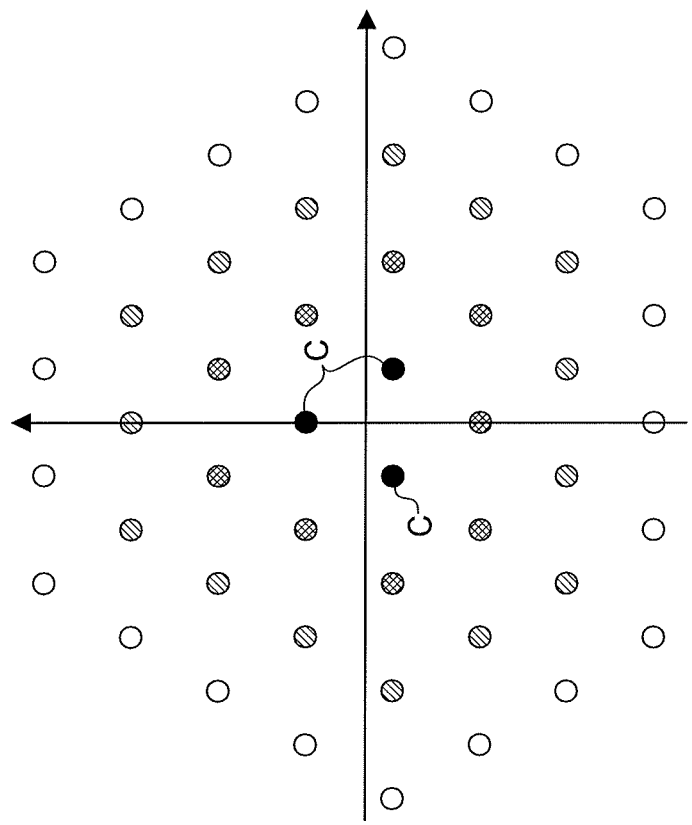

$A_{eff}$ and Λ dependences of $SSE_{lim}$ are obtained herein for core constellations of three patterns below.
1) Triangular grid 1: a core constellation wherein a core is arranged at the center of the optical fiber and around the periphery thereof cores are increased layer by layer. Reference is made to FIG. 15A.
2) Triangular grid 2: one in which more cores can be arranged and being selected from: a core constellation (see FIG. 15B) wherein the center of the optical fiber is located at the middle point of three innermost cores and around the periphery thereof cores are increased layer by layer; and the core constellation of "triangular grid 1."
3) The best known packing: a core constellation in which the maximum number of cores are packed irrespective of the grid shape, based on E. Specht, The best known packings of equal circles in a circle, 17 Jun. 2010, Available: htt://hydra.nat.u-nit-magdeburg.de/packing/cci/cci.html [Homepage: http://www.packomania.com/] (which will be referred to hereinafter as Reference Literature 8).

Figure 16:
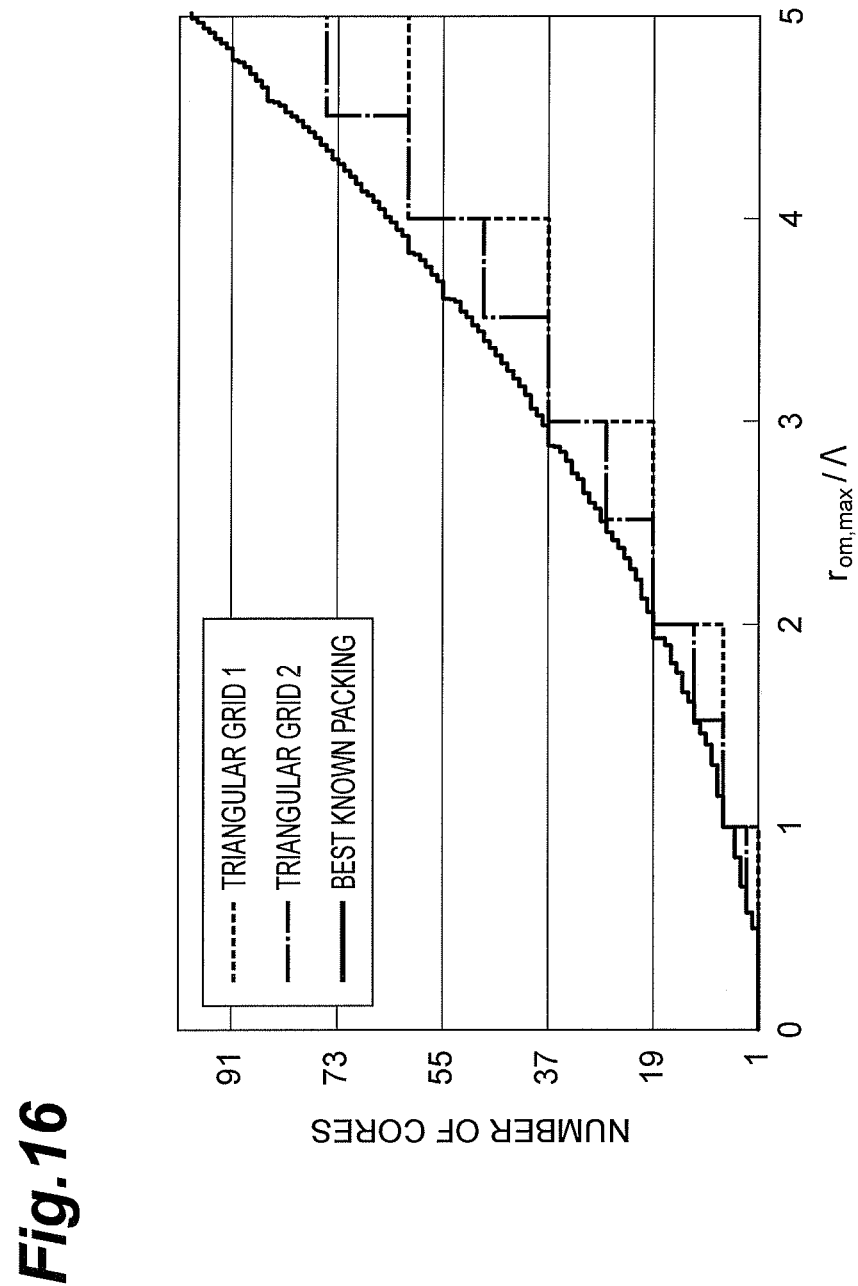
FIG. 16 is a drawing showing relations between $r_{om,max}/\Lambda$ and the number of cores.

For each of the cases 1) to 3) above, a relation between $r_{om,max}/\Lambda$ and the number of cores $N_{core}$ is shown in FIG. 16. Concerning the relations of FIG. 16, in the case of "triangular grid 1" above, where the number of core layers is denoted by $n_{layer}$ and $n_{layer}=1$ for the center core on the basis of FIG. 15A, Expressions (65) and (66) below hold.

$$n_{layer} = \frac{r_{om}}{\Lambda} + 1 = \left\lfloor \frac{r_{om,max}}{\Lambda} + 1 \right\rfloor \quad (65)$$

$$N_{core} = 1 + 3n_{layer}(n_{layer} - 1) \quad (66)$$

$$= 1 + 3\left\lfloor \frac{r_{om,max}}{\Lambda} + 1 \right\rfloor \left(\left\lfloor \frac{r_{om,max}}{\Lambda} + 1 \right\rfloor - 1\right)$$

When the three center cores are $n_{layer}=1$ on the basis of FIG. 15B, Expressions (67) and (68) below hold and therefore, $N_{core}$ in the case of "triangular grid 2" can be determined to be the larger of Expression (66) and Expression (68).

$$n_{layer} = \frac{1}{2} + \sqrt{\left(\frac{r_{om}}{\Lambda}\right)^2 - \frac{1}{12}} = \left\lfloor \frac{1}{2} + \sqrt{\left(\frac{r_{om,max}}{\Lambda}\right)^2 - \frac{1}{12}} \right\rfloor \quad (67)$$

$$N_{core} = 3n_{layer}^2 \quad (68)$$

$$= 3\left\lfloor \frac{1}{2} + \sqrt{\left(\frac{r_{om,max}}{\Lambda}\right)^2 - \frac{1}{12}} \right\rfloor^2$$

It is noted herein that $\lfloor x \rfloor$ is a maximum integer not exceeding x.

In the case of "the best known packing," where circles with an equal radius are packed in a unit circle, a maximum radius $r_{pack,max}$ permitting packing for the number of circles is described as "radius" in Reference Literature 8. The relation of Expression (69) below holds among $r_{pack,max}$, $r_{om,max}$, and Λ.

$$r_{pack,max} = \frac{\Lambda/2}{r_{om,max} + \Lambda/2} \quad (69)$$

Therefore, relations between $r_{pack,max}$ and $r_{om,max}/\Lambda$ can be represented by Expressions (70) and (71) below.

$$r_{pack,max} = \frac{1}{2r_{om,max}/\Lambda + 1} \quad (70)$$

$$\frac{r_{om,max}}{\Lambda} = \frac{1 - r_{pack,max}}{2r_{pack,max}} \quad (71)$$

As described above, the problem of how the cores should be arranged on a cross section of the multi-core optical fiber can be translated into a problem of how many circles with the radius $r_{pack,max}$ represented by Expression (69) can be packed in a unit circle.

Figure 17:
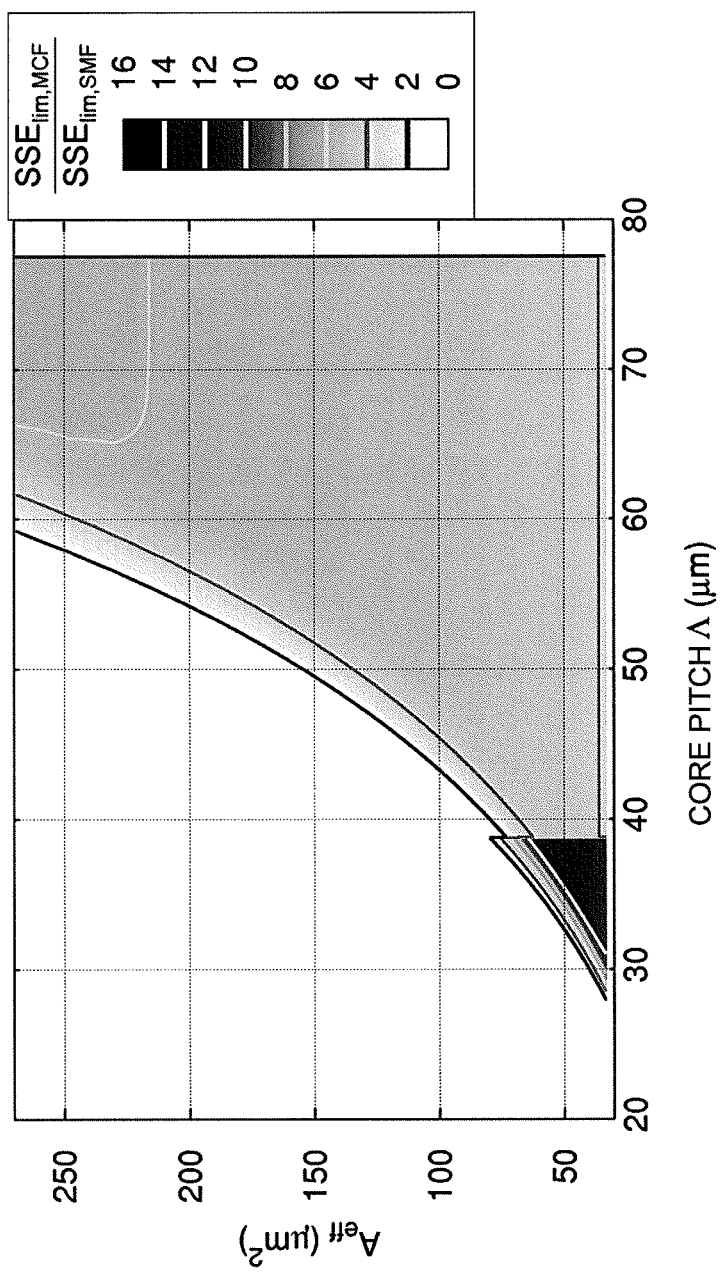
FIG. 17 is a drawing showing the result of calculation of $A_{eff}$ and $\Lambda$ dependences of $SSE_{lim}$ in the case of "triangular grid 1," with $2r_{clad}=225$ μm.
Figure 18:
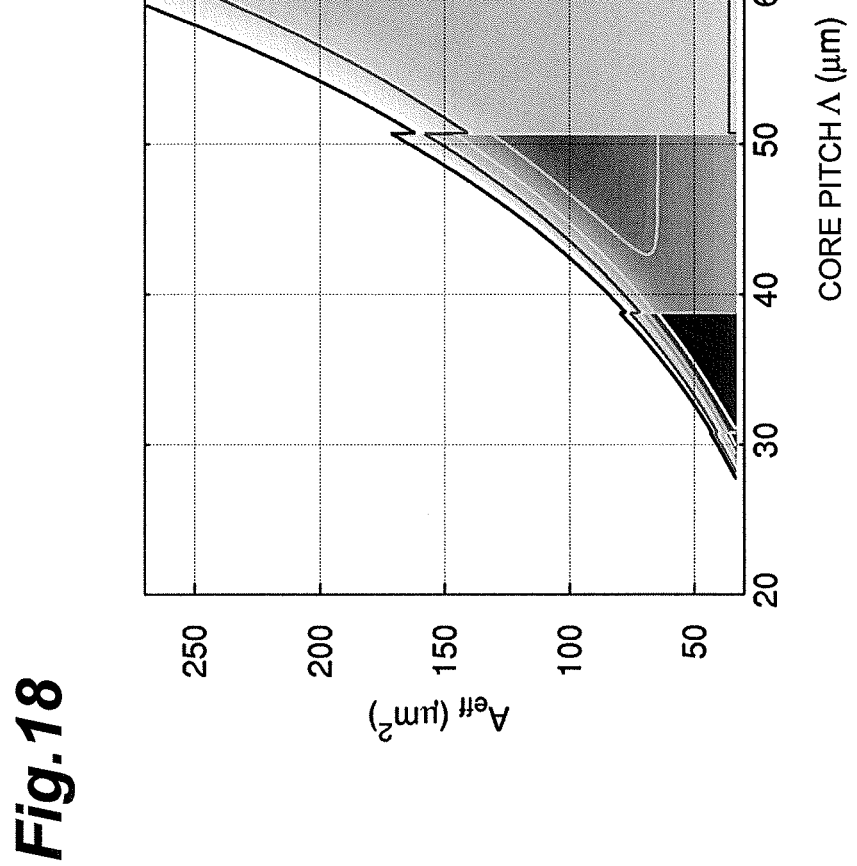
FIG. 18 is a drawing showing the result of calculation of $A_{eff}$ and $\Lambda$ dependences of $SSE_{lim}$ in the case of "triangular grid 2," with $2r_{clad}=225$ μm.
Figure 19:
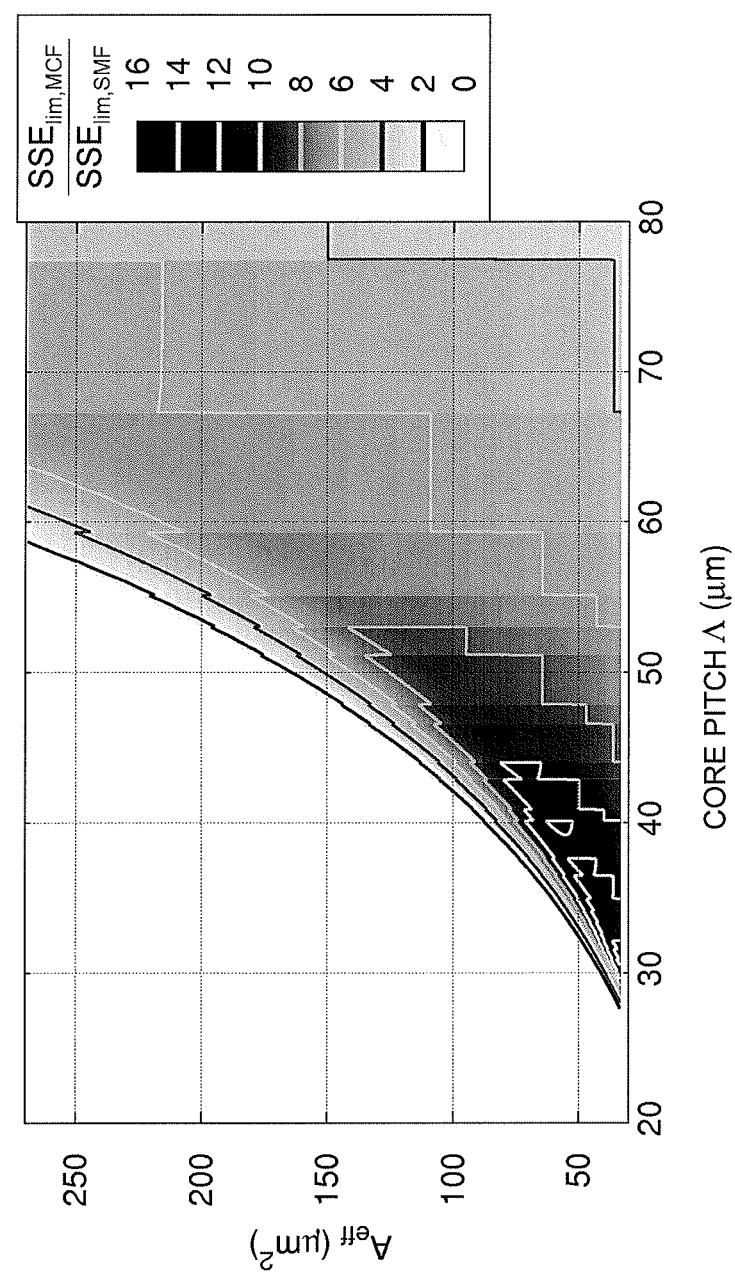
FIG. 19 is a drawing showing the result of calculation of $A_{eff}$ and $\Lambda$ dependences of $SSE_{lim}$ in the case of "the best known packing," with $2r_{clad}=225$ μm.
Figure 20:
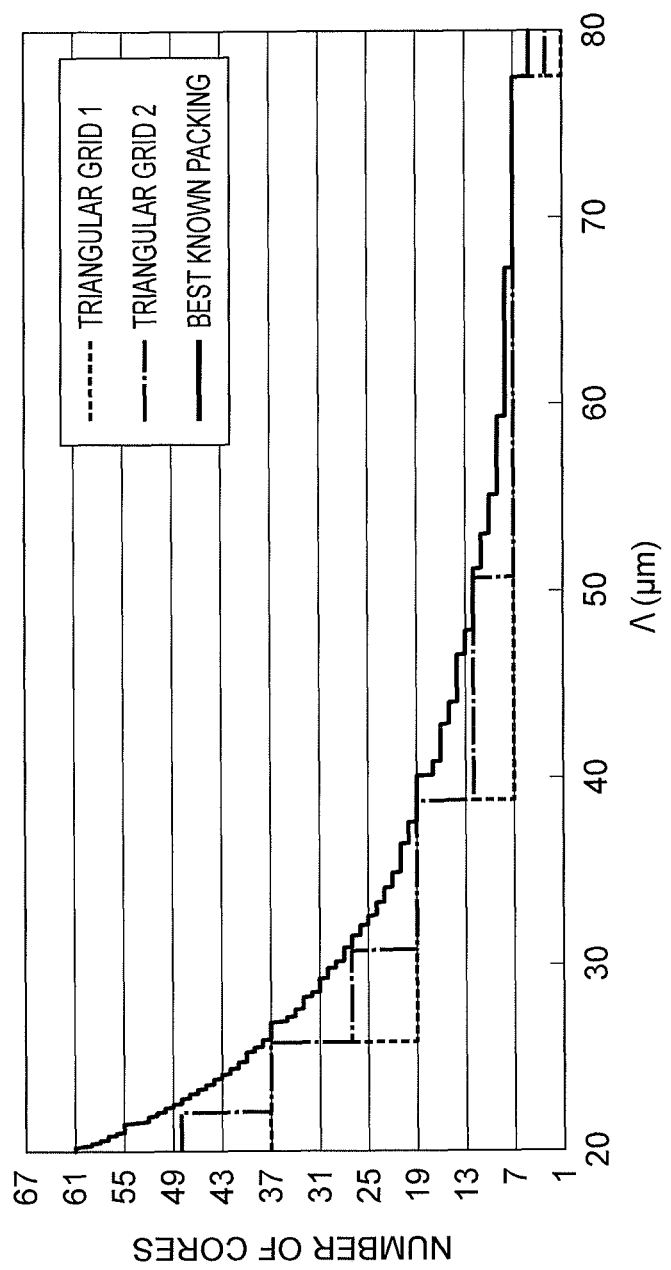
FIG. 20 is a drawing showing relations between core pitch $\Lambda$ and the number of cores.

First, FIGS. 17 to 19 show the result of calculation of dependences of $SSE_{lim}$ on $A_{eff}$ and Λ, for multi-core optical fibers with $2r_{clad}=225$ µm in the foregoing core constellations of three conditions. It was assumed herein for simplicity that $d_{clad,min}=35$ µm. In this case $r_{om,max}=77.5$ µm. FIG. 17 is a drawing showing the result for the core constellation of "triangular grid 1," FIG. 18 a drawing showing the result for the core constellation of "triangular grid 2," and FIG. 19 a drawing showing the result for the core constellation of "the best known packing." FIG. 20 is a drawing showing relations between core pitch Λ and the number of cores in the above three conditions. It was found by these drawings that the overall tendencies were similar even with the difference of the core constellation patterns and that $SSE_{lim}$ increased with decrease of $A_{eff}$ and also with decrease of Λ. This is the same tendency as in the case where the cores are ideally arranged. The reason for this tendency is that the number of cores can be increased by decrease of $A_{eff}$ to allow decrease of Λ, without influence of crosstalk.

It was, however, confirmed that the dependences on $A_{eff}$ and Λ were different among the core constellation patterns. For example, in the case of the core constellation of "triangular grid 1," as shown in FIG. 20, the number of packable cores changes from 1 to 7 with the core pitch Λ of not more than 77.5 µm, and the number of cores changes from 7 to 19 with the core pitch Λ of not more than about 38.75 µm. It is, however, clear from FIG. 17 that with the core pitch Λ of not more than about 38.75 µm, the influence of crosstalk becomes significant in the calculated range and an increase in the number of cores does not lead to an increase of $SSE_{lim}$. On the other hand, in the case of the core constellation of "triangular grid 2," the change of the core pitch Λ can lead to step-by-step increase in the number of cores and the increase of $SSE_{lim}$ due to change in $A_{eff}$ and Λ becomes greater. It became clear from FIGS. 19 and 20 that such tendency was more prominent in the case of the core constellation of "the best known packing."

It is found that "triangular grid 2" is more preferable for improvement of $SSE_{lim}$ than the case of "triangular grid 1" because the number of cores can be efficiently increased even with small decrease of Λ and that the case of "the best known packing" is more preferable for improvement of $SSE_{lim}$ than the case of "triangular grid 2" because the number of cores can be efficiently increased even with small decrease of Λ. As already described, the problem of how the cores should be arranged on the cross section of the multi-core optical fiber can be translated into the problem of how many circles with the radius $r_{pack,max}$ represented by Expression (69) can be packed in a unit circle. If it is the case, we can consider as efficiency of packing, Expression (72) which is a ratio of "the number of cores $N_{core}$" to "ratio $1/r_{pack,max}^2$ of the area of the unit circle to the area of the circle with the radius $r_{pack,max}$."

$$\frac{N_{core}}{1/r_{pack,max}^2} = N_{core} r_{pack,max}^2 = N_{core}\left(1 - \frac{r_{om,max}/\Lambda}{r_{om,max}/\Lambda + 1/2}\right)^2 \quad (72)$$

Figure 21:
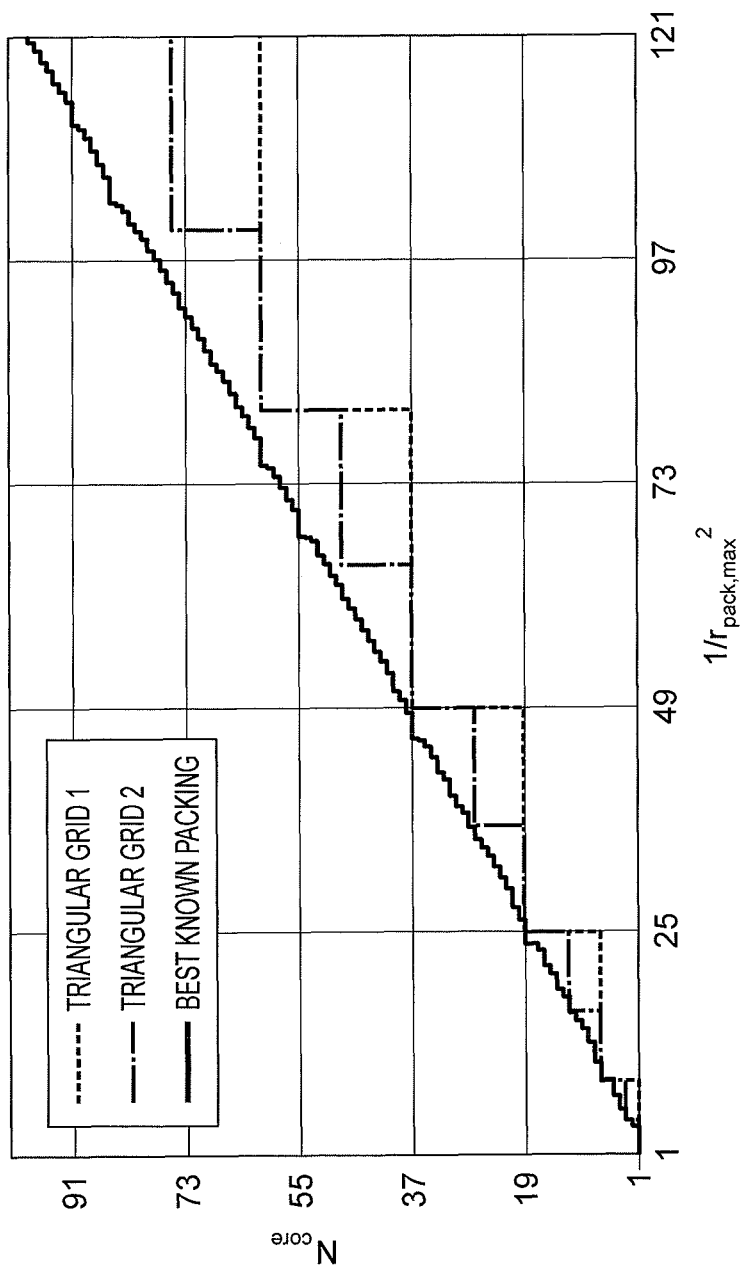
FIG. 21 is a drawing showing relations between $1/r_{pack,max}^2$ and $N_{core}$.
Figure 22:
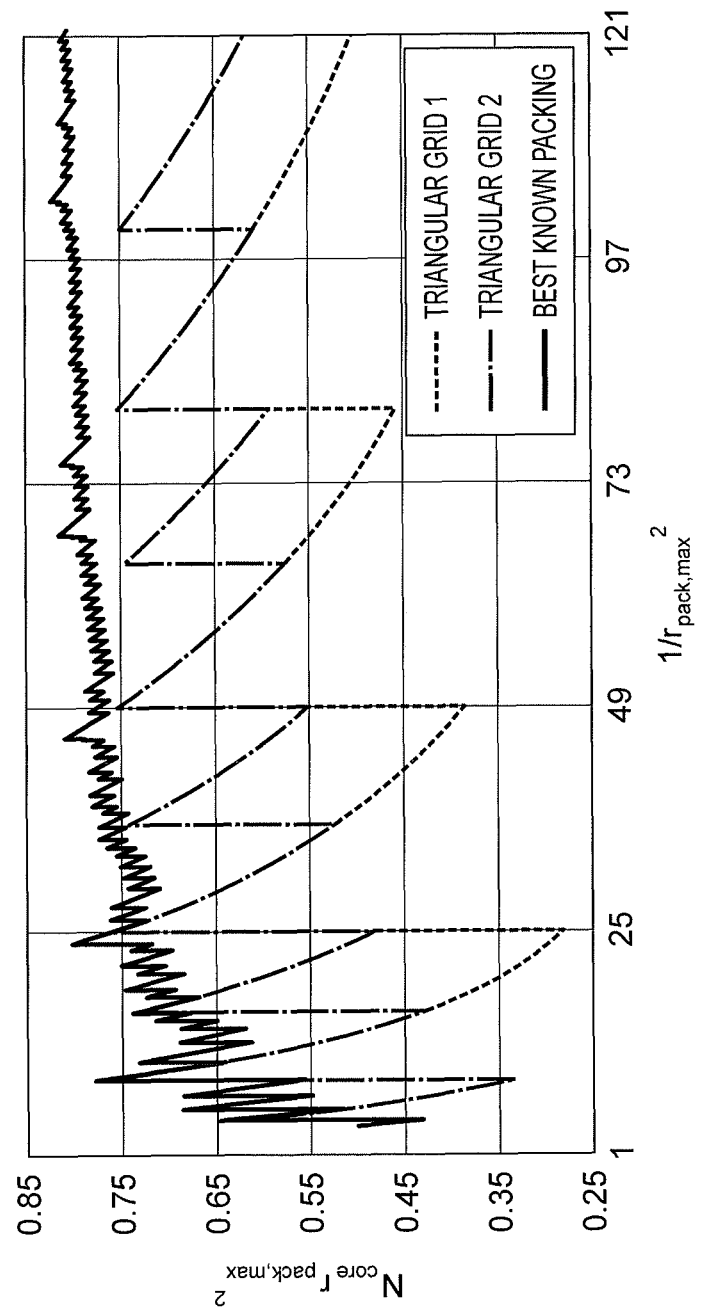
FIG. 22 is a drawing showing relations between $1/r_{pack,max}^2$ and $N_{core} \cdot r_{pack,max}^2$.

First, FIGS. 21 and 22 show relations of $1/r_{pack,max}^2$ with $N_{core}$ or with $N_{core} \cdot r_{pack,max}^2$ for the respective core constellation cases of "triangular grid 1," "triangular grid 2," and "the best known packing." It is seen in the case of "the best known packing" that $N_{core} \cdot r_{pack,max}^2$ maintains large values against the wide range of $1/r_{pack,max}^2$, and, it is also seen from FIGS. 21 and 22 together that when $N_{core}$ is not less than 7 or not less than 8, $N_{core} \cdot r_{pack,max}^2$ is preferably always kept not less than about 0.61, for packing a greater number of cores in the multi-core optical fiber.

However, $r_{om,max}$ cannot be always clearly known in the actual multi-core optical fibers and for this reason, it is also considered that $r_{pack,max}$ cannot be clearly known. Then, let us perform investigation using $r_{om}$ based on actual core constellations.

As described previously, the possessed sectional area per core (the area of the region enclosed by the dashed line centered on one core in FIG. 2) in the case where the cores are ideally infinitely packed, can be represented by $(3^{1/2}/2)\Lambda^2$ using the core pitch Λ. Since the packing of cores in actual fibers can be replaced by packing of circles with the radius Λ/2 in a circle with the radius of $r_{om}+\Lambda/2$, when the possessed sectional area per core in the region within the radius of $r_{om}+\Lambda/2$ is represented by $\pi(r_{om}+\Lambda/2)^2/N_{core}$, an effective core packing rate $R_{pack}$ which is a ratio of possessed sectional areas per core in the ideal case and the actual fiber is represented by Expression (73) below.

$$R_{pack} = \frac{\frac{\sqrt{3}}{2}\Lambda^2}{\frac{\pi(r_{om}+\Lambda/2)^2}{N_{core}}} \quad (73)$$

$$= \frac{\sqrt{3}}{\pi} N_{core} \frac{1}{(2r_{om}/\Lambda+1)^2}$$

$$= \frac{\sqrt{3}}{\pi} N_{core} r_{pack}^2$$

Figure 23:
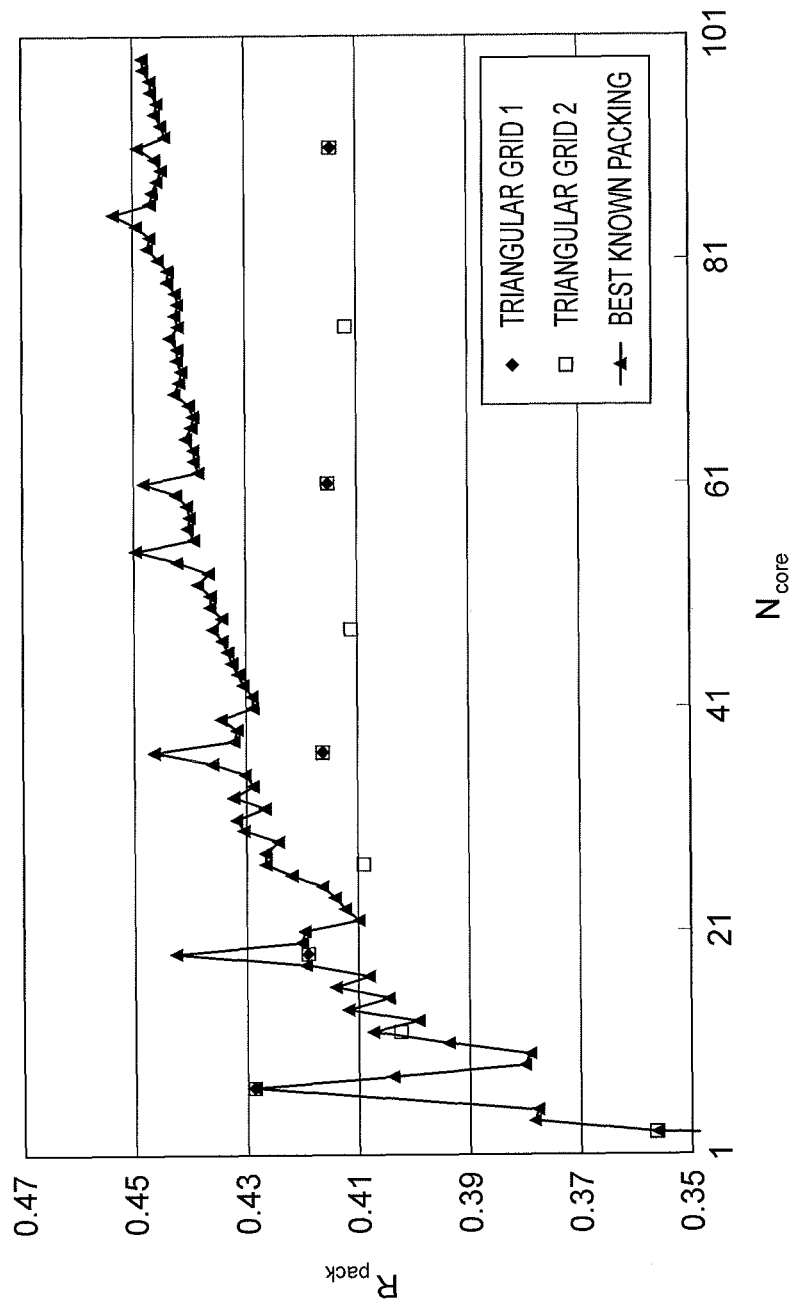
FIG. 23 is a drawing showing relations between $N_{core}$ and $R_{pack}$ for respective cases of "triangular grid 1," "triangular grid 2," and "the best known packing;"

In this case, FIG. 23 shows relations between $N_{core}$ and $R_{pack}$ for the respective core constellation cases of "triangular grid 1," "triangular grid 2," and "the best known packing." $N_{core}$ discretely increases in the cases of "triangular grid 1" and "triangular grid 2," whereas $N_{core}$ almost continuously increases in the case of "the best known packing."

By multiplying $SSE_{lim}$ in the case where the cores are ideally infinitely packed, which is obtained by Expression (46), by both of $R_{pack}$ and a core arrangeable region ratio $R_{eff}$ defined by Expression (74) below, it can be converted into $SSE_{lim}$ of the actual fiber represented by Expression (47).

$$R_{eff} = \frac{\pi(r_{om}+\Lambda/2)^2}{\pi r_{coat}^2} \quad (74)$$

$$= \frac{(r_{om}+\Lambda/2)^2}{r_{coat}^2}$$

$$= \frac{(r_{om}+\Lambda/2)^2}{(r_{om}+d_{clad}+d_{coat})^2}$$

A value of $R_{pack} \cdot R_{eff}$ itself can be not less than about ⅛, which is higher than in the case of the known multi-core optical fibers (e.g., the multi-core optical fiber in Reference Literature 6).

In the case of the core constellation of "the best known packing," when the number of cores is 7 or more, $R_{pack}$ is at least 0.37 or more; therefore, $R_{eff}$ is preferably not less than 0.34, in order to keep $R_{pack} \cdot R_{eff}$ not less than at least ⅛. When the number of cores is 26 or more, $R_{pack}$ is at least 0.42 or more; therefore, $R_{eff}$ is preferably not less than 0.30, in order to keep $R_{pack} \cdot R_{eff}$ not less than at least ⅛. When $\Lambda/2 < d_{clad} + d_{coat}$ and when Λ, $d_{clad}$, and $d_{coat}$ each take constant values, $R_{eff}$ becomes larger with larger $r_{om}$. Namely, $2r_{clad}$ is preferably as large as possible because $R_{eff}$ becomes larger.

Using Expressions (63) and (64), Expressions (75) and (76) below are preferably to be satisfied, in order to satisfy the condition of $R_{pack} \cdot R_{eff} \cdot SSE_{lim,max,MCF}/SSE_{lim,SMF} \geq 7$.

$$\alpha_{R7.5} \leq 2.69 \times 10^8 \exp\left(-6.46 \times 10^{-1} \frac{7}{R_{pack}R_{eff}}\right) \quad (75)$$

$$\alpha_{R5} \leq 1.07 \times 10^9 \exp\left(-5.46 \times 10^{-1} \frac{7}{R_{pack}R_{eff}}\right) \quad (76)$$

Using Expressions (63) and (64), Expressions (77) and (78) below are preferably to be satisfied, in order to satisfy the condition of $R_{pack} \cdot R_{eff} \cdot SSE_{lim,max,MCF}/SSE_{lim,SMF} \geq 7/0.8$.

$$\alpha_{R7.5} \leq 2.69 \times 10^8 \exp\left(-6.46 \times 10^{-1} \frac{8.75}{R_{pack}R_{eff}}\right) \quad (77)$$

$$\alpha_{R5} \leq 1.07 \times 10^9 \exp\left(-5.46 \times 10^{-1} \frac{8.75}{R_{pack}R_{eff}}\right) \quad (78)$$

Using Expressions (63) and (64), Expressions (79) and (80) below are preferably to be satisfied, in order to satisfy the condition of $R_{pack} \cdot R_{eff} \cdot SSE_{lim,max,MCF}/SSE_{lim,SMF} \geq 10$.

$$\alpha_{R7.5} \leq 2.69 \times 10^8 \exp\left(-6.46 \times 10^{-1} \frac{10}{R_{pack} R_{eff}}\right) \quad (79)$$

$$\alpha_{R5} \leq 1.07 \times 10^9 \exp\left(-5.46 \times 10^{-1} \frac{10}{R_{pack} R_{eff}}\right) \quad (80)$$

Using Expressions (63) and (64), Expressions (81) and (82) below are preferably to be satisfied, in order to satisfy the condition of $R_{pack} \cdot R_{eff} \cdot SSE_{lim,max,MCF}/SSE_{lim,SMF} \geq 16$.

$$\alpha_{R7.5} \leq 2.69 \times 10^8 \exp\left(-6.46 \times 10^{-1} \frac{16}{R_{pack} R_{eff}}\right) \quad (81)$$

$$\alpha_{R5} \leq 1.07 \times 10^9 \exp\left(-5.46 \times 10^{-1} \frac{16}{R_{pack} R_{eff}}\right) \quad (82)$$

These relations are valid at least in the range of $\alpha_{R7.5}$ of 0.01 dB/m to 100 dB/m and in the range of $\alpha_{R5}$ of 0.01 dB/m to 10 dB/m. However, since large $\alpha_{R7.5}$ is not preferred, it is preferably at most 10 dB/m or less.

Figure 24:
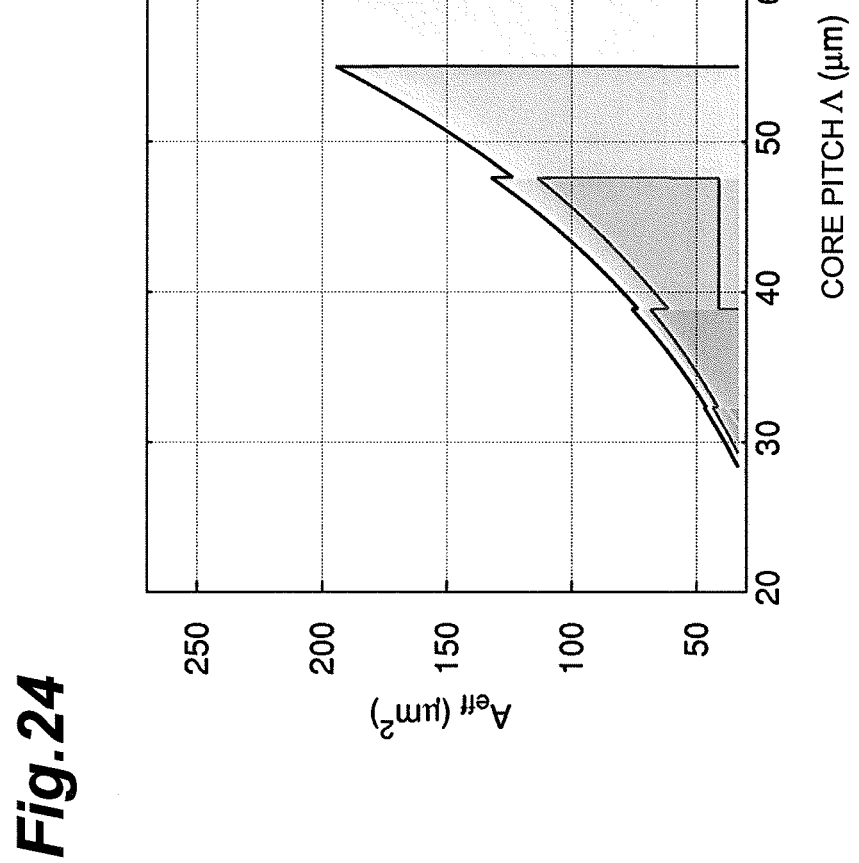
FIG. 24 is a drawing showing the result of calculation of $A_{eff}$ and $\Lambda$ dependences of $SSE_{lim}$ for the case of "the best known packing," with $2r_{clad}=125$ μm.
Figure 25:
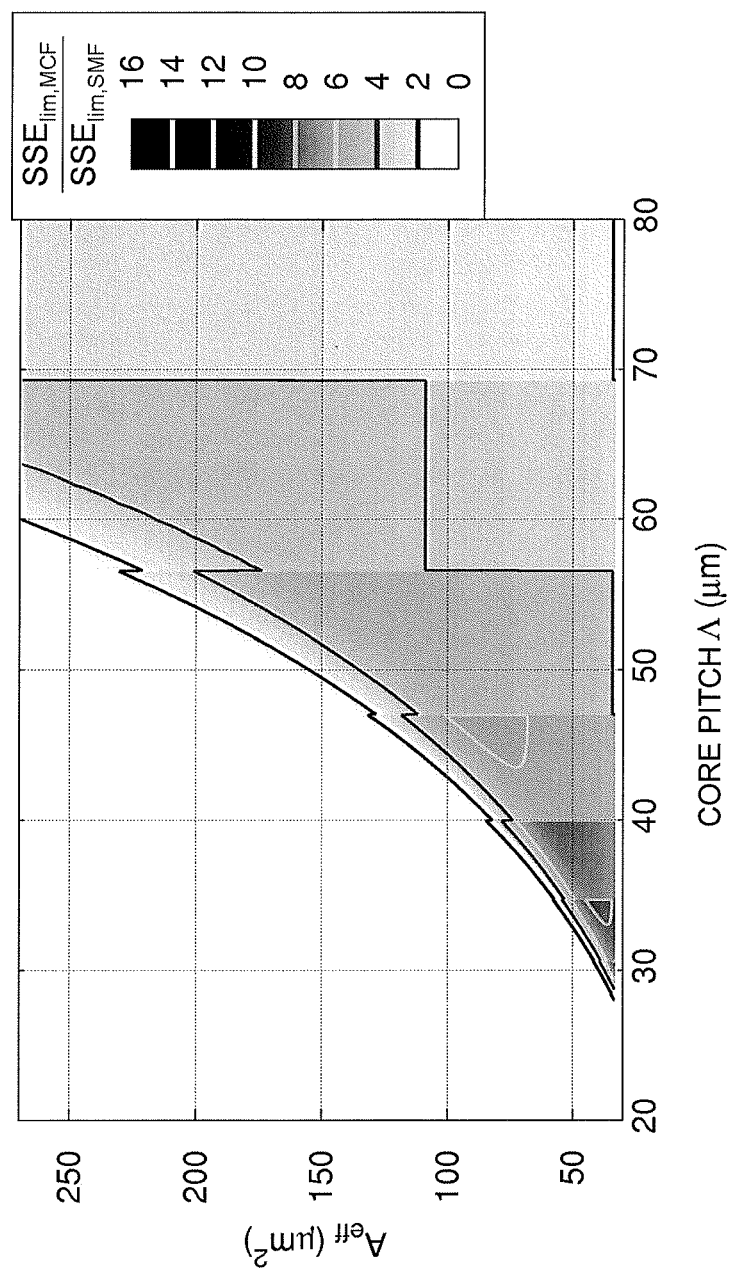
FIG. 25 is a drawing showing the result of calculation of $A_{eff}$ and $\Lambda$ dependences of $SSE_{lim}$ for the case of "the best known packing," with $2r_{clad}=150$ μm.
Figure 26:
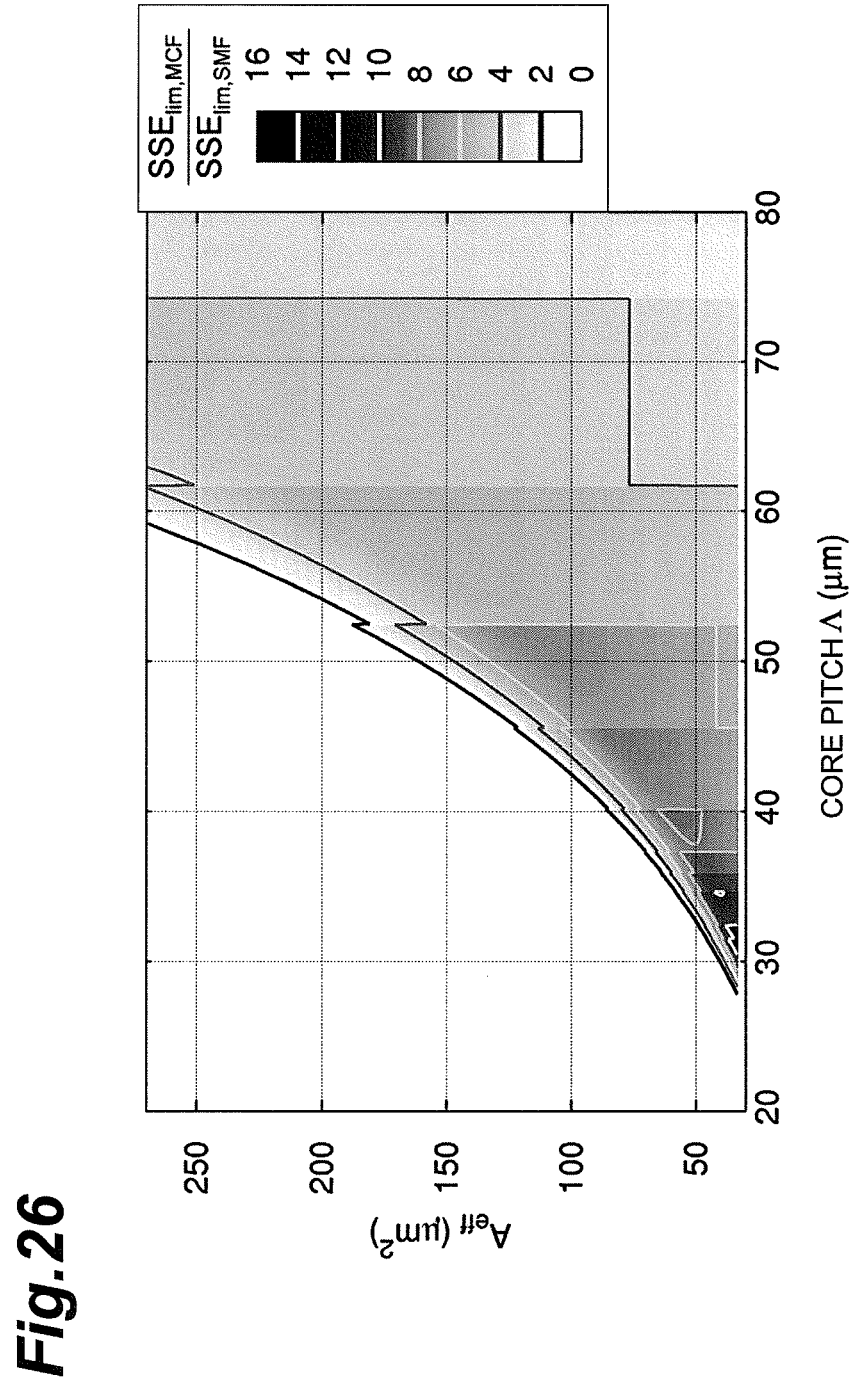
FIG. 26 is a drawing showing the result of calculation of $A_{eff}$ and $\Lambda$ dependences of $SSE_{lim}$ for the case of "the best known packing," with $2r_{clad}=175$ μm.
Figure 27:
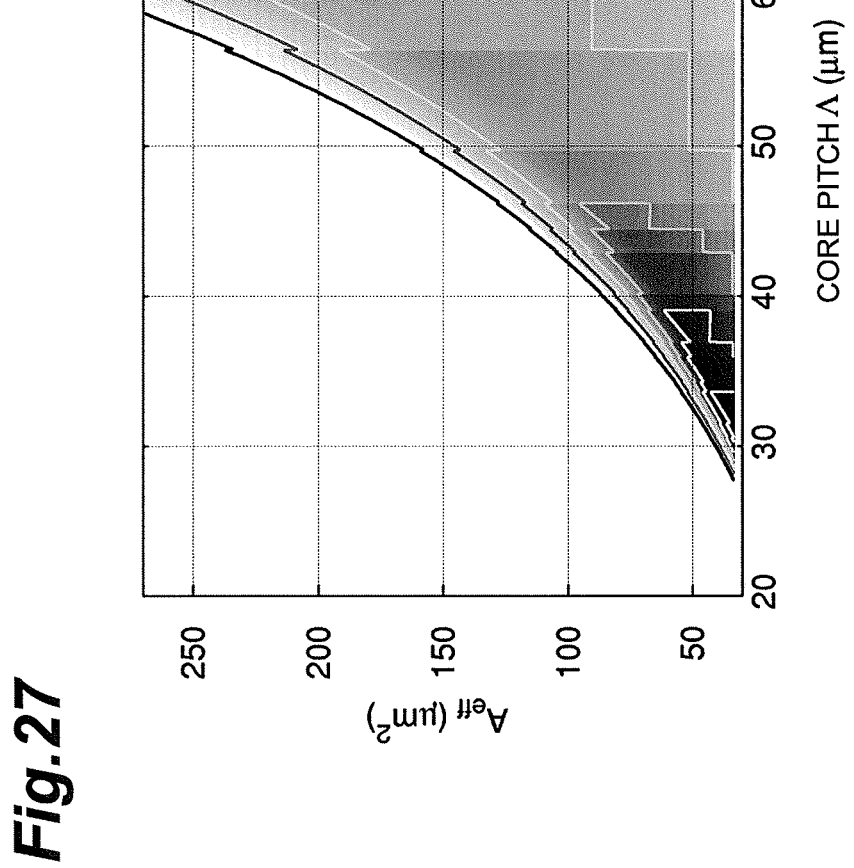
FIG. 27 is a drawing showing the result of calculation of $A_{eff}$ and $\Lambda$ dependences of $SSE_{lim}$ for the case of "the best known packing," with $2r_{clad}=200$ μm.

Next, FIGS. 24 to 27 show the result of calculation of dependences of $SSE_{lim}$ on $A_{eff}$ and $\Lambda$, for core constellations of "the best known packing" of the multi-core optical fiber with $2r_{clad}=125$ μm, the multi-core optical fiber with $2r_{clad}=150$ μm, the multi-core optical fiber with $2r_{clad}=175$ μm, and the multi-core optical fiber with $2r_{clad}=200$ μm, respectively. It was assumed that $d_{clad,min}=35$ μm, as in the case of FIG. 19. FIG. 24 is a drawing showing the result with $2r_{clad}=125$ μm, FIG. 25 a drawing showing the result with $2r_{clad}=150$ μm, and FIG. 26 a drawing showing the result with $2r_{clad}=175$ μm. Furthermore, FIG. 27 is a drawing showing the result with $2r_{clad}=200$ μm. It can be confirmed from these drawings that $SSE_{lim}$ is surely improved as $r_{clad}$ becomes larger, as described previously.

Figure 28:
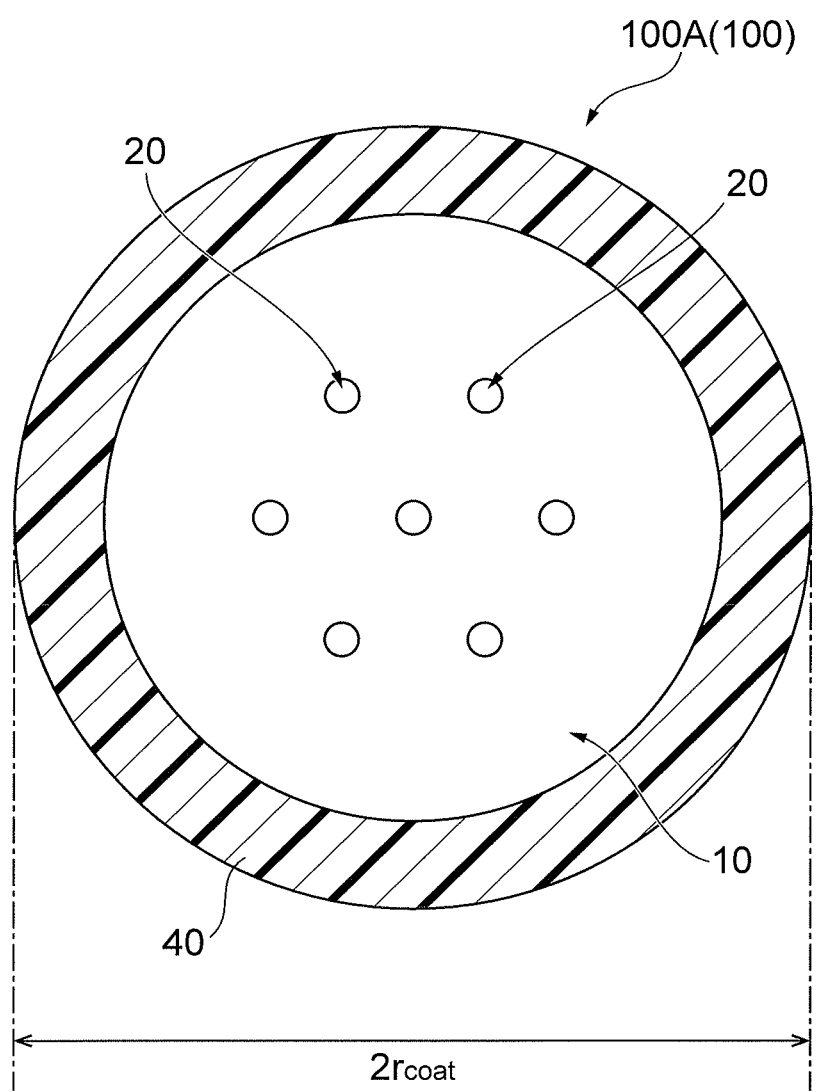
FIG. 28 is a cross-sectional schematic view of a multi-core optical fiber in which each core part is comprised of one core.

A variety of configurations can be applied to the multi-core optical fiber 100 according to the present invention. For example, in a multi-core optical fiber 100A shown in FIG. 28, core parts 20 covered by cladding 10 are single-mode cores and a coating layer 40 (coating) is provided on the outer periphery of the cladding 10. In a multi-core optical fiber 100B shown in FIG. 29, each of uncoupled core parts 20 has a microstructure composed of a plurality of in-core-part inner cores 21 close to each other and an in-core-part inner cladding 210 with a refractive index lower than the in-core-part inner cores 21. In this case, spatial multiplexing can be implemented using a plurality of supermodes guided by the core parts 20 or core modes guided by the respective in-core-part inner cores 21, in each of the core parts 20, so as to further improve $SSE_{lim}$. In this case, for increasing the number of spatial modes per sectional area possessed by the core parts 20, the power coupling coefficient between adjacent in-core-part inner cores 21 is preferably not less than $10^{-2}$/km and more preferably not less than 1/km. The refractive indices of the in-core-part inner cladding 210 and the cladding 10 may be equal or unequal. This multi-core optical fiber 100B is also provided with the coating layer 40 on the outer periphery of the cladding 10.

Furthermore, it is preferable to locate a depressed layer between the core part 20 and the cladding 10 or to locate an inner cladding layer and a trench layer between the core part 20 and the cladding 10, because desired crosstalk can be realized with shorter $\Lambda$ while maintaining $A_{eff}$ and the cutoff characteristic of higher mode not used for propagation. The depressed layer may be comprised of a solid material with the refractive index lower than the cladding 10, or may be comprised of a plurality of voids arranged in the cladding 10 in a state in which they surround the core part 20 so that the refractive index thereof on average in the circumferential direction with respect to the central axis of the core part 20 becomes lower than that of the cladding 10. Similarly, the trench layer may also be comprised of a solid material having a refractive index lower than the cladding 10, or may be comprised of a plurality of voids arranged in the cladding 10.

Figure 29:
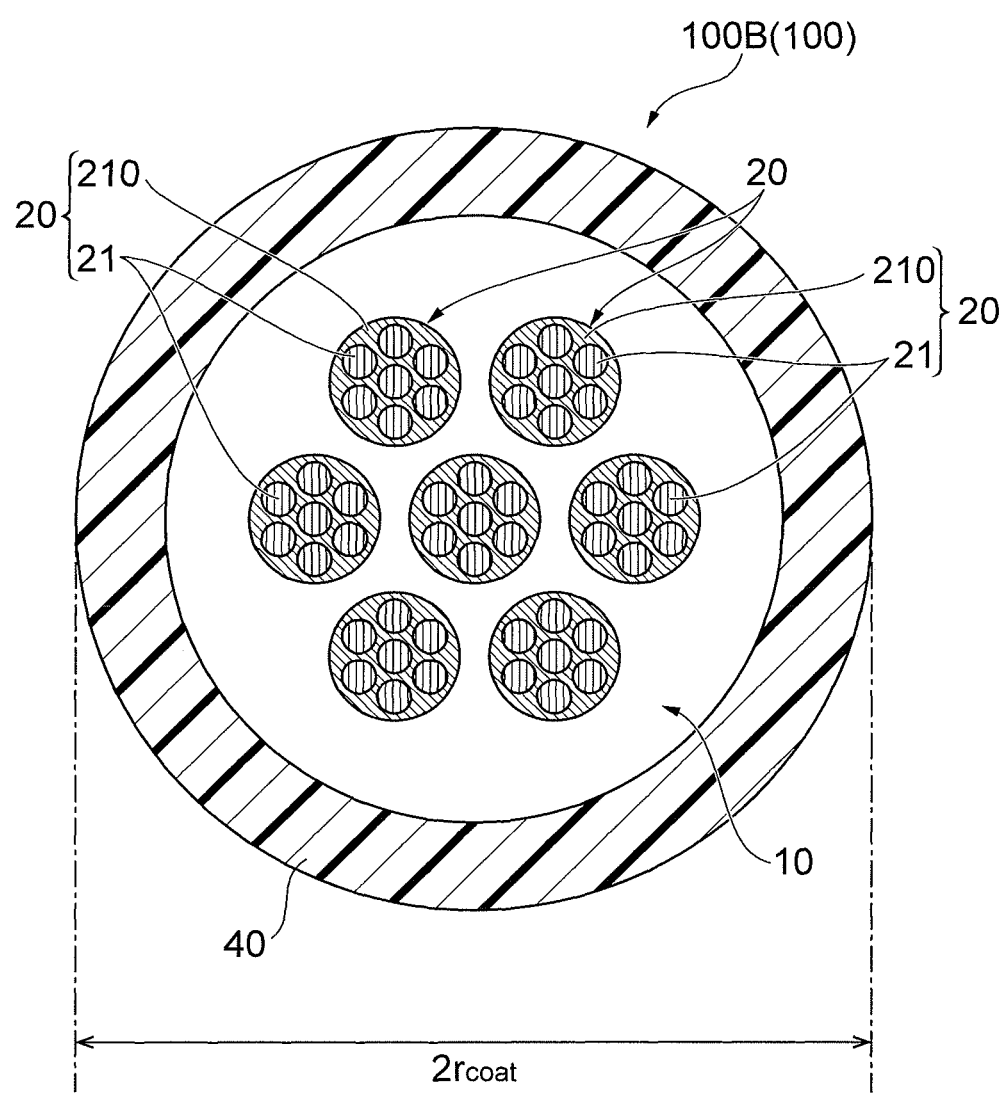
FIG. 29 is a cross-sectional schematic view for explaining an example of a multi-core optical fiber in which each core part is comprised of a plurality of coupled cores.
Figure 30:
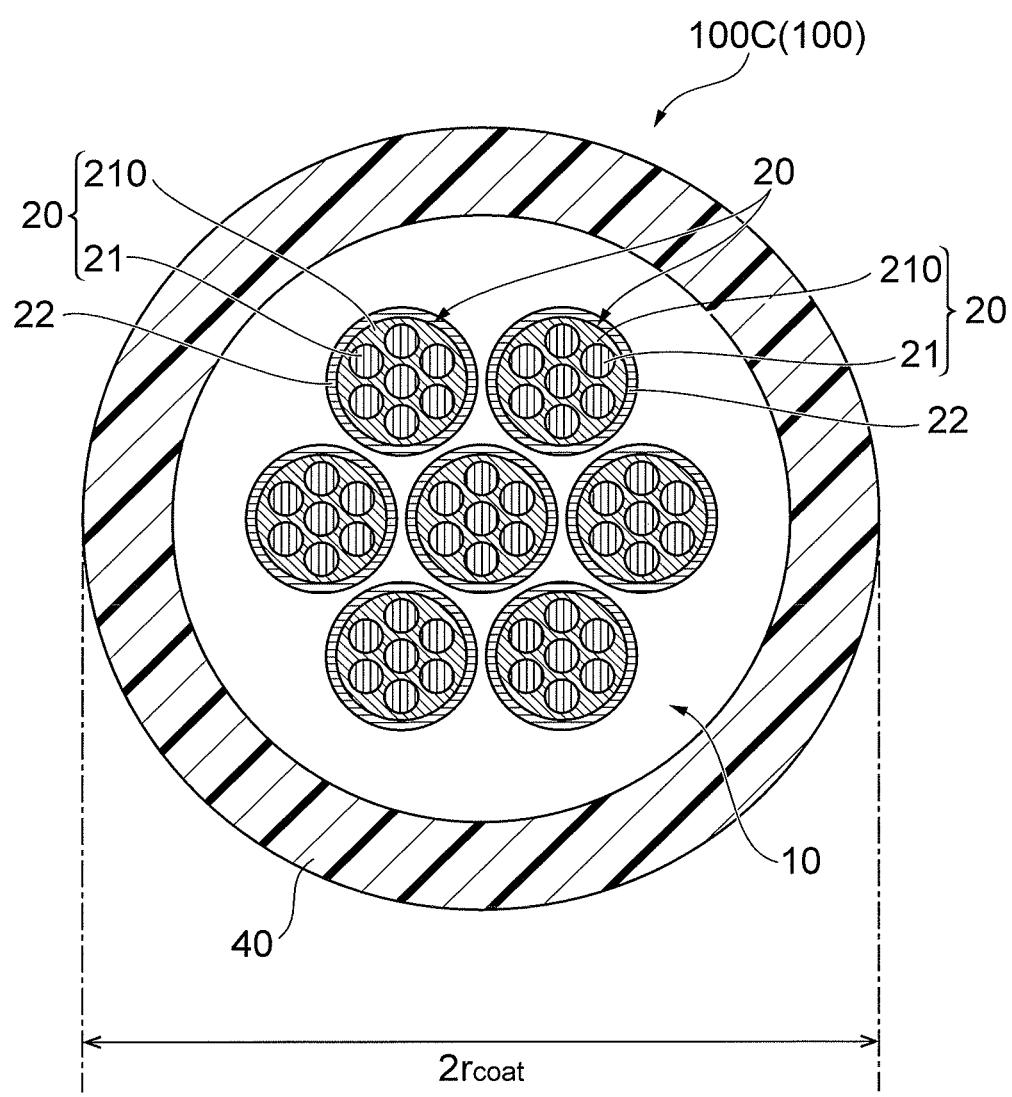
FIG. 30 is a cross-sectional schematic view for explaining an example of a multi-core optical fiber provided with a depressed layer.
Figure 31:
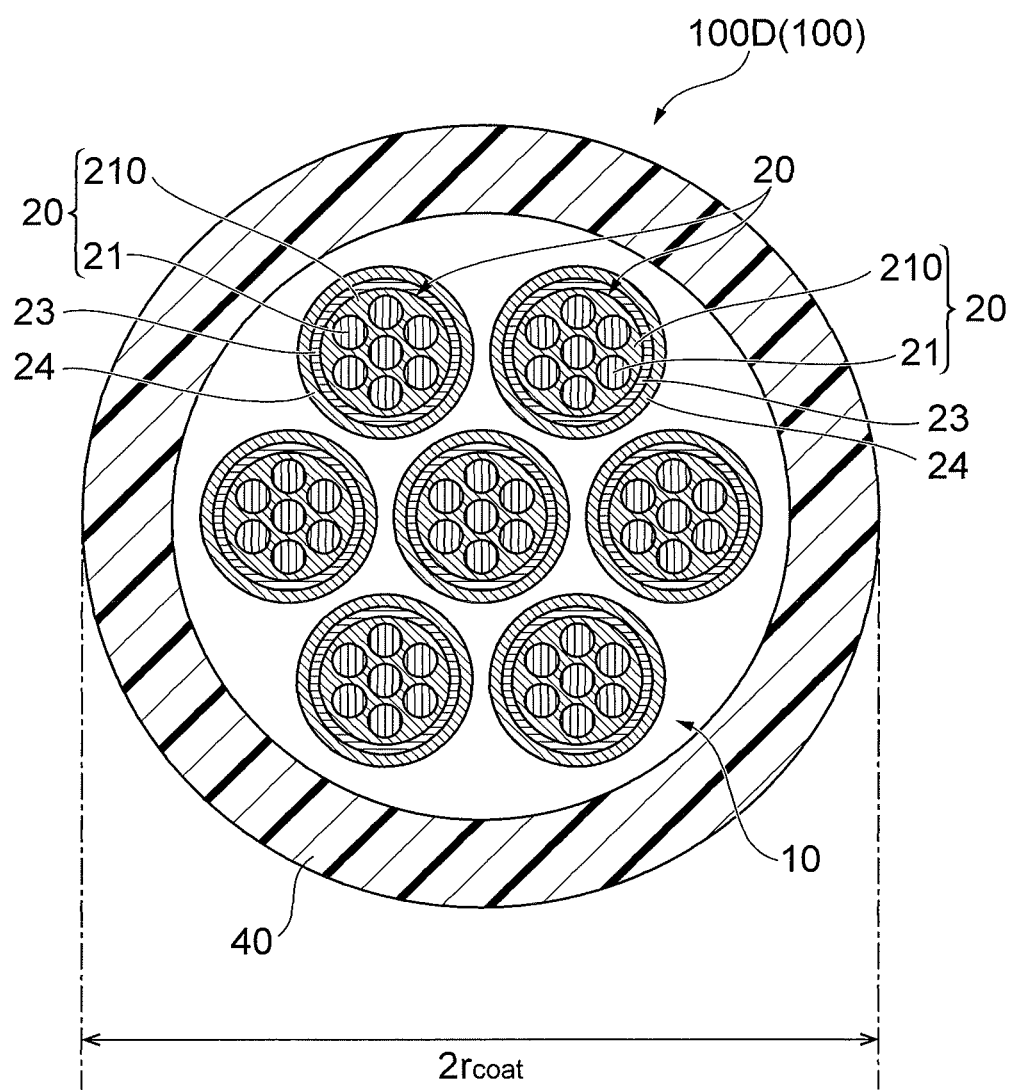
FIG. 31 is a cross-sectional schematic view for explaining an example of a multi-core optical fiber provided with an inner cladding layer and a trench layer.

For example, a multi-core optical fiber 100C shown in FIG. 30 has a structure in which each core part 20 is individually surrounded by one depressed layer 22, and a multi-core optical fiber 100D shown in FIG. 31 has a structure in which each core part 20 is individually surrounded by one inner cladding layer 23 and one trench layer 24. Each of the multi-core optical fibers 100C, 100D is provided with the coating layer 40 on the outer peripheral surface of the cladding 10. In this case, the pitch between the in-core-part inner cores 21 can be made narrower than in a configuration wherein each of the in-core-part inner cores 21 is individually surrounded by the depressed layer 22 or the combination of the inner cladding 23 and the trench layer 24, and $SSE_{lim}$ is further improved. The refractive index of the in-core-part inner cladding 210 may be equal or unequal to that of the depressed layer 22 or to that of the inner cladding layer 23. FIGS. 29 to 31 show the examples wherein the number of in-core-part inner cores 21 in one core part 20 is 7, but the number of in-core-part inner cores 21 in one core part 20 does not have to be limited to 7, and is preferably not less than 3.

When each of the core parts 20 propagates a plurality of propagation modes, it is preferable to perform transmission using a transmission system characterized by decoding mixed signals among the plurality of propagation modes in the core parts 20, using the MIMO (Multiple Input Multiple Output) technology, as described in Literature R. Ryfetal., "Coherent 1200-km 6×6 MIMO Mode-Multiplexed Transmission over 3-core Microstructured Fiber," ECOC2011, paper Th. 13. C. 1 and Literature C. Koebele et al., "40 km Transmission of Five Mode Division Multiplexed Data Streams at 100 Gb/s with low MIMO-DSP Complexity," ECOC2011, paper Th. 13. C. 3.

Figure 32:
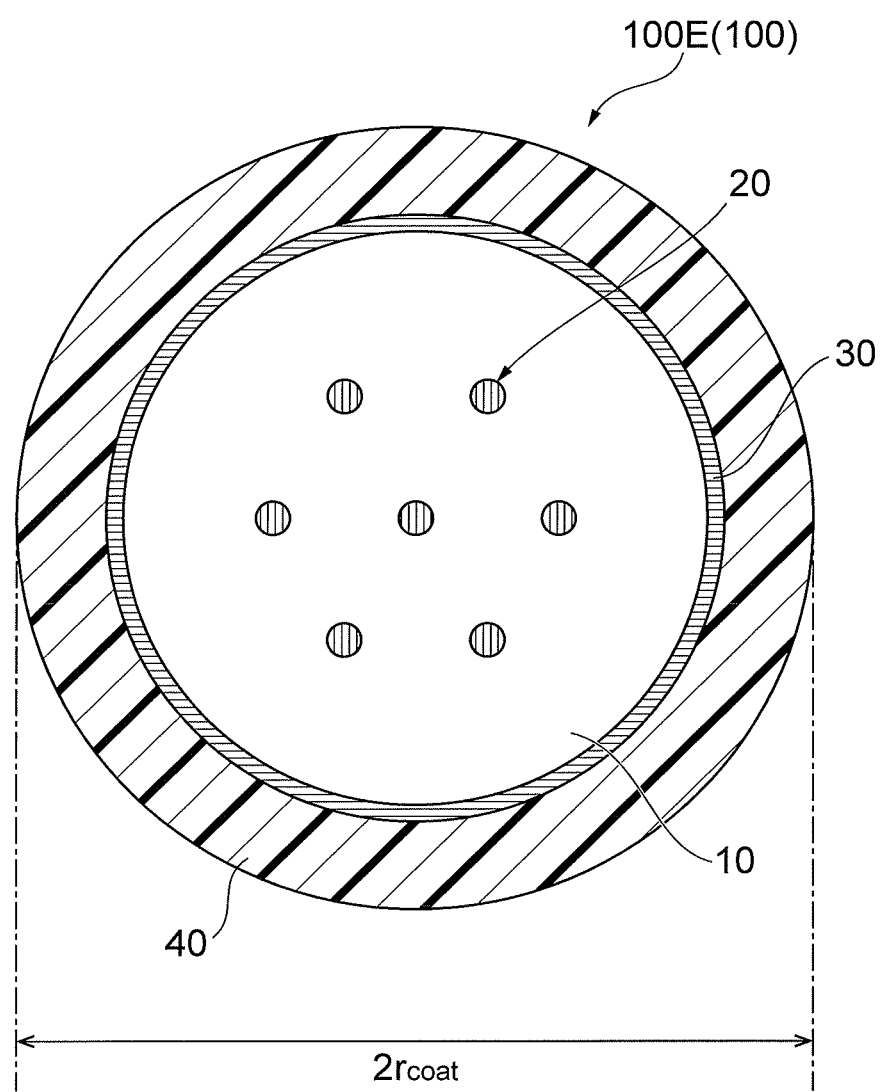
FIG. 32 is a cross-sectional schematic view for explaining an example of a multi-core optical fiber provided with a peripheral-core leakage prevention layer outside the cladding.

A multi-core optical fiber 100E shown in FIG. 32 is also preferably provided with a peripheral-core light-leakage prevention layer 30 with a refractive index lower than the cladding 10, in a form to surround all the core parts 20 together, near the outer periphery of the cladding 10 surrounding the core parts 20. The coating layer 40 is provided at the further outside of this peripheral-core light-leakage prevention layer 30. When the layer with the refractive index lower than the cladding 10 is provided between the core parts 20 and the coating layer 40, light propagating in the outermost cores becomes less likely to leak into the high-index coating layer so as to allow decrease of $d_{clad,min}$, and therefore $SSE_{lim}$ can be further improved with decrease of $d_{clad}$. In this case, it is preferable to set the thickness and the refractive index of the peripheral-core light-leakage prevention layer so as to allow a mode with the effective refractive index lower than the refractive index of the cladding, which is guided by the peripheral-core light-leakage prevention layer 30, to leak sufficiently into the coating and to be substantially cut off in the used wavelength band. In each of the foregoing multi-core optical fibers 100A-100E, each part including the core part 20 covered by the cladding 10, as well as the cladding 10, is also comprised of silica glass, and the refractive index of each part including the core part 20 can be controlled by adjusting a doping amount of a refractive index control agent. For example, the core parts 20 or the in-core-part inner cores 21 may be doped with a refractive index increase agent such as GeO$_2$ or Cl. When the cladding 10, the in-core-part inner cladding 210, or the like is doped with a refractive index decrease agent such as F, without doping the core parts 20 or the in-core-part inner cores 21 with GeO$_2$ or the like, the relative index differences of the respective parts can be controlled. The overall outside diameter of each of the multi-core optical fibers 100A to 100E is given by $2r_{coat}$, as shown in FIGS. 28 to 32.

Figure 33:
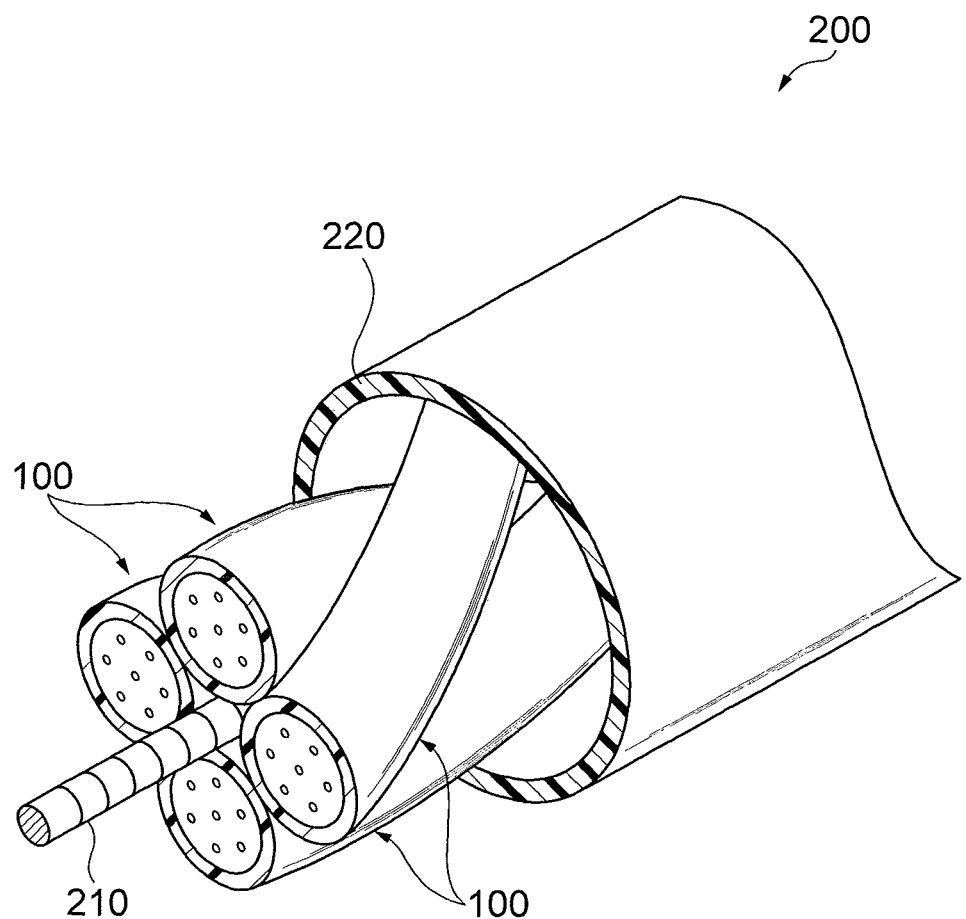
FIG. 33 is a perspective view showing an example of a multi-core optical fiber cable according to an embodiment of the present invention.
Figure 34:
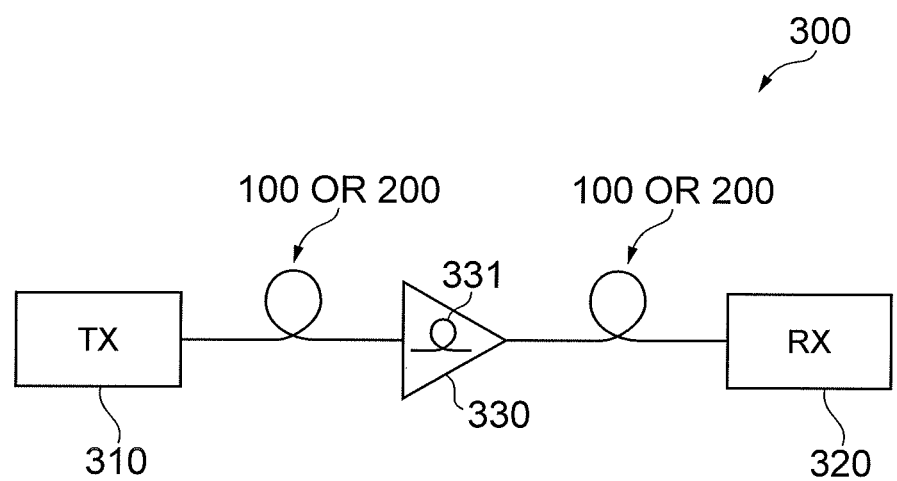
FIG. 34 is a drawing showing an example of a multi-core optical fiber transmission system according to an embodiment of the present invention.

The multi-core optical fiber 100 (100A-100E) according to the present embodiment as described above is applicable singly to optical transmission media of transmission systems and also applicable to optical cables. FIG. 33 is a drawing showing an example of multi-core optical fiber cable 200 according to the present embodiment, which has a structure in which the four aforementioned multi-core optical fibers 100 are bundled. This multi-core optical fiber cable 200 is provided with a cable sheath 220 housing the four multi-core optical fibers 100, and has a structure in which the four multi-core optical fibers 100 are bundled around a tension member 210 in this cable sheath 220. FIG. 34 is a drawing showing an example of multi-core optical fiber transmission system 300 according to the present embodiment, and this multi-core optical fiber transmission system 300 is provided with a transmitter 310, a receiver 320, and the multi-core optical fibers 100 (100A-100E) according to the present embodiment or the multi-core optical fiber cables 200 according to the present embodiment, as optical transmission media (transmission line) located between the transmitter 310 and the receiver 320, and an optical amplification repeater 330 including an optical fiber 331 for amplification is arranged in the transmission line. The optical amplification repeater 330 amplifies light which propagates through a core in the optical amplification repeater 330. It is preferable that the optical amplification repeater 330 includes an amplification optical fiber 331.

The multi-core optical fiber transmission system shown in FIG. 34 transmits signals by spatial multiplexing. Particularly, in multiple wavelength transmission, modulation methods may be optimized for respective wavelengths of signal light, thereby to implement wavelength multiplexing of signal light of different modulation methods. Furthermore, a difference between the mode field diameter of any one of the core parts 20 in the multi-core optical fibers 100 or in any one of the multi-core optical fibers 100 in the multi-core optical fiber cables 200, and the mode field diameter of the core of the optical amplification repeater 330 is preferably not more than 1 μm.

In the known communication optical fiber cables (including a plurality of single-core fibers with a transmission characteristic equivalent to or higher than that of the standard single-mode optical fiber, and provided with the tension member), the number of cores per sectional area is at most a little over 2 cores/mm$^2$, and there is no known optical fiber cable of not less than 2.5 cores/mm$^2$. In the light of the fact that the number of cores per sectional area in uncabled standard single-mode optical fibers (with the coating diameter of 250 μm assumed in the present specification as described above) is about 20.4 cores/mm$^2$, it is seen that when they are cabled, the spatial spectral efficiency as cable is degraded to about 1/10 from the spatial spectral efficiency as optical fiber. This is because there is a need for providing a layer for protecting the optical fibers, providing a certain space, and providing the tension member to prevent strong tension from being applied to the optical fibers. In view of handleability of the optical fiber cable and the optical properties of the embedded optical fibers and others, it is difficult to realize a large increase in the number of fibers per sectional area of cable.

Incidentally, when $A_{cable}$ ($=\pi r_{cable}^2$) represents the sectional area of the entire multi-core optical fiber cable, $N_{core,k}$ the number of core parts in the kth multi-core optical fiber, and $\alpha_{dB,kn}$, $D_{kn}$, $n_{2,kn}$, and $A_{eff,kn}$ represent $\alpha_{dB}$, $D$, $n_2$, and $A_{eff}$, respectively, of a certain core part n, on the basis of Expressions (54) to (56), the spatial spectral efficiency of the multi-core optical fiber cable satisfying any one of Expressions (83) to (85) below is required to be able to realize the spatial spectral efficiency of not less than $N_{times}$ the spatial spectral efficiency of the standard single-mode optical fiber.

For realizing a standard optical fiber cable with the spatial spectral efficiency over that of the conventional optical fiber cables, $N_{times}$ should be determined in view of the fact that there is no conventional optical fiber cable with the number of cores per sectional area being not less than 2.5 cores/mm$^2$ and the fact that the number of cores per sectional area of the standard single-mode optical fiber is about 20.4 cores/mm$^2$: in the multi-core optical fiber cable satisfying any one of Expressions (83) to (85), $N_{times}$ is preferably not less than 2.5/20.4, more preferably not less than 5/20.4, still more preferably not less than 7.5/20.4, yet more preferably not less than 10/20.4, yet still more preferably not less than 12.5/20.4, yet further more preferably not less than 15/20.4, yet further still more preferably not less than 17.5/20.4, and yet further still more preferably not less than 1.

$$\frac{1}{A_{cable}} \sum_k N_{core,k} \log_2 \left\{ 1 + \frac{\exp(-80\eta_{kn})}{2.10 \times 10^{10} \left[ \frac{(10^{8\alpha_{dB,kn}} - 1)^3}{\alpha_{db,kn} 10^{8\alpha_{dB,kn}} |D_{kn}|} \right] \left( \frac{n_{2,kn}}{A_{eff,kn}} \right)^2} \right. $$
$$\left. \log \left( 5.47 \times 10^3 |D_{kn}| \frac{1 - 10^{-8\alpha_{dB,kn}}}{\alpha_{dB,kn}} \right) \right]^{\frac{1}{3}} + $$
$$[1 - \exp(-80\eta_{kn})] \right\} \geq$$
$$1.96 \times 10^2 N_{times} \quad (83)$$

$$\frac{1}{A_{cable}} \sum_k N_{core,k} \log_2 \left\{ 2.10 \times 10^{10} \left[ \frac{(10^{8\alpha_{dB,kn}} - 1)^3}{\alpha_{db,kn} 10^{8\alpha_{dB,kn}} |D_{kn}|} \right] \left( \frac{n_{2,kn}}{A_{eff,kn}} \right)^2 \right. $$
$$\left. \log \left( 5.47 \times 10^3 |D_{kn}| \frac{1 - 10^{-8\alpha_{dB,kn}}}{\alpha_{dB,kn}} \right) \right]^{\frac{1}{3}} + 80\eta_n \right\} \leq -1.96 \times 10^2 N_{times} \quad (84)$$

$$\frac{1}{A_{cable}} \sum_k N_{core,k}$$
$$\log_2 \left[ 4.98 \times 10^{10} \frac{(10^{8\alpha_{dB,n}} - 1)}{(\alpha_{db,n} 10^{8\alpha_{dB,n}} |D_n|)^{\frac{1}{3}}} \left( \frac{n_{2,n}}{A_{eff,n}} \right)^{\frac{2}{3}} + 80\eta_n \right] \leq$$
$$-1.96 \times 10^2 N_{times} * \sum_k \quad (85)$$

is the sum over all the multi-core optical fibers embedded in the multi-core optical fiber cable.

Since the foregoing Expressions (83) to (85) are formulas based on the premise that all the core parts in the same multi-core optical fiber are uniform and the core parts are arranged in the hexagonal grid pattern, the multi-core optical fiber cable satisfying any one of Expressions (83) to (85) is preferably such that in each of the embedded multi-core optical fibers, all the core parts have the same structure and operate in a single mode, and the constellation of the core parts is the hexagonal grid pattern. When all the core parts of all the multi-core optical fibers embedded have substantially identical properties, a $\alpha_{dB,kn}$, $D_{kn}$, $n_{2,kn}$, and $A_{\it{eff,kn}}$ to be used can be values in a certain core as representative values or averages of values in all the cores. As in the case of Expressions (55) and (56), the multi-core optical fibers in the multi-core optical fiber cable satisfying Expression (84) or Expression (85) preferably satisfy at least the condition of $80\eta_n \leq 0.01$.

Let us consider more general cases where the optical properties are different among the core parts or where crosstalks among the core parts are different. Let $\alpha_{dB,kn}$ [dB/km] be the transmission loss of the nth core part of the kth multi-core optical fiber, $n_{2,kn}$ [m²/W] be the non-linear refractive index thereof, $A_{\it{eff,kn}}$ [μm²] be the effective area thereof, $D_{kn}$ [ps/(nm·km)] be the chromatic dispersion thereof, and $\eta_{kn}$ [/km] be the sum of power coupling coefficients to the nth core part from all the other core parts. Then, on the basis of Expressions (57) to (59), the spatial spectral efficiency of the multi-core optical fiber cable satisfying any one of Expressions (86) to (88) below is required to be able to realize the spatial spectral efficiency of not less than $N_{times}$ the spatial spectral efficiency of the standard single-mode optical fiber.

$N_{times}$ should be determined in the light of the fact that there is no conventional optical fiber cable with the number of cores per sectional area being not less than 2.5 cores/mm² and the fact that the number of cores per sectional area of the standard single-mode optical fiber is about 20.4 cores/mm²; in the multi-core optical fiber cable satisfying any one of Expressions (86) to (88) below, $N_{times}$ is preferably not less than 2.5/20.4, more preferably not less than 5/20.4, still more preferably not less than 7.5/20.4, yet more preferably not less than 10/20.4, yet still more preferably not less than 12.5/20.4, yet further more preferably not less than 15/20.4, yet further still more preferably not less than 17.5/20.4 and yet further still more preferably not less than 1. Each core part preferably operates in a single mode herein.

$$\frac{1}{A_{cable}} \sum_k \sum_n \log_2 \left\{ 1 + \frac{\exp(-80\eta_{kn})}{2.10 \times 10^{10} \left[ \frac{(10^{8\alpha_{dB,kn}}-1)^3}{\alpha_{dB,kn} 10^{8\alpha_{dB,kn}} |D_{kn}|} \left( \frac{n_{2,kn}}{A_{\it{eff,kn}}} \right)^2 \log\left( 5.47 \times 10^3 |D_{kn}| \frac{1-10^{-8\alpha_{dB,kn}}}{\alpha_{dB,kn}} \right) \right]^{\frac{1}{3}} + [1-\exp(-80\eta_{kn})]} \right\} \quad (86)$$

$$\geq 1.96 \times 10^2 N_{times}$$

$$\frac{1}{A_{cable}} \sum_k \sum_n \log_2 \left\{ 2.10 \times 10^{10} \left[ \frac{(10^{8\alpha_{dB,kn}}-1)^3}{\alpha_{dB,kn} 10^{8\alpha_{dB,kn}} |D_{kn}|} \left( \frac{n_{2,kn}}{A_{\it{eff,kn}}} \right)^2 \log\left( 5.47 \times 10^3 |D_{kn}| \frac{1-10^{-8\alpha_{dB,kn}}}{\alpha_{dB,kn}} \right) \right]^{\frac{1}{3}} + 80\eta_{kn} \right\} \leq -1.96 \times 10^2 N_{times} \quad (87)$$

$$\frac{1}{A_{cable}} \sum_k \sum_n \log_2 \left[ \frac{4.98 \times 10^{10} \frac{10^{8\alpha_{dB,kn}}-1}{(\alpha_{dB,kn} 10^{8\alpha_{dB,kn}} |D_{kn}|)^{\frac{1}{3}}} \left( \frac{n_{2,kn}}{A_{\it{eff,kn}}} \right)^{\frac{2}{3}} + 80\eta_{kn}}{} \right] \leq \quad (88)$$

$$-1.96 \times 10^2 N_{times}$$

$${}^*\sum_n$$

is the sum over all the core parts.

$${}^*\sum_k$$

is the sum over all the multi-core optical fibers embedded in the multi-core optical fiber cable.

When all the embedded multi-core optical fibers have substantially identical structures and properties, $\alpha_{dB,kn}$, $D_{kn}$, $n_{2,kn}$, and $A_{\it{eff,kn}}$ to be used can be values in a certain multi-core optical fiber as representative values or averages of values in all the multi-core optical fibers.

When each of the core parts guides a plurality of spatial modes, similarly, where $\alpha_{dB,knm}$ [dB/km] represents the transmission loss of the mth spatial mode in the nth core part of the kth multi-core optical fiber, $n_{2,knm}$ [m²/W] the non-linear refractive index thereof, $A_{\it{eff,knm}}$ [μm²] the effective area thereof, $D_{knm}$ [ps/(nm·km)] the chromatic dispersion thereof, and $\eta_{kn}$ [/km] the sum of power coupling coefficients to the nth core part from all the other core parts in the kth multi-core optical fiber (i.e., the sum of power coupling coefficients to "each of all the spatial modes in the nth core part in the kth multi-core optical fiber" from "all the spatial modes in all the other core parts in the kth multi-core optical fiber"), on the basis of Expressions (60) to (62), the spatial spectral efficiency of the multi-core optical fiber cable satisfying any one of Expressions (89) to (91) below is required to be able to realize the spatial spectral efficiency of not less than $N_{times}$ the spatial spectral efficiency of the standard single-mode optical fiber.

$N_{times}$ should be determined in the light of the fact that there is no conventional optical fiber cable with the number of cores per sectional area being not less than 2.5 cores/mm² and the fact that the number of cores per sectional area of the standard single-mode optical fiber is about 20.4 cores/mm²; in the multi-core optical fiber cable satisfying any one of Expressions (89) to (91) below, $N_{times}$ is preferably not less than 2.5/20.4, more preferably not less than 5/20.4, still more preferably not less than 7.5/20.4, yet more preferably not less than 10/20.4, yet still more preferably not less than 12.5/20.4, yet further more preferably not less than 15/20.4, yet further still more preferably not less than 17.5/20.4, and yet further still more preferably not less than 1.

$$\frac{1}{A_{cable}} \sum_{k} \sum_{n} \sum_{m} \log_2 \tag{89}$$

$$\left\{ \frac{1 + \frac{\exp(-80\eta_{kn})}{2.10 \times 10^{10}}}{\left[\frac{(10^{8\alpha_{dB,knm}} - 1)^3}{\alpha_{dB,knm} 10^{8\alpha_{dB,knm}} |D_{knm}|}\left(\frac{n_{2,knm}}{A_{\mathit{eff},knm}}\right)^2 \log\left(10^3|D_{knm}|\frac{1 - 10^{-8\alpha_{dB,knm}}}{\alpha_{dB,knm}}\right)\right]^{\frac{1}{3}}} + \right.$$
$$\left. [1 - \exp(-80\eta_{kn})] \right\}$$

$$\geq 1.96 \times 10^2 N_{times}$$

$$\frac{1}{A_{cable}} \sum_{k} \sum_{n} \sum_{m} \log_2 \left\{ 2.10 \times 10^{10} \right. \tag{90}$$

$$\frac{(10^{8\alpha_{dB,knm}} - 1)^3}{\alpha_{dB,knm} 10^{8\alpha_{dB,knm}}|D_{kn}|}\left(\frac{n_{2,knm}}{A_{\mathit{eff},knm}}\right)^2 \log\left(10^3|D_{knm}|\frac{1 - 10^{-8\alpha_{dB,knm}}}{\alpha_{dB,knm}}\right)^{\frac{1}{3}} +$$

$$\left. 80\eta_{kn} \right\} \leq -1.96 \times 10^2 N_{times}$$

$$\frac{1}{A_{cable}} \sum_{k} \sum_{n} \sum_{m} \log_2 \tag{91}$$

$$\left[ 4.98 \times 10^{10} \frac{10^{8\alpha_{dB,knm}} - 1}{(\alpha_{dB,knm} 10^{8\alpha_{dB,knm}}|D_{knm}|)^{\frac{1}{3}}} \left(\frac{n_{2,knm}}{A_{\mathit{eff},knm}}\right)^{\frac{2}{3}} + 80\eta_{kn} \right] \leq$$

$$-1.96 \times 10^2 N_{times}$$

$$^*\sum_{n}$$

is the sum over all the core parts.

$$^*\sum_{m}$$

is the sum over all the spatial modes guided without effectively being cut off in each of the core parts.

$$^*\sum_{k}$$

is the sum over all the multi-core optical fibers embedded in the multi-core optical fiber cable.

When all the embedded multi-core optical fibers have substantially identical structures and properties, $\alpha_{dB,knm}$, $D_{knm}$, $n_{2,knm}$, and $A_{\mathit{eff},knm}$ to be used can be values in a certain multi-core optical fiber as representative values, or averages of values in all the multi-core optical fibers.

The number of multi-core optical fibers embedded in the multi-core optical fiber cable of the present invention is preferably as many as possible in order to decrease the ratio of sectional areas of the sheath and tension member to the sectional area of the cable, and it is preferably not less than 8, more preferably not less than 16, and still more preferably not less than 32.

In the multi-core optical fiber cable of the present invention, the space between the embedded multi-core optical fibers and the sheath is preferably filled with any one of a gas, a liquid, and a gel substance. The embedded multi-core optical fibers are preferably embedded without being bonded to each other. The embedded multi-core optical fibers are preferably embedded in a fiber ribbon state in which a plurality of multi-core optical fibers are bonded to each other.

The core parts and cladding part of the multi-core optical fiber in the present invention are preferably comprised of glass or resin and more preferably comprised of silica glass. The coating layer is preferably one of resin, metal, and carbon. Another preferred configuration is such that the cladding part has a photonic crystal structure and the core parts are solid or hollow.

The desired configurations in the multi-core optical fiber of the present invention are also similarly preferable in the multi-core optical fibers embedded in the multi-core optical fiber cable of the present invention.

The present invention provides the multi-core optical fiber, multi-core optical fiber cable, and multi-core optical fiber transmission system with improved spectral efficiency per unit sectional area.

What is claimed is:

1. A multi-core optical fiber comprising a plurality of core parts each extending along a predetermined axis, a cladding integrally covering each of the plurality of core parts, and a coating provided on an outer peripheral surface of the cladding, the multi-core optical fiber satisfying at least one of first to third conditions wherein $A_{coat}$ represents a cross sectional area of the entire multi-core optical fiber on a cross section orthogonal to the predetermined axis, wherein the first condition is defined in that:

each of the core parts enables single-mode transmission at a predetermined wavelength, and
wherein $\alpha_{dB,n}$ [dB/km] represents a transmission loss at the predetermined wavelength of a predetermined core part n with the largest crosstalk from other core parts out of the plurality of core parts, $n_{2,n}$ [m²/W] a non-linear refractive index of the predetermined core part n at the predetermined wavelength, $A_{\mathit{eff},n}$ [μm²] an effective area of the predetermined core part n at the predetermined wavelength, $D_n$ [ps/(nm·km)] a chromatic dispersion of the predetermined core part n at the predetermined wavelength, $\eta_n$ [/km] a sum of power coupling coefficients to the predetermined core part n from all the other core parts at the predetermined wavelength, $N_{core}$ the number of core parts in the multi-core optical fiber, and $A_{coat}$ a sectional area of the entire multi-core optical fiber on a cross section perpendicular to the predetermined axis, Expression (1) below is satisfied:

$$\frac{N_{core}}{A_{coat}} \log_2 \left\{ \frac{1 + \exp(-80\eta_n)}{2.10 \times 10^{10} \left[ \frac{(10^{8\alpha_{dB,n}} - 1)^3}{\alpha_{dB,n} 10^{8\alpha_{dB,n}} |D_n|} \right] \left( \frac{n_{2,n}}{A_{eff,n}} \right)^2} + [1 - \exp(-80\eta_n)] \right\} \geq 7 \times 1.96 \times 10^2, \quad (1)$$

wherein
  the second condition is defined in that:
  each of the core parts enables single-mode transmission at a predetermined wavelength, and
  wherein $\alpha_{dB,n}$ [dB/km] represents a transmission loss at the predetermined wavelength of an nth core part out of the plurality of core parts, $n_{2,n}$ [m²/W] a non-linear refractive index of the nth core part at the predetermined wavelength, $A_{eff,n}$ [μm²] an effective area of the nth core part at the predetermined wavelength, $D_n$ [ps/(nm·km)] a chromatic dispersion of the nth core part at the predetermined wavelength, $\eta_n$ [/km] a sum of power coupling coefficients to the nth core part from all the other core parts out of the plurality of core parts at the predetermined wavelength, and $A_{coat}$ a sectional area of the entire multi-core optical fiber on a cross section perpendicular to the predetermined axis, Expression (2) below is satisfied:

$$\frac{1}{A_{coat}} \sum_n \log_2 \left\{ \frac{1 + \exp(-80\eta_n)}{2.10 \times 10^{10} \left[ \frac{(10^{8\alpha_{dB,n}} - 1)^3}{\alpha_{dB,n} 10^{8\alpha_{dB,n}} |D_n|} \right] \left( \frac{n_{2,n}}{A_{eff,n}} \right)^2} + [1 - \exp(-80\eta_n)] \right\} \geq \quad (2)$$

$$7 \times 1.96 \times 10^2,$$

and wherein
  the third condition is defined in that:
  a transmission loss of a spatial mode not guided with the transmission loss of not more than 1 dB/km at a predetermined wavelength, is not less than 0.9 dB/m, and
  wherein $\alpha_{dB,nm}$ [dB/km] represents a transmission loss at the predetermined wavelength of an mth spatial mode guided with the transmission loss of not more than 1 dB/km at the predetermined wavelength out of spatial modes in an nth core part among the plurality of core parts, $n_{2,nm}$ [m²/W] a non-linear refractive index at the predetermined wavelength of the mth spatial mode in the nth core part, $A_{eff,nm}$ [μm²] an effective area at the predetermined wavelength of the mth spatial mode in the nth core part, $D_{nm}$ [ps/(nm·km)] a chromatic dispersion at the predetermined wavelength of the mth spatial mode in the nth core part, $\eta_n$ [/km] a sum of power coupling coefficients to the nth core part from all the other core parts out of the plurality of core parts, and $A_{coat}$ a sectional area of the entire multi-core optical fiber on a cross section perpendicular to the predetermined axis, Expression (3) below is satisfied:

$$\frac{1}{A_{coat}} \sum_n \sum_m \log_2 \left\{ \frac{1 + \exp(-80\eta_n)}{2.10 \times 10^{10} \left[ \frac{(10^{8\alpha_{dB,nm}} - 1)^3}{\alpha_{dB,nm} 10^{8\alpha_{dB,nm}} |D_{nm}|} \right] \left( \frac{n_{2,nm}}{A_{eff,nm}} \right)^2} + [1 - \exp(-80\eta_n)] \right\} \geq \quad (3)$$

$$7 \times 1.96 \times 10^2.$$

2. The multi-core optical fiber according to claim 1, wherein at least any one of the plurality of core parts comprises a microstructure comprised of a plurality of in-core-part inner cores, and an in-core-part inner cladding integrally covering each of the plurality of in-core-part inner cores and having a refractive index lower than each of the plurality of in-core-part inner cores, and
  wherein a power coupling coefficient between adjacent in-core-part inner cores out of the plurality of in-core-part inner cores forming the microstructure is not less than $10^{-2}$ [/km].

3. The multi-core optical fiber according to claim 2, wherein the power coupling coefficient between adjacent in-core-part inner cores out of the plurality of in-core-part inner cores forming the microstructure is not less than 1 [/km].

4. The multi-core optical fiber according to claim 2, wherein as to an effective area of a fundamental mode in at least any one of the plurality of core parts, the effective area at the predetermined wavelength is not more than 87 μm².

5. The multi-core optical fiber according to claim 1, wherein as to an effective area of a fundamental mode in at least any one of the plurality of in-core-part inner cores, the effective area at the predetermined wavelength is not more than 87 μm².

6. The multi-core optical fiber according to claim 1, which comprises a depressed layer having a refractive index lower than the cladding, the depressed layer being provided between at least any one core part out of the plurality of core parts and the cladding,
  wherein the depressed layer is comprised of a solid material with the refractive index lower than the cladding, or is comprised of a plurality of voids arranged in the cladding in a state in which the voids surround the core part so that a refractive index thereof on average in a circumferential direction with respect to a central axis of the core part is lower than the cladding.

7. The multi-core optical fiber according to claim 1, which comprises:
  a trench layer with a refractive index lower than the cladding, the trench layer being provided between at least any one core part out of the plurality of core parts and the cladding; and
  an inner cladding layer with a refractive index lower than the core part and higher than the trench layer, the inner cladding layer being provided between the core part and the trench layer,
  wherein the trench layer is comprised of a solid material with a refractive index lower than the cladding, or is comprised of a plurality of voids arranged in the cladding in a state in which the voids surround the core part so that a refractive index thereof on average in a circumferential direction with respect to a central axis of the core part is lower than the cladding.

8. The multi-core optical fiber according to claim 1, wherein the predetermined wavelength is a wavelength in the range of 1 µm to 2.5 µm.

9. The multi-core optical fiber according to claim 1, wherein the predetermined wavelength is a wavelength in the range of 1.26 µm to 1.65 µm, each of the plurality of core parts is comprised of silica glass, and non-linear refractive indices $n_2$ of the respective core parts at the predetermined wavelength are in the range of $2 \times 10^{-20}$ to $3 \times 10^{-20}$ [m²/W].

10. The multi-core optical fiber according to claim 9, wherein each of the core parts is doped with $GeO_2$ and the non-linear refractive indices $n_2$ are approximately $2.3 \times 10^{-20}$ [m²/W].

11. The multi-core optical fiber according to claim 9, wherein each of the core parts is not doped with $GeO_2$, and the non-linear refractive indices $n_2$ are approximately $2.2 \times 10^{-20}$ [m²/W].

12. The multi-core optical fiber according to claim 9, satisfying at least one of first and second relations wherein $r_{om}$ represents a distance between a center of a core part which is the most distant from a center of the multi-core optical fiber, out of the plurality of core parts, and the center of the multi-core optical fiber, $\Lambda$ the shortest distance of center-to-center distances between two core parts out of the plurality of core parts, $N_{core}$ the number of core parts in the multi-core optical fiber, an effective core packing rate $R_{pack}$ defined by Expression (4) below, and a core arrangeable region ratio $R_{eff}$ defined by Expression (5) below:

$$R_{pack} = \frac{\sqrt{3}}{\pi} \frac{N_{core}}{(2r_{om}/\Lambda + 1)^2}; \quad (4)$$

$$R_{eff} = \frac{\pi(r_{om} + \Lambda/2)^2}{\pi r_{coat}^2} = \frac{(r_{om} + \Lambda/2)^2}{r_{coat}^2} = \frac{(r_{om} + \Lambda/2)^2}{(r_{om} + d_{clad} + d_{coat})^2}, \quad (5)$$

wherein
the first relation is defined in that:
a bending loss $\alpha_{R7.5}$ [dB/m] at the wavelength of 1550 nm in a radius of 7.5 mm of a fundamental mode in any one of the core parts is not more than 10 dB/m, and
a relation between a product $R_{pack} \cdot R_{eff}$ of the effective core packing rate $R_{pack}$ and the core arrangeable region ratio $R_{eff}$, and $\alpha_{R7.5}$ [dB/m] satisfies Expression (6) below:

$$\alpha_{R7.5} \leq 2.69 \times 10^8 \exp\left(-6.46 \times 10^{-1} \frac{7}{R_{pack} R_{eff}}\right), \quad (6)$$

wherein
the second relation is defined in that:
a bending loss in a radius of 5 mm of the fundamental mode in at least any one of the plurality of core parts, the bending loss $\alpha_{R5}$ [dB/m] at the wavelength 1550 nm is not more than 10 dB/m, and
a relation between the product $R_{pack} \cdot R_{eff}$ of the effective core packing rate $R_{pack}$ and the core arrangeable region ratio $R_{eff}$, and $\alpha_{R5}$ [dB/m] satisfies Expression (7) below:

$$\alpha_{R5} \leq 1.07 \times 10^9 \exp\left(-5.46 \times 10^{-1} \frac{7}{R_{pack} R_{eff}}\right). \quad (7)$$

13. The multi-core optical fiber according to claim 12, wherein the product $R_{pack} \cdot R_{eff}$ of the effective core packing rate $R_{pack}$ and the core arrangeable region ratio $R_{eff}$ is not less than about ⅛.

14. The multi-core optical fiber according to claim 1, wherein the number of spatial modes guided without effectively being cut off in each of the core parts is constant in the wavelength range of 1530 nm to 1550 nm,
wherein the predetermined wavelength is 1550 nm, and
wherein said $\eta_n$ at the predetermined wavelength is in the range of about $5.3 \times 10^{-9}$/km to about $1.7 \times 10^{-5}$/km.

15. The multi-core optical fiber according to claim 1, wherein the number of spatial modes guided without effectively being cut off in at least any one of the core parts is constant in the wavelength range of 1530 nm to 1565 nm,
wherein the predetermined wavelength is 1565 nm, and
wherein said $\eta_n$ at the predetermined wavelength is in the range of about $1.5 \times 10^{-8}$/km to about $1.7 \times 10^{-5}$/km.

16. The multi-core optical fiber according to claim 1, wherein the number of spatial modes guided without effectively being cut off in at least any one of the core parts is constant in the wavelength range of 1530 nm to 1625 nm,
wherein the predetermined wavelength is 1625 nm, and
wherein said $\eta_n$ at the predetermined wavelength is in the range of about $9.7 \times 10^{-8}$/km to about $1.7 \times 10^{-5}$/km.

17. The multi-core optical fiber according to claim 1, wherein an outside diameter of the cladding is not less than about 125 µm and not more than about 225 µm, and
wherein a thickness of the coating is not more than about 42.5 µm.

18. A multi-core optical fiber cable internally comprising the multi-core optical fibers as defined in claim 1.

19. A multi-core optical fiber transmission system comprising the multi-core optical fiber as defined in claim 1, as a transmission line, and configured to transmit signals by spatial multiplexing.

20. The multi-core optical fiber transmission system according to claim 19, wherein during multiple wavelength transmission, modulation methods are optimized for respective wavelengths of signal light, thereby to implement wavelength multiplexing of signal light of different modulation methods.

21. The multi-core optical fiber transmission system according to claim 19, comprising an optical amplification repeater, in which the optical amplifier amplification repeater amplifies light attenuated through propagation in the multi-core optical fiber or in the multi-core optical fiber cable,
wherein a difference between a mode field diameter of any one of the core parts in the multi-core optical fiber or in any one multi-core optical fiber in the multi-core optical fiber cable, and a mode field diameter of a core of the optical amplification repeater is not more than 1 µm.

22. A multi-core optical fiber cable internally comprising a plurality of multi-core optical fibers,
the multi-core optical fiber cable comprising a sheath integrally covering the plurality of internal multi-core optical fibers, and a tension member extending along a central axis of the multi-core optical fiber cable,
each of the multi-core optical fibers comprising a plurality of core parts each extending along a predetermined axis, a cladding integrally covering each of the core parts, and a coating provided on an outer peripheral surface of the cladding, and the multi-core optical fiber cable satisfying at least one of first and third conditions, wherein the first condition is defined in that:

each of the core parts enables single-mode transmission at a predetermined wavelength, and wherein in a kth multi-core optical fiber out of the plurality of multi-core optical fibers, $\alpha_{dB,kn}$ [dB/km] represents a transmission loss at the predetermined wavelength of a predetermined core part n with the largest crosstalk from other cores out of the plurality of core parts, $n_{2,kn}$ [m²/W] a non-linear refractive index of the predetermined core part n at the predetermined wavelength, $A_{eff,kn}$ [μm²] an effective area of the predetermined core part n at the predetermined wavelength, $D_{kn}$ [ps/(nm·km)] a chromatic dispersion of the predetermined core part n at the predetermined wavelength, $\eta_n$ [/km] a sum of power coupling coefficients to the predetermined core part n from all the other core parts at the predetermined wavelength, and $N_{core,k}$ the number of core parts in the kth multi-core optical fiber, and wherein $A_{cable}$ represents a sectional area of the entire multi-core optical fiber cable perpendicular to the central axis, Expression (8) below is satisfied:

$$\frac{1}{A_{cable}} \sum_k N_{core,k} \log_2 \left\{ \frac{1 + \frac{\exp(-80\eta_{kn})}{2.10 \times 10^{10} \left[ \frac{(10^{8\alpha_{dB,kn}} - 1)^3}{\alpha_{dB,kn} 10^{8\alpha_{dB,kn}} |D_{kn}|} \left( \frac{n_{2,kn}}{A_{eff,kn}} \right)^2 \right] \log \left( 5.47 \times 10^3 |D_{kn}| \frac{1 - 10^{-8\alpha_{dB,kn}}}{\alpha_{dB,kn}} \right)^{\frac{1}{3}} + [1 - \exp(-80\eta_{kn})]} } \right\} \geq$$

$$\frac{2.5}{20.4} 1.96 \times 10^2,$$ (8)

wherein the second condition is defined in that:

each of the core parts enables single-mode transmission at a predetermined wavelength, and wherein in a kth multi-core optical fiber out of the plurality of multi-core optical fibers, $\alpha_{dB,kn}$ [dB/km] represents a transmission loss at the predetermined wavelength of an nth core part out of the plurality of core parts, $n_{2,kn}$ [m²/W] a non-linear refractive index of the nth core part at the predetermined wavelength, $A_{eff,kn}$ [μm²] an effective area of the nth core part at the predetermined wavelength, $D_{kn}$ [ps/(nm·km)] a chromatic dispersion of the nth core part at the predetermined wavelength, and $\eta_{kn}$ [/km] a sum of power coupling coefficients to the nth core part from all the other core parts out of the plurality of core parts at the predetermined wavelength, and wherein $A_{coat}$ represents a sectional area of the entire multi-core optical fiber cable perpendicular to the central axis, Expression (9) below is satisfied:

$$\frac{1}{A_{cable}} \sum_k \sum_n \log_2 \left\{ \frac{1 + \frac{\exp(-80\eta_{kn})}{2.10 \times 10^{10} \left[ \frac{(10^{8\alpha_{dB,kn}} - 1)^3}{\alpha_{dB,kn} 10^{8\alpha_{dB,kn}} |D_{kn}|} \left( \frac{n_{2,kn}}{A_{eff,kn}} \right)^2 \right] \log \left( 5.47 \times 10^3 |D_{kn}| \frac{1 - 10^{-8\alpha_{dB,kn}}}{\alpha_{dB,kn}} \right)^{\frac{1}{3}} + [1 - \exp(-80\eta_{kn})]} } \right\} \geq$$

$$\frac{2.5}{20.4} 1.96 \times 10^2,$$ (9)

wherein the third condition is defined in that:

"a transmission loss of a spatial mode not guided with the transmission loss of not more than 1 dB/km at a predetermined wavelength" is not less than 0.9 dB/m, and wherein in a kth multi-core optical fiber out of the plurality of multi-core optical fibers, $\alpha_{dB,knm}$ [dB/km] represents a transmission loss at the predetermined wavelength of an mth spatial mode guided with the transmission loss of not more than 1 dB/km at the predetermined wavelength out of spatial modes in an nth core part among the plurality of core parts, $n_{2,knm}$ [m²/W] a non-linear refractive index at the predetermined wavelength of the mth spatial mode in the nth core part, $A_{eff,knm}$ [μm²] an effective area at the predetermined wavelength of the mth spatial mode in the nth core part, $D_{knm}$ [ps/(nm·km)] a chromatic dispersion at the predetermined wavelength of the mth spatial mode in the nth core part, and $\eta_{kn}$ [/km] a sum of power coupling coefficients to the nth core part from all the other core parts out of the plurality of core parts at the predetermined wavelength, and wherein $A_{cable}$ represents a sectional area of the entire multi-core optical fiber cable perpendicular to the central axis, Expression (10) below is satisfied:

$$\frac{1}{A_{cable}} \sum_k \sum_n \sum_m \log_2$$ (10)

$$\left\{ \frac{1 + \frac{\exp(-80\eta_{kn})}{2.10 \times 10^{10} \left[ \frac{(10^{8\alpha_{dB,knm}} - 1)^3}{\alpha_{dB,knm} 10^{8\alpha_{dB,knm}} |D_{knm}|} \left( \frac{n_{2,knm}}{A_{eff,knm}} \right)^2 \right] \log \left( 10^3 |D_{knm}| \frac{5.47 \times 1 - 10^{-8\alpha_{dB,knm}}}{\alpha_{dB,knm}} \right)^{\frac{1}{3}} + [1 - \exp(-80\eta_{kn})]} } \right\} \geq$$

$$\frac{2.5}{20.4} 1.96 \times 10^2.$$

23. The multi-core optical fiber cable according to claim 22, wherein in each of the plurality of multi-core optical fibers, the predetermined wavelength is any one wavelength in the range of 1.26 μm to 1.65 μm, each of the core parts is comprised of silica glass, and non-linear refractive indices $n_2$ of the respective core parts at the predetermined wavelength are in the range of $2 \times 10^{-20}$ to $3 \times 10^{-20}$ [m²/W].

24. The multi-core optical fiber cable according to claim 23, wherein in each of the plurality of multi-core optical fibers,
 each of the core parts is doped with $GeO_2$, and the non-linear refractive indices $n_2$ are about $2.3 \times 10^{-20}$ [$m^2$/W].

25. The multi-core optical fiber cable according to claim 23, wherein in each of the plurality of multi-core optical fibers,
 each of the core parts is not doped with $GeO_2$, and the non-linear refractive indices $n_2$ are about $2.2 \times 10^{-20}$ [$m^2$/W].

26. A multi-core optical fiber transmission system comprising the multi-core optical fiber as defined in claim 22, as a transmission line, and configured to transmit signals by spatial multiplexing.

27. The multi-core optical fiber transmission system according to claim 26, wherein during multiple wavelength transmission, modulation methods are optimized for respective wavelengths of signal light, thereby to implement wavelength multiplexing of signal light of different modulation methods.

28. The multi-core optical fiber transmission system according to claim 26, comprising an optical amplification repeater, in which the optical amplifier amplification repeater amplifies light attenuated through propagation in the multi-core optical fiber or in the multi-core optical fiber cable,
 wherein a difference between a mode field diameter of any one of the core parts in the multi-core optical fiber or in any one multi-core optical fiber in the multi-core optical fiber cable, and a mode field diameter of a core of the optical amplification repeater is not more than 1 μm.

* * * * *